US011678765B2

(12) United States Patent
Elliston et al.

(10) Patent No.: US 11,678,765 B2
(45) Date of Patent: Jun. 20, 2023

(54) COOKING DEVICE AND COMPONENTS THEREOF

(71) Applicant: SHARKNINJA OPERATING LLC, Needham, MA (US)

(72) Inventors: Rupert Elliston, London (GB); Roger Neil Jackson, Cornwall (GB); Steven Carter, Needham, MA (US); Benjamin Sharp, Cumbria (GB); Thomas Guerin, Boston, MA (US); Christopher T. Martin, Concord, MA (US); Christopher Smith, Newton, MA (US); Joshua D. Anthony, North Billerica, MA (US); Michaela Dubeau, Uxbridge, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 17/139,572

(22) Filed: Dec. 31, 2020

(65) Prior Publication Data

US 2021/0121011 A1 Apr. 29, 2021

Related U.S. Application Data

(60) Provisional application No. 63/001,953, filed on Mar. 30, 2020.

(51) Int. Cl.
*A47J 37/06* (2006.01)
*A47J 27/08* (2006.01)
(Continued)

(52) U.S. Cl.
CPC ......... *A47J 37/0641* (2013.01); *A47J 27/004* (2013.01); *A47J 27/0802* (2013.01);
(Continued)

(58) Field of Classification Search
None
See application file for complete search history.

(56) References Cited

U.S. PATENT DOCUMENTS 472,002 A 3/1892 Ross et al.
1,254,384 A 1/1918 Albro
(Continued)

FOREIGN PATENT DOCUMENTS

CN 1139304 1/1997
CN 2253170 Y 4/1997
(Continued)

OTHER PUBLICATIONS

Delonghi, [online]; [retrieved on Mar. 18, 2019]; retrieved from the Internet https://www.delonghi.com/en-us/products/kitchen/kitchen-appliances/low-oil-fryer-and-multicooker/multifry-fh11631bk-0125392006?TabSegment=support#support DeLonghi, "FH1163 FH1363 MultiFry", DeLonghi Instruction Manual, www.delonghi.com, 5712511041/05.15, pp. 1-11.
(Continued)

*Primary Examiner* — Nathaniel E Wiehe
*Assistant Examiner* — Elizabeth M Kerr
(74) *Attorney, Agent, or Firm* — Mintz Levin Cohn Ferris Glovsky and Popeo, PC

(57) ABSTRACT

A cooking system includes a housing defining a hollow chamber configured to receive food. The housing has an upper portion defining an opening to said hollow chamber. A lid is movable relative to the housing between an open position and a closed position. The lid seals the opening to the hollow chamber when in the closed position. A portion of the lid is selectively positionable to form a pressure-tight heating volume between the hollow chamber and the portion of said lid. At least one heating element is associated with at least one of the housing and the lid. The at least one heating
(Continued)

20
24
64
60
62
22
122
120
26
122 element is arranged within the pressure-tight heating volume.

24 Claims, 21 Drawing Sheets

(51) Int. Cl.
*A47J 27/086* (2006.01)
*A47J 27/00* (2006.01)
*A47J 27/09* (2006.01)
*A47J 37/07* (2006.01)
*A47J 36/32* (2006.01)

(52) U.S. Cl.
CPC ....... *A47J 27/0804* (2013.01); *A47J 27/0806* (2013.01); *A47J 27/086* (2013.01); *A47J 27/09* (2013.01); *A47J 36/32* (2013.01); *A47J 37/0664* (2013.01); *A47J 37/0754* (2013.01); *A47J 2202/00* (2013.01)

(56) References Cited

U.S. PATENT DOCUMENTS 2,055,972 A 9/1934 Fritsche
1,986,088 A 1/1935 Wild
2,313,968 A 10/1937 Reich
2,378,950 A 10/1937 Reich
2,188,757 A 8/1938 Moon
2,253,833 A 12/1939 Volks
2,235,911 A 3/1941 Wilcox
2,429,282 A 10/1947 Ness
2,430,582 A 11/1947 Reich
2,462,287 A 2/1949 Richeson et al.
2,532,639 A 12/1950 Payne
2,622,591 A 12/1952 Bramberry
2,785,277 A 3/1957 Jepson
2,952,764 A 9/1960 Minami
3,076,405 A 2/1963 Lang
3,122,134 A 2/1964 Reeves
3,514,301 A 5/1970 Berger
3,529,582 A 9/1970 Hurko et al.
3,610,885 A 10/1971 Zingg
3,821,454 A 6/1974 Lobel
3,828,760 A 8/1974 Farber et al.
4,071,739 A 1/1978 Jenn et al.
4,106,486 A 8/1978 Lee
4,106,488 A 8/1978 Gordon
4,148,250 A 4/1979 Miki et al.
4,162,741 A 7/1979 Walker et al.
4,210,072 A 7/1980 Pedrini
4,241,288 A 12/1980 Aoshima et al.
4,268,741 A 5/1981 O'Brien
4,313,051 A 1/1982 Aoshima
4,315,138 A 2/1982 Miwa
4,374,318 A 2/1983 Gilliom
4,374,319 A 2/1983 Guibert
4,410,030 A 10/1983 Skala
4,430,557 A 2/1984 Eichelberger et al.
4,484,063 A 11/1984 Whittenburg et al.
4,484,083 A 11/1984 Jefferies
4,509,412 A 4/1985 Whittenburg et al.
4,528,975 A 7/1985 Wang
4,591,698 A 5/1986 Chang
4,622,231 A 11/1986 Swartley
4,625,097 A 11/1986 Miwa
4,670,282 A 6/1987 Onishi et al.
4,700,685 A 10/1987 Miller
4,728,762 A 3/1988 Roth et al.
4,771,162 A 9/1988 Schatz
4,829,158 A 5/1989 Burnham
4,848,217 A 7/1989 Koziol
4,889,972 A 12/1989 Chang
4,995,313 A 2/1991 Delau et al.
5,000,085 A 3/1991 Archer
5,008,508 A 4/1991 Skerker et al.
5,012,071 A 4/1991 Henke
5,029,519 A 7/1991 Boyen
5,031,519 A 7/1991 Toida et al.
5,036,179 A 7/1991 Westerberg et al.
5,048,400 A 9/1991 Ueda et al.
5,067,396 A 11/1991 Sorensen et al.
5,092,229 A 3/1992 Chen
5,097,753 A 3/1992 Naft
5,105,725 A 4/1992 Haglund
5,205,274 A 4/1993 Smith et al.
5,251,542 A 10/1993 Itoh
5,280,749 A 1/1994 Smit
5,329,919 A 7/1994 Chang
5,355,777 A 10/1994 Chen et al.
5,416,950 A 5/1995 Dornbush et al.
5,445,061 A 8/1995 Barradas
5,445,081 A 8/1995 Kunczynski
5,466,912 A 11/1995 Dornbush et al.
5,485,780 A 1/1996 Koether et al.
5,513,558 A 5/1996 Erickson et al.
5,526,734 A 6/1996 Harrison
5,528,734 A 6/1996 Sanchez
5,549,039 A 8/1996 Ito et al.
5,567,458 A 10/1996 Wu
5,588,352 A 12/1996 Harrison
5,590,583 A 1/1997 Harrison
5,615,607 A 4/1997 Delaquis et al.
5,619,983 A 4/1997 Smith
5,632,403 A 5/1997 Deng
5,649,476 A 7/1997 Montagnino et al.
5,676,044 A 10/1997 Lara, Jr.
5,699,722 A 12/1997 Erickson et al.
5,740,721 A 4/1998 Bizard et al.
5,768,976 A 6/1998 Suk
5,839,357 A 11/1998 Ha et al.
5,865,104 A 2/1999 Sham et al.
5,896,808 A 4/1999 Graur
5,932,130 A 8/1999 Taino
5,957,038 A 9/1999 Shimazaki
5,967,021 A 10/1999 Yung
5,970,858 A 10/1999 Boehm et al.
6,006,939 A 12/1999 Wai
6,014,986 A 1/2000 Baumgarten
6,016,797 A 1/2000 Nowicke, Jr.
6,019,029 A 2/2000 Chan
6,023,050 A 2/2000 Violi
6,060,698 A 5/2000 Petrides et al.
6,066,837 A 5/2000 McCormick et al.
6,067,896 A 5/2000 Elorza
6,070,518 A 6/2000 Kao
6,082,249 A 7/2000 Su
6,083,543 A 7/2000 Kim et al.
6,097,016 A 8/2000 Hirata et al.
6,103,291 A 8/2000 Fernandez Tapia
6,104,004 A 8/2000 Ragland et al.
6,105,808 A 8/2000 Mendonca
6,116,151 A 9/2000 Fickert et al.
6,125,737 A 10/2000 Chang
6,135,012 A 10/2000 Kao
6,135,013 A 10/2000 Barrena
6,158,606 A 12/2000 Oliver
6,173,643 B1 1/2001 Qian et al.
6,178,876 B1 1/2001 Kao
6,191,393 B1 2/2001 Park
6,201,217 B1 3/2001 Moon et al.
6,242,025 B1 6/2001 Lesky et al.
6,252,206 B1 6/2001 Leukhardt, III et al.
6,255,630 B1 7/2001 Barnes et al.
6,257,124 B1 7/2001 Chen
6,262,396 B1 7/2001 Witt et al.
6,267,046 B1 7/2001 Wanat
6,268,592 B1 7/2001 Hu et al.
6,269,737 B1 8/2001 Rigney et al.
6,271,504 B1 8/2001 Barritt
6,283,014 B1 9/2001 Ng et al.
6,283,015 B1 9/2001 Kwon et al.
6,320,166 B1 11/2001 Park
6,355,914 B1 3/2002 Stockley

(56) References Cited

U.S. PATENT DOCUMENTS 6,384,381 B2 5/2002 Witt et al.
6,393,969 B1 5/2002 Kim
D458,078 S 6/2002 Lin
6,399,925 B1 6/2002 Pickering et al.
6,414,254 B1 7/2002 McNair
6,425,320 B1 7/2002 Chameroy et al.
6,443,053 B1 9/2002 Rossi
6,450,085 B1 9/2002 Riesselman
6,450,361 B1 9/2002 Mendelson et al.
6,454,225 B1 9/2002 Jaworski
6,455,085 B1 9/2002 Duta
6,467,645 B2 10/2002 Park
6,486,453 B1 11/2002 Bales et al.
6,494,337 B1 12/2002 Moroni
6,505,545 B2 1/2003 Kennedy et al.
6,509,550 B1 1/2003 Li
6,513,420 B1 2/2003 Park
6,523,459 B1 2/2003 Chameroy et al.
6,528,772 B1 3/2003 Graves et al.
6,540,097 B1 4/2003 Beck et al.
6,545,252 B2 4/2003 Wang
6,552,309 B1 4/2003 Kish et al.
6,559,427 B1 5/2003 Barnes et al.
6,565,903 B2 5/2003 Ng et al.
6,568,314 B1 5/2003 Stepanova
6,573,483 B1 6/2003 Decobert et al.
6,602,530 B1 8/2003 Weber et al.
6,603,099 B2 8/2003 Gouthiere
6,604,453 B2 8/2003 Niese
6,615,706 B1 9/2003 Wu
6,615,708 B1 9/2003 Lin
6,631,824 B2 10/2003 Park
6,669,047 B2 10/2003 Wooderson et al.
6,648,162 B1 11/2003 Wooderson et al.
6,617,554 B2 12/2003 Moon et al.
6,657,167 B2 12/2003 Loveless
6,695,319 B1 2/2004 Anota et al.
D487,212 S 3/2004 Park
6,698,337 B1 3/2004 Park
6,703,061 B2 3/2004 Kennedy et al.
6,705,209 B2 3/2004 Yang et al.
6,723,963 B2 4/2004 Ronda
6,730,881 B1 5/2004 Arntz et al.
6,730,882 B2 5/2004 Atkinson
6,730,889 B1 5/2004 Jones-Lawlor
6,732,636 B1 5/2004 Germano
6,736,131 B2 5/2004 Yamamoto et al.
6,740,855 B1 5/2004 Decobert et al.
6,742,445 B2 6/2004 Backus et al.
6,747,250 B1 6/2004 Cha
6,755,319 B2 6/2004 Park
6,758,132 B1 7/2004 Kuo et al.
6,777,651 B1 8/2004 Boyer
6,782,805 B2 8/2004 Backus et al.
6,782,806 B2 8/2004 Backus et al.
6,802,429 B1 10/2004 Wildman
6,809,297 B2 10/2004 Moon et al.
6,812,433 B1 11/2004 Barritt
6,815,644 B1 11/2004 Muegge et al.
6,831,254 B2 12/2004 Barritt
6,833,534 B2 12/2004 Bellassai et al.
6,837,150 B2 1/2005 Backus et al.
6,841,762 B2 1/2005 Suzuki
6,845,707 B1 1/2005 Xu et al.
6,846,504 B1 1/2005 Yarnell
6,851,351 B2 2/2005 Payen et al.
6,872,921 B1 3/2005 Decobert et al.
6,874,408 B2 4/2005 Backus et al.
6,877,633 B2 4/2005 Niese
6,903,310 B1 6/2005 Lee
6,917,017 B2 7/2005 Moon et al.
6,930,286 B2 8/2005 Kim
6,933,477 B2 8/2005 Becker et al.
6,935,223 B2 8/2005 Kobayashi
6,936,795 B1 8/2005 Moon et al.
6,936,801 B1 8/2005 Head
6,941,857 B2 9/2005 McLemore
6,965,094 B1 11/2005 Friedman
6,972,397 B2 12/2005 Ha
7,009,147 B1 3/2006 Schulte
7,012,220 B2 3/2006 Boyer et al.
7,012,221 B2 3/2006 Li
7,021,203 B2 4/2006 Backus et al.
7,021,204 B2 4/2006 Backus et al.
7,024,104 B2 4/2006 Moore, Jr. et al.
7,045,745 B2 5/2006 Kim
7,053,337 B2 5/2006 Ragan et al.
7,060,941 B1 6/2006 Embury et al.
7,060,943 B2 6/2006 Hwang
7,081,601 B2 7/2006 Boyer et al.
7,082,871 B2 8/2006 Schultz
7,086,326 B2 8/2006 Yokoyama
7,087,873 B2 8/2006 Hayakawa et al.
7,091,454 B2 8/2006 Cho et al.
7,105,778 B1 9/2006 Delong et al.
7,105,780 B2 9/2006 De Longhi
7,126,088 B2 10/2006 Horton et al.
7,148,451 B2 12/2006 Miyake et al.
7,154,069 B1 12/2006 Gordon
7,156,087 B1 1/2007 Churchill et al.
7,157,675 B2 1/2007 Imura
7,166,822 B1 1/2007 Chang et al.
7,171,923 B2 2/2007 Hayakawa et al.
7,208,701 B2 4/2007 Fraccon et al.
7,208,702 B2 4/2007 Choi
7,238,921 B2 7/2007 Beesley et al.
7,250,587 B2 7/2007 Ely et al.
7,250,588 B2 7/2007 Ely et al.
7,261,101 B2 8/2007 Kim
7,276,677 B1 10/2007 Shelton
7,285,751 B2 10/2007 Li et al.
7,304,271 B2 12/2007 Cho et al.
7,317,173 B2 1/2008 Bartelick et al.
7,322,279 B2 1/2008 Cartigny et al.
7,322,280 B2 1/2008 Seurat Guiochet et al.
7,325,481 B2 2/2008 Helm
7,368,688 B2 5/2008 Kim et al.
7,373,874 B2 5/2008 Seurat Guiochet et al.
7,377,208 B2 5/2008 Ho et al.
7,389,721 B2 6/2008 Wanat
7,411,159 B2 8/2008 Oosterling
7,412,922 B2 8/2008 McLemore
7,418,960 B2 9/2008 Saksena
7,451,691 B2 11/2008 Robertson
7,451,692 B2 11/2008 Baraille et al.
7,468,495 B2 12/2008 Carbone et al.
7,523,696 B2 4/2009 Seurat Guiochet et al.
7,530,302 B2 5/2009 Stephanou
7,537,004 B2 5/2009 Reay
7,565,862 B2 7/2009 Cartigny et al.
7,605,349 B2 10/2009 Gaynor et al.
D604,098 S 11/2009 Hamlin
7,619,186 B2 11/2009 Cavada et al.
7,624,674 B2 12/2009 Chameroy et al.
7,637,206 B2 12/2009 Seurat Guiochet et al.
7,669,521 B2 3/2010 Cartigny et al.
7,669,591 B2 3/2010 Fossati et al.
7,677,160 B2 3/2010 Tippmann, Sr. et al.
7,703,385 B2 4/2010 Seurat Guiochet et al.
7,718,928 B2 5/2010 He et al.
7,726,508 B2 6/2010 Hasegawa
7,745,763 B2 6/2010 Fraccon et al.
7,759,615 B2 7/2010 Ando et al.
7,762,420 B2 7/2010 Auwarter et al.
7,766,003 B2 8/2010 Kim
7,775,390 B2 8/2010 De Bastos Reis Portugal et al.
7,800,022 B2 9/2010 Kim
7,810,488 B2 10/2010 Manganiello et al.
7,838,799 B2 11/2010 Freedman
7,856,875 B2 12/2010 Jeon et al.
7,875,836 B2 1/2011 Imura et al.
7,915,568 B2 3/2011 Wang
D635,393 S 4/2011 Nakatani
7,921,768 B2 4/2011 Fernandez et al.

(56) References Cited

U.S. PATENT DOCUMENTS 7,935,914 B2 5/2011 Imura
7,943,888 B2 5/2011 Barnes et al.
7,964,824 B2 6/2011 Moon
7,968,824 B2 6/2011 Lee et al.
7,980,171 B2 7/2011 Groll
8,006,684 B2 8/2011 Lee et al.
8,006,685 B2 8/2011 Bolton et al.
8,011,293 B2 9/2011 McFadden et al.
8,042,533 B2 10/2011 Dobie et al.
8,080,766 B2 12/2011 Frock et al.
8,096,436 B2 1/2012 Rhetat et al.
8,096,440 B2 1/2012 Rhetat et al.
8,152,083 B2 4/2012 Bower et al.
8,166,871 B2 5/2012 Veltrop et al.
8,205,543 B2 6/2012 Rhetat et al.
8,247,751 B2 8/2012 Jagannathan
8,258,435 B2 9/2012 Bonuso et al.
8,267,008 B2 9/2012 Yasuhara
D669,730 S 10/2012 Mandil
8,276,507 B1 10/2012 Walker
8,286,548 B2 10/2012 Krishnan et al.
8,299,404 B2 10/2012 Van Der Weij
8,302,800 B2 11/2012 Hasegawa
8,304,695 B2 11/2012 Bonuso et al.
8,330,083 B2 12/2012 Moon et al.
8,338,757 B2 12/2012 Isoda et al.
8,369,695 B2 2/2013 Lee et al.
8,378,265 B2 2/2013 Greenwood et al.
8,381,712 B1 2/2013 Simms, II
8,393,262 B1 3/2013 Molayem
8,420,983 B2 4/2013 Ohashi et al.
8,461,488 B2 6/2013 Jeong et al.
8,481,488 B2 7/2013 Carter
8,517,006 B2 8/2013 Frock et al.
8,517,205 B2 8/2013 Thelen
8,525,081 B2 9/2013 Colburn et al.
8,544,381 B2 10/2013 Cartigny et al.
8,546,731 B2 10/2013 Pellerin et al.
8,561,525 B2 10/2013 Bauchot et al.
8,578,293 B2 11/2013 Breunig et al.
8,581,137 B2 11/2013 Egenter
8,601,939 B2 12/2013 Saksena et al.
8,604,394 B2 12/2013 Wu et al.
8,618,447 B2 12/2013 De'Longhi
8,637,797 B2 1/2014 Imura
D699,514 S 2/2014 Lovley, II et al.
8,640,908 B2 2/2014 Yang et al.
8,674,270 B2 3/2014 Anderson et al.
8,689,680 B2 4/2014 Park
8,695,487 B2 4/2014 Sakane et al.
8,709,905 B2 4/2014 Crayfourd
8,714,391 B2 5/2014 Milanesi
8,726,792 B2 5/2014 Shealy et al.
8,733,574 B2 5/2014 Heidrich et al.
D707,078 S 6/2014 Rivera et al.
8,739,690 B2 6/2014 Chameroy et al.
8,747,933 B1 6/2014 McGinn
8,766,144 B2 7/2014 McLoughlin et al.
8,777,038 B2 7/2014 Wen
8,783,498 B2 7/2014 Li
8,783,947 B2 7/2014 Ferron et al.
D710,647 S 8/2014 Mandil et al.
8,800,803 B2 8/2014 Stellwag
8,808,772 B2 8/2014 Lubrina et al.
8,813,635 B2 8/2014 Dragan
8,813,989 B2 8/2014 Hoffmann et al.
8,820,220 B2 9/2014 Thelen et al.
8,840,908 B2 9/2014 Reed et al.
8,847,129 B2 9/2014 Kim et al.
8,869,829 B2 10/2014 Hasegawa
8,887,939 B2 11/2014 Chameroy et al.
D719,398 S 12/2014 Deters
D720,571 S 1/2015 Deters
8,931,402 B2 1/2015 Chameroy et al.
8,931,659 B2 1/2015 Rhetat et al.
8,944,272 B2 2/2015 Chameroy et al.
8,944,273 B2 2/2015 Chameroy et al.
8,946,604 B2 2/2015 Kaiser et al.
8,960,081 B2 2/2015 Beard et al.
8,973,770 B2 3/2015 He et al.
8,985,372 B2 3/2015 Yang et al.
8,991,307 B2 3/2015 Grozinger et al.
8,993,934 B2 3/2015 Giazzon et al.
D727,095 S 4/2015 Bak
9,018,566 B2 4/2015 Wang
9,027,468 B2 5/2015 Rhetat et al.
9,035,223 B2 5/2015 Noguchi et al.
9,055,618 B2 6/2015 Bunzel et al.
9,057,526 B2 6/2015 Barritt
9,066,523 B2 6/2015 Seitz et al.
9,115,905 B2 8/2015 Giazzon et al.
9,119,501 B2 9/2015 Xie
9,125,513 B2 9/2015 Kim
9,127,849 B2 9/2015 Kang et al.
9,138,106 B2 9/2015 Walker
9,173,408 B2 11/2015 Yamamoto et al.
9,177,460 B2 11/2015 Fissler
9,182,126 B2 11/2015 Cartwright et al.
9,191,998 B2 11/2015 Hegedis et al.
9,220,362 B2 12/2015 Eades et al.
9,237,829 B2 1/2016 Alet Vidal et al.
D749,906 S 2/2016 Lee
9,247,842 B2 2/2016 Cheung et al.
9,271,595 B2 3/2016 Lee
9,295,354 B2 3/2016 Sloot et al.
9,295,355 B2 3/2016 Kwag et al.
D754,469 S 4/2016 Deters
9,301,644 B2 4/2016 Payen et al.
9,314,134 B2 4/2016 Molnar
9,320,381 B2 4/2016 Chameroy et al.
9,326,633 B2 5/2016 Lin
9,339,145 B1 5/2016 Owczarzak
9,341,382 B2 5/2016 Kim
9,345,358 B2 5/2016 Zhang et al.
9,351,495 B2 5/2016 McFadden
9,353,954 B2 5/2016 Linnewiel
9,375,021 B2 6/2016 Raghavan et al.
9,414,713 B2 8/2016 Jinzhao
9,433,036 B2 8/2016 Kurtimoto et al.
9,439,530 B2 9/2016 Logan et al.
D769,058 S 10/2016 Lee
9,456,713 B2 10/2016 Backaert et al.
9,470,423 B2 10/2016 Jacob et al.
9,474,412 B2 10/2016 Fung et al.
D772,648 S 11/2016 Palermo
9,480,364 B2 11/2016 McKee et al.
D774,350 S 12/2016 Mandil
D774,356 S 12/2016 Maiorana et al.
9,526,367 B2 12/2016 Anota et al.
9,545,168 B2 1/2017 Gabara
9,565,963 B2 2/2017 Jeon et al.
9,565,964 B2 2/2017 Yang et al.
9,585,509 B2 3/2017 Wassmus et al.
9,596,954 B2 3/2017 Park
9,615,408 B2 4/2017 Metz et al.
9,615,688 B2 4/2017 Shibuya et al.
9,615,691 B2 4/2017 Xiao
9,615,692 B2 4/2017 Hoffmann et al.
9,615,694 B2 4/2017 Yoshidome
9,629,499 B2 4/2017 Kim
9,629,500 B2 4/2017 Chance
9,636,618 B2 5/2017 Fung et al.
9,642,487 B1 5/2017 McGinn
9,648,975 B2 5/2017 Imura
9,648,985 B2 5/2017 Huang et al.
9,675,197 B2 6/2017 Schobloch et al.
9,681,770 B2 6/2017 Backaert et al.
9,681,773 B2 6/2017 McKee et al.
9,683,747 B2 6/2017 Raghavan et al.
9,700,172 B2 7/2017 Tanaka et al.
9,706,870 B2 7/2017 Hoehn et al.
9,706,871 B2 7/2017 Matthijs
9,717,363 B2 8/2017 Pan
9,717,364 B2 8/2017 Sladecek

(56) References Cited

U.S. PATENT DOCUMENTS 9,737,936 B2 8/2017 Linglin et al.
9,743,794 B2 8/2017 Shibuya et al.
9,750,089 B2 8/2017 Wiedemann et al.
9,756,980 B1 9/2017 Li et al.
9,756,981 B2 9/2017 Fung
9,763,531 B2 9/2017 Baraille et al.
D801,106 S 10/2017 Mirchandani et al.
9,775,461 B2 10/2017 Yang et al.
9,788,678 B2 10/2017 Abe et al.
9,795,250 B2 10/2017 Huang
9,801,487 B2 10/2017 Park et al.
9,801,491 B2 10/2017 Cohade et al.
9,814,355 B2 11/2017 Winter et al.
9,841,261 B2 12/2017 Raghavan et al.
9,854,931 B2 1/2018 Rocklinger et al.
9,854,932 B2 1/2018 Tiruvallur
9,854,941 B2 1/2018 Bonaccorso
9,861,231 B2 1/2018 Kim
9,867,234 B2 1/2018 Thomann et al.
9,872,581 B2 1/2018 Braden et al.
9,872,582 B2 1/2018 Song et al.
9,877,610 B2 1/2018 Bucher et al.
9,883,768 B2 2/2018 Starflinger
9,888,811 B2 2/2018 Zwanenburg et al.
9,890,946 B2 2/2018 Shibuya et al.
9,895,028 B2 2/2018 Gerard et al.
9,900,936 B2 2/2018 Imm et al.
9,903,597 B2 2/2018 Nishijima et al.
9,907,435 B2 3/2018 Kohler et al.
9,909,764 B2 3/2018 Bach
9,924,825 B2 3/2018 Zakowski et al.
9,924,830 B1 3/2018 Glucksman et al.
D815,491 S 4/2018 Hollinger
9,930,990 B1 4/2018 Gupta et al.
9,936,837 B1 4/2018 Granberry
D817,697 S 5/2018 Zhao
9,961,721 B2 5/2018 Guilleminot et al.
9,961,929 B2 5/2018 Olsson
9,962,029 B2 5/2018 Baraille et al.
9,980,605 B2 5/2018 De Haas et al.
10,016,085 B2 7/2018 Sapire
10,021,889 B2 7/2018 Vinett
10,022,015 B2 7/2018 Marco et al.
10,022,021 B2 7/2018 Sudhir
10,034,578 B2 7/2018 Ahmed
D824,717 S 8/2018 Allen
D826,638 S 8/2018 Zhang
10,045,651 B2 8/2018 Huang
10,047,961 B2 8/2018 Choi
10,051,986 B2 8/2018 Schultz et al.
10,051,995 B2 8/2018 Buckley et al.
10,054,317 B2 8/2018 Franzolin
10,057,946 B2 8/2018 Mills et al.
10,058,210 B2 8/2018 Palermo
10,060,632 B2 8/2018 Lim et al.
10,064,518 B2 9/2018 Xiao et al.
10,076,206 B2 9/2018 Chameroy et al.
D832,023 S 10/2018 Barberi et al.
D832,030 S 10/2018 Veldeman
10,088,371 B2 10/2018 Kaiser et al.
10,092,128 B2 10/2018 Seitz et al.
10,094,576 B2 10/2018 Kim et al.
10,098,354 B2 10/2018 Faraldi et al.
D833,204 S 11/2018 Lee
10,117,546 B2 11/2018 Le Grand
10,119,708 B2 11/2018 Bartelick et al.
10,123,556 B2 11/2018 Distaso et al.
10,123,656 B2 11/2018 Shanmugam
10,125,978 B2 11/2018 Shibuya et al.
10,130,205 B2 11/2018 Fung et al.
D834,889 S 12/2018 Moon et al.
10,143,324 B2 12/2018 Kataoka et al.
10,143,327 B2 12/2018 Freeman et al.
10,154,750 B2 12/2018 Allemand et al.
D838,548 S 1/2019 Schutte
10,172,494 B2 1/2019 Long
10,178,924 B2 1/2019 French et al.
10,194,769 B2 2/2019 Kodden
10,208,964 B2 2/2019 Cupp et al.
D842,649 S 3/2019 Mishan
10,231,291 B2 3/2019 Kim
10,231,292 B2 3/2019 Kim et al.
10,231,565 B2 3/2019 Song et al.
10,231,574 B2 3/2019 Strang
10,244,883 B2 4/2019 Chameroy et al.
10,253,989 B2 4/2019 Helm et al.
10,258,049 B2 4/2019 Engstrom
10,260,755 B2 4/2019 Bach
10,260,758 B2 4/2019 Colozzo et al.
10,260,759 B2 4/2019 Colozzo et al.
10,271,686 B2 4/2019 Roy
10,274,206 B2 4/2019 Chen
10,278,241 B2 4/2019 Shibuya et al.
10,278,532 B2 5/2019 Metz
10,281,159 B2 5/2019 Park et al.
10,288,311 B2 5/2019 Cho et al.
10,295,192 B2 5/2019 Yoshimura et al.
10,299,621 B1 5/2019 Bourgeois et al.
10,327,587 B2 6/2019 Liao
10,330,323 B2 6/2019 Kim et al.
10,342,375 B2 7/2019 Chen
10,344,988 B2 7/2019 Gattei
10,349,775 B2 7/2019 Lego et al.
10,360,812 B2 7/2019 Koennings et al.
10,368,403 B2 7/2019 Hayashi et al.
10,368,681 B2 8/2019 Kataoka et al.
10,376,087 B2 8/2019 Cornelissen
10,385,550 B2 8/2019 Lu et al.
10,390,656 B2 8/2019 Gill et al.
10,398,249 B2 9/2019 Becker et al.
10,405,686 B2 9/2019 Patel et al.
10,405,697 B2 9/2019 Gill et al.
10,405,698 B2 9/2019 Gill et al.
10,413,109 B2 9/2019 Krebs et al.
10,413,121 B2 9/2019 Gill et al.
10,413,122 B2 9/2019 Gill et al.
10,448,778 B2 10/2019 Watson et al.
10,451,290 B2 10/2019 Mayberry
10,463,186 B2 11/2019 Di Ronco et al.
10,470,609 B2 11/2019 Gerard et al.
10,470,614 B2 11/2019 Lang et al.
10,485,378 B2 11/2019 Gill et al.
10,492,637 B2 12/2019 Abe et al.
10,492,638 B2 12/2019 Guegan et al.
10,499,760 B2 12/2019 Blond
10,512,359 B2 12/2019 Xu et al.
10,517,306 B1 12/2019 Meirav
10,524,317 B2 12/2019 Kondo et al.
10,524,604 B2 1/2020 Bjork et al.
10,533,752 B2 1/2020 Faraldi et al.
10,561,273 B2 2/2020 Patel et al.
10,561,274 B2 2/2020 Huang
10,561,277 B1 2/2020 Swayne et al.
10,575,679 B1 3/2020 Cheng et al.
10,578,310 B2 3/2020 Joo et al.
10,588,445 B2 3/2020 Gustavsson
10,602,869 B2 3/2020 Yu et al.
10,638,868 B1 5/2020 Straight
10,638,869 B2 5/2020 Kataoka et al.
10,638,882 B1 5/2020 He et al.
10,645,765 B2 5/2020 Shibuya et al.
10,667,639 B2 6/2020 Mederer
10,674,855 B2 6/2020 Rosalia et al.
10,674,864 B2 6/2020 Trtic
10,687,650 B2 6/2020 Huang et al.
10,690,352 B2 6/2020 Smith et al.
10,694,753 B2 6/2020 Reese et al.
10,694,882 B2 6/2020 Huang
10,694,891 B2 6/2020 Huang
10,729,282 B2 8/2020 Bonaccorso
10,746,412 B1 8/2020 Artt
2002/0179587 A1 12/2002 Hui
2002/0185012 A1 12/2002 Yokoyama
2003/0034027 A1 2/2003 Yamamoto et al.

(56) References Cited

U.S. PATENT DOCUMENTS

2003/0127447 A1 7/2003 Lin
2004/0035845 A1 2/2004 Moon et al.
2004/0045446 A1 3/2004 Park
2004/0055474 A1 3/2004 Lekic et al.
2004/0112362 A1 6/2004 Bruno et al.
2004/0124197 A1 7/2004 Hasegawa
2004/0216731 A1 11/2004 Personnettaz et al.
2004/0222208 A1 11/2004 Ko
2004/0253348 A1 12/2004 Woodward et al.
2005/0011370 A1 1/2005 Xu et al.
2005/0034716 A1 2/2005 Harbin
2005/0089318 A1 4/2005 Lai et al.
2005/0223906 A1 10/2005 Xu
2005/0284305 A1 12/2005 Angue
2006/0081235 A1 4/2006 Lundh et al.
2007/0045284 A1 3/2007 Balk et al.
2007/0095215 A1 5/2007 Ho et al.
2007/0125768 A1 6/2007 Kim et al.
2007/0158335 A1 7/2007 Mansbery
2007/0199557 A1 8/2007 Von Kaenel, Jr.
2007/0295221 A1 12/2007 Seurat Guiochet et al.
2008/0022861 A1 1/2008 Ferron
2008/0078371 A1 4/2008 Boscaino
2008/0078755 A1 4/2008 Jeon et al.
2008/0083730 A1 4/2008 Dolgov et al.
2008/0095905 A1 4/2008 Sells et al.
2008/0099008 A1 5/2008 Bolton et al.
2008/0105135 A1 5/2008 McFadden et al.
2008/0105137 A1 5/2008 Genslak et al.
2008/0142498 A1 6/2008 He et al.
2008/0163764 A1 7/2008 Payen et al.
2008/0173631 A1 7/2008 Gagas et al.
2008/0206420 A1 8/2008 McFadden
2008/0213447 A1 9/2008 Payen et al.
2008/0216671 A1 9/2008 Chen
2008/0223224 A1 9/2008 Martin
2008/0290090 A1 11/2008 Kindler et al.
2008/0314258 A1 12/2008 Martin
2009/0011101 A1 1/2009 Doherty et al.
2009/0013988 A1 1/2009 Kim et al.
2009/0064868 A1 3/2009 Cartossi
2009/0095166 A1 4/2009 Jian
2009/0134140 A1 5/2009 Vern Der Weij
2009/0139981 A1 6/2009 Moon
2009/0223380 A1 9/2009 Van Aken
2009/0223386 A1 9/2009 Edwards
2009/0250452 A1 10/2009 Tse
2010/0089248 A1 4/2010 Jones
2010/0136194 A1 6/2010 Schutte
2010/0147159 A1 6/2010 Fossati
2010/0147824 A1 6/2010 Bonuso et al.
2010/0206289 A1 8/2010 Larsen et al.
2010/0282097 A1 11/2010 Schulte
2010/0310733 A1 12/2010 Hoffman
2011/0003048 A1 1/2011 Sugimoto et al.
2011/0095015 A1 4/2011 Kao
2011/0168158 A1 4/2011 Barkhouse
2011/0120319 A1 5/2011 Chang
2011/0126719 A1 6/2011 Valance
2011/0146653 A1 6/2011 Kitatani
2011/0147376 A1 6/2011 Ueda et al.
2011/0248020 A1 10/2011 Yuan
2011/0268153 A1 11/2011 He et al.
2012/0003364 A1 1/2012 Kling et al.
2012/0009317 A1 1/2012 McLemore
2012/0012584 A1 1/2012 Chameroy et al.
2012/0024164 A1 2/2012 Park et al.
2012/0024169 A1 2/2012 Hsu
2012/0040067 A1 2/2012 Baraille et al.
2012/0048843 A1 3/2012 Feng et al.
2012/0125313 A1 5/2012 Van Der Weij
2012/0174797 A1 7/2012 Froza
2012/0181363 A1 7/2012 Huang
2012/0192722 A1 8/2012 Foster
2012/0192726 A1 8/2012 Clearman et al.
2012/0217236 A1 8/2012 Takagi
2012/0217252 A1 8/2012 Jung
2012/0222665 A1 9/2012 Ahmed
2012/0222865 A1 9/2012 Larson et al.
2012/0318149 A1 12/2012 Ahmed
2013/0019759 A1 1/2013 Tumenbatur et al.
2013/0061765 A1 3/2013 Reinhart
2013/0074702 A1 3/2013 Difante
2013/0092145 A1 4/2013 Murphy et al.
2013/0104875 A1 5/2013 Schultz et al.
2013/0156906 A1 6/2013 Raghavan et al.
2013/0180413 A1 7/2013 Tjerkgaast et al.
2013/0180986 A1 7/2013 He et al.
2013/0196038 A1 8/2013 Liu
2013/0236614 A1 9/2013 Schandel et al.
2013/0255509 A1 10/2013 He et al.
2013/0276643 A1 10/2013 Krolick et al.
2013/0278643 A1 10/2013 Otsuka et al.
2013/0298781 A1 11/2013 Ganuza et al.
2013/0305933 A1 11/2013 Heidrich et al.
2013/0333685 A1 12/2013 Jeong et al.
2014/0021191 A1 1/2014 Moon et al.
2014/0044851 A1 2/2014 Kennedy
2014/0083306 A1 3/2014 Lee
2014/0083992 A1 3/2014 Linnewiel
2014/0102315 A1 4/2014 Park
2014/0157994 A1 6/2014 Ryan et al.
2014/0175085 A1 6/2014 Yang et al.
2014/0199454 A1 7/2014 Storek et al.
2014/0199459 A1 7/2014 Jackson et al.
2014/0201688 A1 7/2014 Guilleminot et al.
2014/0220196 A1 8/2014 Veloo
2014/0220198 A1 8/2014 Konuklar
2014/0227411 A1 8/2014 Popeil et al.
2014/0245898 A1 9/2014 Froza
2014/0246419 A1 9/2014 Li
2014/0251158 A1 9/2014 Yang et al.
2014/0251162 A1 9/2014 Zhou
2014/0311360 A1 10/2014 Bartelick et al.
2014/0318385 A1 10/2014 Kim
2014/0318386 A1 10/2014 Kim
2014/0318387 A1 10/2014 Kim
2014/0318388 A1 10/2014 Kim
2014/0318389 A1 10/2014 Kim
2014/0322417 A1 10/2014 Kim
2014/0348987 A1 11/2014 Cheng et al.
2014/0353316 A1 12/2014 Lin
2014/0360384 A1 12/2014 Kim
2014/0366746 A1 12/2014 Tsai
2014/0370176 A1 12/2014 Imura et al.
2014/0373729 A1 12/2014 Kim et al.
2014/0377417 A1 12/2014 Martinez
2015/0000535 A1 1/2015 Yoshidome et al.
2015/0028022 A1 1/2015 Moon et al.
2015/0040775 A1 2/2015 Shieh
2015/0059595 A1 3/2015 Rand et al.
2015/0083107 A1 3/2015 Busch et al.
2015/0122137 A1 5/2015 Chang
2015/0136769 A1 5/2015 Quinn et al.
2015/0173551 A1 6/2015 Carbone et al.
2015/0192289 A1 7/2015 Gattei et al.
2015/0201788 A1 7/2015 Douma et al.
2015/0201806 A1 7/2015 Yoshidome
2015/0208845 A1 7/2015 Robbins et al.
2015/0208858 A1 7/2015 Robbins et al.
2015/0223627 A1 8/2015 Li et al.
2015/0226438 A1 8/2015 Ozyurt et al.
2015/0250187 A1 9/2015 Sakane et al.
2015/0257208 A1 9/2015 Li et al.
2015/0292750 A1 10/2015 Delrue et al.
2015/0305093 A1 10/2015 Smith et al.
2015/0312964 A1 10/2015 Sorenson et al.
2015/0313399 A1 11/2015 Park
2015/0351578 A1 12/2015 Song et al.
2015/0354827 A1 12/2015 Faraldi et al.
2015/0366399 A1 12/2015 Lee
2015/0366402 A1 12/2015 Wu et al.
2016/0007644 A1 1/2016 Hack et al.
2016/0007789 A1 1/2016 Tiruvallur

(56) References Cited

U.S. PATENT DOCUMENTS

2016/0029829 A1 2/2016 Klein
2016/0033141 A1 2/2016 Rizzuto
2016/0037955 A1 2/2016 Kim
2016/0045067 A1 2/2016 Liao
2016/0051077 A1 2/2016 Sloot et al.
2016/0051078 A1 2/2016 Jenkins et al.
2016/0051086 A1 2/2016 Longhi
2016/0066738 A1 3/2016 Shibuya et al.
2016/0073814 A1 3/2016 Kiriishi et al.
2016/0081509 A1 3/2016 Delrue et al.
2016/0100707 A1 4/2016 Huang
2016/0100713 A1 4/2016 De Haas et al.
2016/0113432 A1 4/2016 Cornelissen
2016/0113442 A1 4/2016 De Haas et al.
2016/0120363 A1 5/2016 Zwanenburg et al.
2016/0120364 A1 5/2016 De Haas et al.
2016/0123660 A1 5/2016 Peng
2016/0150906 A1 6/2016 Lee et al.
2016/0165676 A1 6/2016 Imm et al.
2016/0174749 A1 6/2016 Eades et al.
2016/0174764 A1 6/2016 Xiao
2016/0174771 A1 6/2016 Benoit et al.
2016/0183722 A1 6/2016 Fisher
2016/0206139 A1 6/2016 Johnson
2016/0206140 A1 6/2016 Johnson et al.
2016/0192808 A1 7/2016 Van Der Burg et al.
2016/0198882 A1 7/2016 Linglin
2016/0198883 A1 7/2016 Wang et al.
2016/0206131 A1 7/2016 Chien
2016/0219653 A1 7/2016 Kim et al.
2016/0220057 A1 8/2016 Smith et al.
2016/0235078 A1 8/2016 Farina et al.
2016/0235239 A1 8/2016 Patadia
2016/0253080 A1 9/2016 Ban et al.
2016/0270596 A1 9/2016 Allemand et al.
2016/0278563 A1 9/2016 Choudhary
2016/0278565 A1 9/2016 Chameroy et al.
2016/0281994 A1 9/2016 Nuessler
2016/0309940 A1 10/2016 Valance et al.
2016/0309956 A1 10/2016 Glucksman
2016/0316525 A1 10/2016 Vainionpaa
2016/0316968 A1 11/2016 Linglin
2016/0324359 A1 11/2016 Aboujassoum et al.
2016/0327280 A1 11/2016 Smith et al.
2016/0345766 A1 12/2016 Sapire
2016/0353913 A1 12/2016 Chameroy et al.
2016/0353914 A1* 12/2016 Chameroy .......... A47J 27/0806
2016/0353915 A1 12/2016 Chameroy et al.
2016/0353916 A1 12/2016 Chameroy et al.
2016/0360922 A1 12/2016 Xiao et al.
2016/0367061 A1 12/2016 Chou
2016/0374510 A1 12/2016 Albizuri Landazabal
2017/0000293 A1 1/2017 Sladecek et al.
2017/0016623 A1 1/2017 Rabie et al.
2017/0020334 A1 1/2017 Sorenson et al.
2017/0055770 A1 3/2017 Case
2017/0065127 A1 3/2017 Bonaccorso
2017/0071034 A1 3/2017 Metz
2017/0079475 A1 3/2017 Buckley et al.
2017/0089590 A1 3/2017 Bruin-Slot et al.
2017/0095105 A1 4/2017 Clark et al.
2017/0099977 A1 4/2017 Liu
2017/0099984 A1 4/2017 Koetz
2017/0099990 A1 4/2017 Magnouloux et al.
2017/0099995 A1 4/2017 Magnouloux
2017/0119192 A1 5/2017 Sanserverino
2017/0127871 A1 5/2017 Leung
2017/0172335 A1* 6/2017 Colas .................. A47J 27/0815
2017/0181564 A1 6/2017 He et al.
2017/0199658 A1 7/2017 Stoufer et al.
2017/0224157 A1 8/2017 Rummel et al.
2017/0231257 A1 8/2017 Thul et al.
2017/0231415 A1 8/2017 Cheng et al.
2017/0231430 A1 8/2017 Moon et al.
2017/0245674 A1 8/2017 Imura
2017/0245683 A1 8/2017 Chen et al.
2017/0245686 A1 8/2017 Man
2017/0251872 A1 9/2017 Li et al.
2017/0251874 A1 9/2017 Sladecek
2017/0258268 A1 9/2017 Kazanas et al.
2017/0276378 A1 9/2017 Faraldi et al.
2017/0280914 A1 10/2017 Kumar et al.
2017/0290452 A1 10/2017 Guillaume et al.
2017/0295993 A1 10/2017 Li et al.
2017/0303740 A1 10/2017 Bonaccorso
2017/0319006 A1 11/2017 Niizumi
2017/0332823 A1 11/2017 Sanseverino
2017/0343221 A1 11/2017 Swayne et al.
2017/0360238 A1 12/2017 Bogazzi
2017/0360254 A1 12/2017 Muhr et al.
2017/0360255 A1 12/2017 Karau
2017/0367514 A1 12/2017 In 'T Groen et al.
2017/0370595 A1 12/2017 Yang et al.
2018/0000285 A1 1/2018 Backus et al.
2018/0007738 A1 1/2018 Knappenberger et al.
2018/0007744 A1 1/2018 Nonaka et al.
2018/0014683 A1 1/2018 Glucksman
2018/0028017 A1 2/2018 Wu
2018/0035698 A1 2/2018 McNerney et al.
2018/0070596 A1 3/2018 Kim et al.
2018/0073739 A1 3/2018 Dumenil
2018/0078089 A1 3/2018 Sauer et al.
2018/0103796 A1 4/2018 Park
2018/0110355 A1 4/2018 Huang et al.
2018/0110373 A1 4/2018 Zhang et al.
2018/0116264 A1 5/2018 De Winter et al.
2018/0116438 A1 5/2018 He et al.
2018/0125293 A1 5/2018 McNerney et al.
2018/0125294 A1 5/2018 Conte et al.
2018/0132648 A1 5/2018 Furlanetto et al.
2018/0140126 A1 5/2018 Van Dillen
2018/0143086 A1 5/2018 Stoufer et al.
2018/0146812 A1 5/2018 Choi
2018/0153329 A1 6/2018 Glucksman et al.
2018/0160840 A1 6/2018 De' Longhi
2018/0160849 A1 6/2018 Hebert, Jr. et al.
2018/0177322 A1 6/2018 Kim
2018/0177343 A1 6/2018 Bonaccorso
2018/0184843 A1 7/2018 Kim et al.
2018/0184848 A1 7/2018 De' Longhi
2018/0192825 A1 7/2018 Popeil et al.
2018/0199615 A1 7/2018 Zhang et al.
2018/0199756 A1 7/2018 Huang
2018/0206672 A1 7/2018 Grace et al.
2018/0206677 A1 7/2018 Ivarsson et al.
2018/0213965 A1 8/2018 Li
2018/0220498 A1 8/2018 Jeon et al.
2018/0220842 A1 8/2018 Delrue et al.
2018/0228318 A1 8/2018 Zwanenburg et al.
2018/0235396 A1 8/2018 Schonenberger
2018/0238560 A1 8/2018 Deng et al.
2018/0255967 A1 9/2018 Haas et al.
2018/0255971 A1 9/2018 Moon et al.
2018/0263084 A1 9/2018 Yoshino et al.
2018/0263402 A1 9/2018 Li
2018/0266697 A1 9/2018 Dash et al.
2018/0270915 A1 9/2018 Koetz
2018/0271321 A1 9/2018 Delrue et al.
2018/0271322 A1 9/2018 Thai et al.
2018/0271323 A1 9/2018 Zhang et al.
2018/0279832 A1 10/2018 Ohta et al.
2018/0289212 A1 10/2018 Sladecek et al.
2018/0296019 A1 10/2018 Kim et al.
2018/0299138 A1 10/2018 Faraldi et al.
2018/0303285 A1 10/2018 Cheng
2018/0317691 A1 11/2018 Huang
2018/0317692 A1 11/2018 Huang
2018/0317693 A1 11/2018 Huang
2018/0325311 A1 11/2018 Feldman et al.
2018/0325313 A1 11/2018 De'Longhi et al.
2018/0325318 A1 11/2018 De' Longhi et al.
2018/0325322 A1 11/2018 De'longhi et al.
2018/0328645 A1 11/2018 Wang et al.
2018/0332993 A1 11/2018 Cho et al.

(56) References Cited

U.S. PATENT DOCUMENTS

2018/0332994 A1 11/2018 Hasegawa
2018/0332999 A1 11/2018 Nie
2018/0333004 A1 11/2018 De' Longhi et al.
2018/0333005 A1 11/2018 Fritz et al.
2018/0338636 A1 11/2018 Ceccoli
2018/0340695 A1 11/2018 Park et al.
2018/0344085 A1 12/2018 Dutter
2018/0347829 A1 12/2018 Martini et al.
2018/0353007 A1 12/2018 Eberhart et al.
2018/0353010 A1 12/2018 Delrue et al.
2018/0359823 A1 12/2018 Shin et al.
2018/0363915 A1 12/2018 Bu
2018/0368615 A1 12/2018 Luo et al.
2019/0000267 A1 1/2019 Li et al.
2019/0003718 A1 1/2019 Lee et al.
2019/0008310 A1 1/2019 Kim et al.
2019/0008316 A1 1/2019 Kim et al.
2019/0014940 A1 1/2019 Cheung et al.
2019/0014943 A1 1/2019 Gill et al.
2019/0021142 A1 1/2019 Mizuta et al.
2019/0021537 A1 1/2019 Park
2019/0021546 A1 1/2019 Tan et al.
2019/0024904 A1 1/2019 Ueda et al.
2019/0029459 A1 1/2019 Gao et al.
2019/0045964 A1 2/2019 Gill et al.
2019/0045973 A1 2/2019 Gill et al.
2019/0053521 A1 2/2019 Tian et al.
2019/0053655 A1 2/2019 Panasik et al.
2019/0059627 A1 2/2019 Kitatani et al.
2019/0059628 A1 2/2019 Liu et al.
2019/0059647 A1 2/2019 Floessholzer
2019/0069706 A1 3/2019 Kim et al.
2019/0069719 A1 3/2019 Huang et al.
2019/0075956 A1* 3/2019 Bang .................... A47J 27/086
2019/0075971 A1 3/2019 Noca et al.
2019/0082876 A1 3/2019 Shi et al.
2019/0086075 A1 3/2019 Albert
2019/0099039 A1 4/2019 Li et al.
2019/0110629 A1 4/2019 Truong et al.
2019/0110638 A1 4/2019 Li et al.
2019/0110640 A1* 4/2019 Te Velde ............... F24C 15/327
2019/0117005 A1 4/2019 Kettavong et al.
2019/0120504 A1 4/2019 Lee et al.
2019/0133364 A1 5/2019 Tian et al.
2019/0137112 A1 5/2019 Lego et al.
2019/0142215 A1 5/2019 Popeil et al.
2019/0142217 A1 5/2019 Sladecek
2019/0142220 A1 5/2019 Shirali et al.
2019/0167028 A1 6/2019 Wang et al.
2019/0167038 A1 6/2019 DeLonghi et al.
2019/0170361 A1 6/2019 Ha et al.
2019/0174944 A1 6/2019 Luo et al.
2019/0174945 A1 6/2019 Oti
2019/0203944 A1 7/2019 Cho et al.
2019/0215916 A1 7/2019 Yang et al.
2019/0223658 A1 7/2019 He
2019/0231125 A1 8/2019 Gill et al.
2019/0231126 A1 8/2019 Gill et al.
2019/0231127 A1 8/2019 Gill et al.
2019/0231128 A1 8/2019 Gill et al.
2019/0231129 A1 8/2019 Gill et al.
2019/0231130 A1 8/2019 Gill et al.
2019/0231131 A1 8/2019 Gill et al.
2019/0231132 A1 8/2019 Gill et al.
2019/0231133 A1 8/2019 Gill et al.
2019/0231134 A1 8/2019 Gill et al.
2019/0231135 A1 8/2019 Gill et al.
2019/0231136 A1 8/2019 Gill et al.
2019/0231137 A1 8/2019 Gill et al.
2019/0231138 A1 8/2019 Gill et al.
2019/0231139 A1 8/2019 Gill et al.
2019/0231140 A1 8/2019 Gill et al.
2019/0231141 A1 8/2019 Gill et al.
2019/0231142 A1 8/2019 Gill et al.
2019/0231143 A1 8/2019 Gill et al.
2019/0239518 A1 8/2019 McKee et al.
2019/0246829 A1 8/2019 Zhou et al.
2019/0246830 A1 8/2019 Ametepe et al.
2019/0246835 A1 8/2019 Tsai
2019/0254473 A1 8/2019 Anthony et al.
2019/0254474 A1 8/2019 Anthony et al.
2019/0254476 A1 8/2019 Anthony et al.
2019/0269272 A1 9/2019 Itzkowitz
2019/0269276 A1 9/2019 Gvili
2019/0274461 A1 9/2019 Nichols
2019/0274462 A1 9/2019 Moon
2019/0282021 A1 9/2019 Dion et al.
2019/0282029 A1* 9/2019 Goldberg ............ A47J 37/0664
2019/0290062 A1 9/2019 Prieto et al.
2019/0290072 A1 9/2019 Prieto et al.
2019/0298100 A1 10/2019 Li et al.
2019/0309955 A1 10/2019 Castillo et al.
2019/0309956 A1 10/2019 Buschman et al.
2019/0313832 A1 10/2019 Lee et al.
2019/0313833 A1 10/2019 Li et al.
2019/0313844 A1 10/2019 Nadendla et al.
2019/0316783 A1 10/2019 Lee et al.
2019/0327979 A1 10/2019 Yang et al.
2019/0328169 A1 10/2019 Fogacci
2019/0328175 A1 10/2019 Bancroft
2019/0335934 A1 11/2019 Delrue et al.
2019/0374058 A1 12/2019 Blond et al.
2019/0374064 A1 12/2019 Gill et al.
2019/0380524 A1 12/2019 Guegan et al.
2019/0381654 A1 12/2019 Oleynik
2019/0387913 A1 12/2019 Lee et al.
2019/0387921 A1 12/2019 Lemberger et al.
2019/0387922 A1 12/2019 Jin et al.
2019/0387923 A1 12/2019 Anthony et al.
2020/0000262 A1 1/2020 Delrue et al.
2020/0008601 A1 1/2020 Cao
2020/0008616 A1 1/2020 Moon
2020/0018475 A1 1/2020 Sim et al.
2020/0029721 A1 1/2020 Kang et al.
2020/0029731 A1 1/2020 Hunt
2020/0033009 A1 1/2020 Lee et al.
2020/0046157 A1 2/2020 Leung
2020/0053842 A1 2/2020 Jeon et al.
2020/0054024 A1 2/2020 Sun et al.
2020/0060472 A1 2/2020 Gill et al.
2020/0060473 A1 2/2020 Gill et al.
2020/0069113 A1 3/2020 Anthony et al.
2020/0080726 A1 3/2020 Polster
2020/0085235 A1 3/2020 He et al.
2020/0088415 A1 3/2020 Lee et al.
2020/0088443 A1 3/2020 Williams et al.
2020/0093329 A1 3/2020 Glucksman
2020/0113380 A1 4/2020 Lu
2020/0121129 A1 4/2020 Wittig
2020/0128995 A1 4/2020 Patel et al.
2020/0128996 A1 4/2020 Qin et al.
2020/0128997 A1 4/2020 Qin et al.
2020/0128998 A1 4/2020 Qin et al.
2020/0138043 A1 5/2020 Hoerter
2020/0138229 A1 5/2020 Kweon et al.
2020/0138239 A1 5/2020 Gromowski et al.
2020/0146496 A1 5/2020 Patadia
2020/0146497 A1 5/2020 Shi et al.
2020/0170437 A1 6/2020 Anthony et al.
2020/0170438 A1 6/2020 Freymiller et al.
2020/0178583 A1 6/2020 Chen et al.
2020/0182485 A1 6/2020 Ball et al.
2020/0187315 A1 6/2020 Carcano et al.
2020/0187697 A1 6/2020 Stewart et al.
2020/0187698 A1 6/2020 Peng et al.
2020/0187710 A1 6/2020 Guo et al.
2020/0187712 A1 6/2020 Gill et al.
2020/0191404 A1 6/2020 Song
2020/0205245 A1 6/2020 Ma et al.
2020/0205595 A1 7/2020 He
2020/0214500 A1 7/2020 Popeil et al.
2020/0221900 A1 7/2020 Itzkowitz
2020/0229637 A1 7/2020 Han et al.
2020/0229638 A1 7/2020 Lu

(56) References Cited

U.S. PATENT DOCUMENTS

2020/0229640 A1 7/2020 Han et al.
2020/0240647 A1 7/2020 Itzkowitz et al.
2020/0253420 A1 8/2020 He et al.
2020/0260907 A1 8/2020 Lu et al.
2020/0268189 A1 8/2020 Anthony
2020/0278116 A1 9/2020 Kobayashi et al.
2020/0329908 A1 10/2020 Chen
2020/0329909 A1 10/2020 Conrad et al.
2020/0337497 A1 10/2020 Anthony et al.
2020/0405086 A1* 12/2020 Dos Santos ......... A47J 27/0804
2021/0000292 A1* 1/2021 Siu ...................... A47J 27/0815
2021/0000296 A1* 1/2021 Kennedy ............... A47J 27/086
2021/0038012 A1* 2/2021 Huang .................. A47J 27/086
2021/0137298 A1* 5/2021 Zakowski ............... A47J 36/32
2021/0137299 A1 5/2021 Moon et al.

FOREIGN PATENT DOCUMENTS

CN 1218653 A 6/1999
CN 2358794 Y 1/2000
CN 2389593 Y 8/2000
CN 2450993 Y 10/2001
CN 2469839 Y 1/2002
CN 2479871 Y 3/2002
CN 1139352 C 2/2004
CN 1148142 C 5/2004
CN 1158963 C 7/2004
CN 2719176 Y 8/2005
CN 1820685 A 8/2006
CN 1883351 A 12/2006
CN 2855256 Y 1/2007
CN 2904903 Y 5/2007
CN 1981682 A 6/2007
CN 1985727 A 6/2007
CN 1989884 A 7/2007
CN 100998476 A 7/2007
CN 101023842 A 8/2007
CN 101053485 A 10/2007
CN 200987595 Y 12/2007
CN 101099635 A 1/2008
CN 101108064 A 1/2008
CN 101112291 A 1/2008
CN 101112292 A 1/2008
CN 101112293 A 1/2008
CN 101142448 A 3/2008
CN 101185556 A 5/2008
CN 100401957 C 7/2008
CN 101209179 A 7/2008
CN 101209180 A 7/2008
CN 201079267 Y 7/2008
CN 100425186 C 10/2008
CN 100428906 C 10/2008
CN 101273834 A 10/2008
CN 201139427 Y 10/2008
CN 101322614 A 12/2008
CN 201197609 Y 2/2009
CN 100464682 C 3/2009
CN 100469289 C 3/2009
CN 201207144 Y 3/2009
CN 101432608 A 5/2009
CN 101438929 A 5/2009
CN 100496350 C 6/2009
CN 100522018 C 8/2009
CN 100531628 C 8/2009
CN 100534363 C 9/2009
CN 101518409 A 9/2009
CN 100559999 C 11/2009
CN 201365839 Y 12/2009
CN 100588351 C 2/2010
CN 101669761 A 3/2010
CN 101766439 A 7/2010
CN 101766443 A 7/2010
CN 101791190 A 8/2010
CN 101828856 A 9/2010
CN 101856086 A 10/2010
CN 201602600 U 10/2010
CN 201624512 U 11/2010
CN 101936550 A 1/2011
CN 101940273 A 1/2011
CN 101420893 B 2/2011
CN 101977536 A 2/2011
CN 201888709 U 7/2011
CN 201929758 U 8/2011
CN 201948771 U 8/2011
CN 102178443 A 9/2011
CN 102178445 A 9/2011
CN 102178464 A 9/2011
CN 201958652 U 9/2011
CN 201996364 U 10/2011
CN 101305890 B 11/2011
CN 102240164 A 11/2011
CN 102307500 A 1/2012
CN 102313306 A 2/2012
CN 102349791 A 2/2012
CN 202151310 U 2/2012
CN 102368936 A 3/2012
CN 202184614 U 4/2012
CN 101692958 B 5/2012
CN 202207075 U 5/2012
CN 202234720 U 5/2012
CN 202234761 U 5/2012
CN 202312830 U 7/2012
CN 202312886 U 7/2012
CN 102670079 A 9/2012
CN 202408428 U 9/2012
CN 202408455 U 9/2012
CN 102755120 A 10/2012
CN 102824120 A 12/2012
CN 202619362 U 12/2012
CN 102100481 B 1/2013
CN 102883641 A 1/2013
CN 202636678 U 1/2013
CN 202698888 U 1/2013
CN 103006045 A 4/2013
CN 103006092 A 4/2013
CN 202858889 U 4/2013
CN 103142128 A 6/2013
CN 103142151 A 6/2013
CN 103169371 A 6/2013
CN 103179884 A 6/2013
CN 202960194 U 6/2013
CN 202981682 U 6/2013
CN 203000535 U 6/2013
CN 103188947 A 7/2013
CN 103188970 A 7/2013
CN 103220947 A 7/2013
CN 103222807 A 7/2013
CN 203041954 U 7/2013
CN 203041955 U 7/2013
CN 102342739 B 8/2013
CN 203122175 U 8/2013
CN 103299132 A 9/2013
CN 203195497 U 9/2013
CN 203195499 U 9/2013
CN 103375826 A 10/2013
CN 203234602 U 10/2013
CN 203234613 U 10/2013
CN 102319018 B 11/2013
CN 203302862 U 11/2013
CN 203302892 U 11/2013
CN 103445669 A 12/2013
CN 102397005 B 1/2014
CN 103491830 A 1/2014
CN 203407931 U 1/2014
CN 103649643 A 3/2014
CN 203483269 U 3/2014
CN 103750730 A 4/2014
CN 203539138 U 4/2014
CN 203597771 U 5/2014
CN 203597772 U 5/2014
CN 203615383 U 5/2014
CN 203634023 U 6/2014
CN 203647141 U 6/2014
CN 203662545 U 6/2014

(56) References Cited

FOREIGN PATENT DOCUMENTS

| | | | |
|---|---|---|---|
| CN | 103892696 | A | 7/2014 |
| CN | 103948308 | A | 7/2014 |
| CN | 203693372 | U | 7/2014 |
| CN | 203723888 | U | 7/2014 |
| CN | 104000478 | A | 8/2014 |
| CN | 203762926 | U | 8/2014 |
| CN | 203776718 | U | 8/2014 |
| CN | 203776719 | U | 8/2014 |
| CN | 203776729 | U | 8/2014 |
| CN | 203789747 | U | 8/2014 |
| CN | 203828675 | U | 9/2014 |
| CN | 104068757 | B | 10/2014 |
| CN | 203873601 | U | 10/2014 |
| CN | 203873602 | U | 10/2014 |
| CN | 203885286 | U | 10/2014 |
| CN | 203885342 | U | 10/2014 |
| CN | 104138200 | A | 11/2014 |
| CN | 203914511 | U | 11/2014 |
| CN | 203953373 | U | 11/2014 |
| CN | 203970073 | U | 12/2014 |
| CN | 203970160 | U | 12/2014 |
| CN | 203987492 | U | 12/2014 |
| CN | 203987520 | U | 12/2014 |
| CN | 203987550 | U | 12/2014 |
| CN | 203987551 | U | 12/2014 |
| CN | 204015964 | U | 12/2014 |
| CN | 204016055 | U | 12/2014 |
| CN | 204016056 | U | 12/2014 |
| CN | 204049362 | U | 12/2014 |
| CN | 204091768 | U | 1/2015 |
| CN | 104323708 | A | 2/2015 |
| CN | 104337407 | A | 2/2015 |
| CN | 104367182 | A | 2/2015 |
| CN | 204133165 | U | 2/2015 |
| CN | 204133291 | U | 2/2015 |
| CN | 204158183 | U | 2/2015 |
| CN | 104433841 | A | 3/2015 |
| CN | 204192406 | U | 3/2015 |
| CN | 104490294 | A | 4/2015 |
| CN | 102917623 | B | 5/2015 |
| CN | 104586233 | A | 5/2015 |
| CN | 104613515 | A | 5/2015 |
| CN | 104622274 | A | 5/2015 |
| CN | 104676681 | A | 6/2015 |
| CN | 104688019 | A | 6/2015 |
| CN | 104706212 | A | 6/2015 |
| CN | 103284618 | B | 7/2015 |
| CN | 104754992 | A | 7/2015 |
| CN | 104757872 | A | 7/2015 |
| CN | 204427799 | | 7/2015 |
| CN | 204427801 | U | 7/2015 |
| CN | 204467861 | U | 7/2015 |
| CN | 204500391 | U | 7/2015 |
| CN | 104814665 | A | 8/2015 |
| CN | 104856561 | A | 8/2015 |
| CN | 104856563 | A | 8/2015 |
| CN | 204520386 | U | 8/2015 |
| CN | 204580991 | U | 8/2015 |
| CN | 104873098 | A | 9/2015 |
| CN | 104887063 | A | 9/2015 |
| CN | 204636063 | U | 9/2015 |
| CN | 104983318 | A | 10/2015 |
| CN | 104997394 | A | 10/2015 |
| CN | 204697804 | U | 10/2015 |
| CN | 105011741 | A | 11/2015 |
| CN | 105030035 | A | 11/2015 |
| CN | 105054772 | B | 11/2015 |
| CN | 105054773 | B | 11/2015 |
| CN | 204734374 | U | 11/2015 |
| CN | 204743846 | U | 11/2015 |
| CN | 204765165 | U | 11/2015 |
| CN | 204765167 | U | 11/2015 |
| CN | 204765168 | U | 11/2015 |
| CN | 204765197 | U | 11/2015 |
| CN | 204797615 | U | 11/2015 |
| CN | 204797616 | U | 11/2015 |
| CN | 103813738 | B | 12/2015 |
| CN | 105105624 | A | 12/2015 |
| CN | 105105626 | A | 12/2015 |
| CN | 105167591 | B | 12/2015 |
| CN | 105167592 | A | 12/2015 |
| CN | 105193301 | A | 12/2015 |
| CN | 204813499 | U | 12/2015 |
| CN | 204839219 | U | 12/2015 |
| CN | 204889693 | U | 12/2015 |
| CN | 105212693 | B | 1/2016 |
| CN | 105212730 | A | 1/2016 |
| CN | 105231802 | A | 1/2016 |
| CN | 105231811 | A | 1/2016 |
| CN | 105231812 | A | 1/2016 |
| CN | 105231813 | A | 1/2016 |
| CN | 105266565 | A | 1/2016 |
| CN | 105266577 | A | 1/2016 |
| CN | 204995259 | U | 1/2016 |
| CN | 105286491 | A | 2/2016 |
| CN | 105286496 | A | 2/2016 |
| CN | 105286498 | A | 2/2016 |
| CN | 105286627 | A | 2/2016 |
| CN | 105326332 | A | 2/2016 |
| CN | 105342454 | A | 2/2016 |
| CN | 205018872 | U | 2/2016 |
| CN | 205018878 | U | 2/2016 |
| CN | 105380512 | A | 3/2016 |
| CN | 105380513 | A | 3/2016 |
| CN | 105380514 | A | 3/2016 |
| CN | 105411378 | A | 3/2016 |
| CN | 105411379 | A | 3/2016 |
| CN | 105433778 | A | 3/2016 |
| CN | 105433779 | A | 3/2016 |
| CN | 105451610 | A | 3/2016 |
| CN | 205053851 | U | 3/2016 |
| CN | 105455628 | A | 4/2016 |
| CN | 105455664 | A | 4/2016 |
| CN | 105455671 | A | 4/2016 |
| CN | 105476461 | A | 4/2016 |
| CN | 105476464 | A | 4/2016 |
| CN | 105476472 | A | 4/2016 |
| CN | 105476491 | A | 4/2016 |
| CN | 105496184 | A | 4/2016 |
| CN | 105496185 | A | 4/2016 |
| CN | 105496224 | A | 4/2016 |
| CN | 205126014 | U | 4/2016 |
| CN | 105534269 | A | 5/2016 |
| CN | 105559571 | A | 5/2016 |
| CN | 105595792 | A | 5/2016 |
| CN | 105595802 | A | 5/2016 |
| CN | 105595803 | A | 5/2016 |
| CN | 205197727 | U | 5/2016 |
| CN | 205214967 | U | 5/2016 |
| CN | 205215045 | U | 5/2016 |
| CN | 102440681 | B | 6/2016 |
| CN | 102783908 | B | 6/2016 |
| CN | 103648337 | B | 6/2016 |
| CN | 105615638 | A | 6/2016 |
| CN | 105615639 | A | 6/2016 |
| CN | 105615686 | A | 6/2016 |
| CN | 105640299 | A | 6/2016 |
| CN | 105640302 | A | 6/2016 |
| CN | 105640309 | A | 6/2016 |
| CN | 105640351 | A | 6/2016 |
| CN | 105662112 | A | 6/2016 |
| CN | 105662125 | A | 6/2016 |
| CN | 105662126 | A | 6/2016 |
| CN | 105662127 | A | 6/2016 |
| CN | 105708312 | A | 6/2016 |
| CN | 205286098 | U | 6/2016 |
| CN | 205322075 | U | 6/2016 |
| CN | 104605727 | B | 7/2016 |
| CN | 105725730 | A | 7/2016 |
| CN | 105725829 | A | 7/2016 |
| CN | 105768844 | A | 7/2016 |
| CN | 105768859 | A | 7/2016 |
| CN | 105768860 | A | 7/2016 |
| CN | 103908166 | B | 8/2016 |

(56) References Cited

FOREIGN PATENT DOCUMENTS

CN 105816023 A 8/2016
CN 105832176 A 8/2016
CN 105852667 A 8/2016
CN 105852668 A 8/2016
CN 105902144 A 8/2016
CN 105902150 A 8/2016
CN 205410811 U 8/2016
CN 205425108 U 8/2016
CN 205433281 U 8/2016
CN 205433317 U 8/2016
CN 205433320 U 8/2016
CN 205493513 U 8/2016
CN 205493586 U 8/2016
CN 205493593 U 8/2016
CN 105919411 A 9/2016
CN 105919417 A 9/2016
CN 105935244 A 9/2016
CN 105935258 A 9/2016
CN 105972653 A 9/2016
CN 205568641 U 9/2016
CN 205568772 U 9/2016
CN 205597052 U 9/2016
CN 105982529 A 10/2016
CN 105982532 A 10/2016
CN 105996737 A 10/2016
CN 105996748 A 10/2016
CN 105996752 A 10/2016
CN 105996753 A 10/2016
CN 106037448 A 10/2016
CN 106037457 A 10/2016
CN 106037458 A 10/2016
CN 106073481 A 11/2016
CN 106073517 A 11/2016
CN 106073519 A 11/2016
CN 106108627 A 11/2016
CN 106108630 A 11/2016
CN 106108631 A 11/2016
CN 106108697 B 11/2016
CN 106166030 A 11/2016
CN 205671926 U 11/2016
CN 205671927 U 11/2016
CN 106175412 A 12/2016
CN 106175476 A 12/2016
CN 106175477 A 12/2016
CN 106213979 A 12/2016
CN 106235878 A 12/2016
CN 106235892 A 12/2016
CN 106235893 A 12/2016
CN 205831638 U 12/2016
CN 205831665 U 12/2016
CN 106264085 A 1/2017
CN 106264095 A 1/2017
CN 106292340 1/2017
CN 106343895 A 1/2017
CN 205849309 U 1/2017
CN 205860134 U 1/2017
CN 106377158 A 2/2017
CN 106377159 A 2/2017
CN 106377165 A 2/2017
CN 106388565 A 2/2017
CN 106388572 A 2/2017
CN 106419486 A 2/2017
CN 106419521 A 2/2017
CN 106419524 A 2/2017
CN 106419618 B 2/2017
CN 106419620 A 2/2017
CN 205923803 U 2/2017
CN 102805554 B 3/2017
CN 106473623 A 3/2017
CN 106490967 A 3/2017
CN 106510449 A 3/2017
CN 206007050 U 3/2017
CN 206026097 U 3/2017
CN 206026100 U 3/2017
CN 206044349 U 3/2017
CN 206044409 U 3/2017
CN 106551617 A 4/2017
CN 106575469 A 4/2017
CN 106580074 A 4/2017
CN 206062888 U 4/2017
CN 206062947 U 4/2017
CN 206102391 U 4/2017
CN 206119969 U 4/2017
CN 206119971 U 4/2017
CN 106618154 A 5/2017
CN 106618156 A 5/2017
CN 106667244 A 5/2017
CN 106691171 A 5/2017
CN 206166699 U 5/2017
CN 206166710 U 5/2017
CN 206166711 U 5/2017
CN 206166726 U 5/2017
CN 206183062 U 5/2017
CN 106802584 A 6/2017
CN 106805744 A 6/2017
CN 106805746 A 6/2017
CN 106805747 A 6/2017
CN 106805749 A 6/2017
CN 106805750 A 6/2017
CN 106805752 A 6/2017
CN 106820951 A 6/2017
CN 106820954 A 6/2017
CN 106821017 A 6/2017
CN 106852641 A 6/2017
CN 106859298 A 6/2017
CN 106889875 6/2017
CN 106889876 A 6/2017
CN 106901591 A 6/2017
CN 106901592 A 6/2017
CN 206239100 U 6/2017
CN 206252365 U 6/2017
CN 206261486 U 6/2017
CN 206261487 U 6/2017
CN 206284788 U 6/2017
CN 206284794 U 6/2017
CN 106913201 A 7/2017
CN 106923655 A 7/2017
CN 106943000 A 7/2017
CN 106943002 A 7/2017
CN 106955017 A 7/2017
CN 106974548 A 7/2017
CN 106983360 A 7/2017
CN 206303774 U 7/2017
CN 206324671 U 7/2017
CN 106993928 A 8/2017
CN 106998961 A 8/2017
CN 107019418 A 8/2017
CN 107019419 A 8/2017
CN 107019420 A 8/2017
CN 107019423 A 8/2017
CN 107048976 A 8/2017
CN 107048991 A 8/2017
CN 107048993 A 8/2017
CN 107049054 A 8/2017
CN 107049058 A 8/2017
CN 107065634 B 8/2017
CN 107105914 A 8/2017
CN 206371913 U 8/2017
CN 206371926 U 8/2017
CN 206371930 U 8/2017
CN 206371931 U 8/2017
CN 206381064 U 8/2017
CN 206414178 U 8/2017
CN 104334066 B 9/2017
CN 107136910 A 9/2017
CN 107136911 A 9/2017
CN 107149395 A 9/2017
CN 107149398 A 9/2017
CN 107684357 A 9/2017
CN 206453694 U 9/2017
CN 206469994 U 9/2017
CN 206518479 U 9/2017
CN 105142473 B 10/2017
CN 107224188 A 10/2017

(56) References Cited

FOREIGN PATENT DOCUMENTS

| | | | |
|---|---|---|---|
| CN | 107224197 | A | 10/2017 |
| CN | 107232962 | A | 10/2017 |
| CN | 107259978 | A | 10/2017 |
| CN | 107290094 | A | 10/2017 |
| CN | 107296485 | A | 10/2017 |
| CN | 107296486 | A | 10/2017 |
| CN | 107296487 | A | 10/2017 |
| CN | 107296488 | A | 10/2017 |
| CN | 107296489 | A | 10/2017 |
| CN | 107296490 | A | 10/2017 |
| CN | 107296493 | A | 10/2017 |
| CN | 107296494 | A | 10/2017 |
| CN | 206560353 | U | 10/2017 |
| CN | 206560354 | U | 10/2017 |
| CN | 206560359 | U | 10/2017 |
| CN | 206560361 | U | 10/2017 |
| CN | 104643954 | B | 11/2017 |
| CN | 107307729 | A | 11/2017 |
| CN | 107307730 | A | 11/2017 |
| CN | 107334388 | A | 11/2017 |
| CN | 107361637 | A | 11/2017 |
| CN | 107397431 | A | 11/2017 |
| CN | 206603656 | U | 11/2017 |
| CN | 107411540 | A | 12/2017 |
| CN | 107411542 | A | 12/2017 |
| CN | 107432668 | A | 12/2017 |
| CN | 107440490 | A | 12/2017 |
| CN | 107468052 | A | 12/2017 |
| CN | 107495849 | A | 12/2017 |
| CN | 107495856 | A | 12/2017 |
| CN | 107510356 | A | 12/2017 |
| CN | 107510379 | A | 12/2017 |
| CN | 206687606 | U | 12/2017 |
| CN | 206687631 | U | 12/2017 |
| CN | 206700038 | U | 12/2017 |
| CN | 206777230 | U | 12/2017 |
| CN | 206807803 | U | 12/2017 |
| CN | 206807804 | U | 12/2017 |
| CN | 106213986 | B | 1/2018 |
| CN | 107550250 | A | 1/2018 |
| CN | 107550258 | A | 1/2018 |
| CN | 107595153 | A | 1/2018 |
| CN | 107616686 | A | 1/2018 |
| CN | 206867128 | U | 1/2018 |
| CN | 107647763 | A | 2/2018 |
| CN | 107647769 | A | 2/2018 |
| CN | 107647771 | A | 2/2018 |
| CN | 107647772 | A | 2/2018 |
| CN | 107647773 | A | 2/2018 |
| CN | 107647777 | A | 2/2018 |
| CN | 107660996 | A | 2/2018 |
| CN | 107660997 | A | 2/2018 |
| CN | 107684336 | A | 2/2018 |
| CN | 107684337 | A | 2/2018 |
| CN | 107684338 | A | 2/2018 |
| CN | 107684339 | A | 2/2018 |
| CN | 107684340 | A | 2/2018 |
| CN | 107684341 | A | 2/2018 |
| CN | 107684342 | A | 2/2018 |
| CN | 107692806 | A | 2/2018 |
| CN | 107702838 | A | 2/2018 |
| CN | 107713732 | A | 2/2018 |
| CN | 107713733 | A | 2/2018 |
| CN | 107713734 | A | 2/2018 |
| CN | 107713774 | A | 2/2018 |
| CN | 107726388 | A | 2/2018 |
| CN | 106419522 | B | 3/2018 |
| CN | 107752726 | A | 3/2018 |
| CN | 107752748 | A | 3/2018 |
| CN | 107752751 | A | 3/2018 |
| CN | 107752752 | | 3/2018 |
| CN | 107752788 | A | 3/2018 |
| CN | 107773021 | A | 3/2018 |
| CN | 107773026 | A | 3/2018 |
| CN | 107773029 | A | 3/2018 |
| CN | 107773090 | A | 3/2018 |
| CN | 107788820 | A | 3/2018 |
| CN | 107788827 | A | 3/2018 |
| CN | 107811499 | A | 3/2018 |
| CN | 107811517 | A | 3/2018 |
| CN | 107811518 | A | 3/2018 |
| CN | 107822492 | A | 3/2018 |
| CN | 107822494 | A | 3/2018 |
| CN | 107822496 | A | 3/2018 |
| CN | 107822524 | A | 3/2018 |
| CN | 107836981 | A | 3/2018 |
| CN | 107836986 | A | 3/2018 |
| CN | 107836988 | A | 3/2018 |
| CN | 207084680 | U | 3/2018 |
| CN | 207101150 | U | 3/2018 |
| CN | 107874584 | A | 4/2018 |
| CN | 107874599 | A | 4/2018 |
| CN | 107874601 | A | 4/2018 |
| CN | 107874602 | A | 4/2018 |
| CN | 107898351 | A | 4/2018 |
| CN | 107928388 | A | 4/2018 |
| CN | 107928395 | A | 4/2018 |
| CN | 107951369 | A | 4/2018 |
| CN | 107951376 | A | 4/2018 |
| CN | 107951407 | A | 4/2018 |
| CN | 207202762 | U | 4/2018 |
| CN | 207253261 | U | 4/2018 |
| CN | 107969907 | A | 5/2018 |
| CN | 107969908 | A | 5/2018 |
| CN | 107981713 | A | 5/2018 |
| CN | 107997571 | A | 5/2018 |
| CN | 108013742 | A | 5/2018 |
| CN | 108013743 | A | 5/2018 |
| CN | 108030404 | A | 5/2018 |
| CN | 108041976 | A | 5/2018 |
| CN | 108056670 | A | 5/2018 |
| CN | 108078373 | A | 5/2018 |
| CN | 207355971 | U | 5/2018 |
| CN | 108095570 | A | 6/2018 |
| CN | 108113501 | A | 6/2018 |
| CN | 108143256 | A | 6/2018 |
| CN | 108143259 | A | 6/2018 |
| CN | 108143260 | A | 6/2018 |
| CN | 108143261 | A | 6/2018 |
| CN | 108143262 | A | 6/2018 |
| CN | 108143263 | A | 6/2018 |
| CN | 108143264 | A | 6/2018 |
| CN | 108158418 | A | 6/2018 |
| CN | 108158429 | A | 6/2018 |
| CN | 108201338 | A | 6/2018 |
| CN | 108209547 | A | 6/2018 |
| CN | 207429001 | U | 6/2018 |
| CN | 207492655 | U | 6/2018 |
| CN | 207506440 | U | 6/2018 |
| CN | 104207651 | B | 7/2018 |
| CN | 106175423 | A | 7/2018 |
| CN | 108244994 | A | 7/2018 |
| CN | 108244995 | A | 7/2018 |
| CN | 108244997 | A | 7/2018 |
| CN | 108244998 | A | 7/2018 |
| CN | 108244999 | A | 7/2018 |
| CN | 108245000 | A | 7/2018 |
| CN | 108245032 | A | 7/2018 |
| CN | 108261055 | A | 7/2018 |
| CN | 108261056 | A | 7/2018 |
| CN | 108261061 | A | 7/2018 |
| CN | 108272336 | A | 7/2018 |
| CN | 108272338 | A | 7/2018 |
| CN | 108294615 | A | 7/2018 |
| CN | 108294616 | A | 7/2018 |
| CN | 108294640 | A | 7/2018 |
| CN | 108309035 | A | 7/2018 |
| CN | 108324096 | A | 7/2018 |
| CN | 207575048 | U | 7/2018 |
| CN | 207604862 | U | 7/2018 |
| CN | 207627123 | U | 7/2018 |
| CN | 207627136 | U | 7/2018 |
| CN | 207640235 | U | 7/2018 |
| CN | 106388570 | B | 8/2018 |

(56) References Cited

FOREIGN PATENT DOCUMENTS

| | | | |
|---|---|---|---|
| CN | 106419517 | B | 8/2018 |
| CN | 108354444 | A | 8/2018 |
| CN | 108354466 | A | 8/2018 |
| CN | 108378678 | A | 8/2018 |
| CN | 108378690 | A | 8/2018 |
| CN | 108402888 | A | 8/2018 |
| CN | 108402889 | A | 8/2018 |
| CN | 108402891 | A | 8/2018 |
| CN | 108402920 | A | 8/2018 |
| CN | 108420304 | A | 8/2018 |
| CN | 108433517 | A | 8/2018 |
| CN | 108433529 | A | 8/2018 |
| CN | 108451351 | A | 8/2018 |
| CN | 108451388 | A | 8/2018 |
| CN | 108464732 | A | 8/2018 |
| CN | 207745052 | U | 8/2018 |
| CN | 207754989 | U | 8/2018 |
| CN | 207755036 | U | 8/2018 |
| CN | 106539491 | B | 9/2018 |
| CN | 107019415 | B | 9/2018 |
| CN | 107019416 | B | 9/2018 |
| CN | 108477987 | A | 9/2018 |
| CN | 108497908 | A | 9/2018 |
| CN | 108497914 | A | 9/2018 |
| CN | 108497918 | A | 9/2018 |
| CN | 108497942 | A | 9/2018 |
| CN | 108523645 | A | 9/2018 |
| CN | 108523647 | A | 9/2018 |
| CN | 108523649 | A | 9/2018 |
| CN | 108542272 | A | 9/2018 |
| CN | 108552969 | A | 9/2018 |
| CN | 108552989 | A | 9/2018 |
| CN | 108567309 | A | 9/2018 |
| CN | 108567321 | A | 9/2018 |
| CN | 108567322 | A | 9/2018 |
| CN | 108577514 | A | 9/2018 |
| CN | 108577580 | A | 9/2018 |
| CN | 207804077 | U | 9/2018 |
| CN | 207804095 | U | 9/2018 |
| CN | 207855533 | U | 9/2018 |
| CN | 207855579 | U | 9/2018 |
| CN | 106264094 | B | 10/2018 |
| CN | 108606627 | A | 10/2018 |
| CN | 108618592 | A | 10/2018 |
| CN | 108618593 | A | 10/2018 |
| CN | 108618594 | A | 10/2018 |
| CN | 108618595 | A | 10/2018 |
| CN | 108618597 | A | 10/2018 |
| CN | 108618651 | A | 10/2018 |
| CN | 108634771 | A | 10/2018 |
| CN | 108634777 | A | 10/2018 |
| CN | 108634807 | A | 10/2018 |
| CN | 108652431 | A | 10/2018 |
| CN | 108652432 | A | 10/2018 |
| CN | 108670021 | A | 10/2018 |
| CN | 108670023 | A | 10/2018 |
| CN | 108670048 | A | 10/2018 |
| CN | 108703644 | A | 10/2018 |
| CN | 108703645 | A | 10/2018 |
| CN | 108703675 | A | 10/2018 |
| CN | 207940738 | U | 10/2018 |
| CN | 207940739 | U | 10/2018 |
| CN | 207940743 | U | 10/2018 |
| CN | 207940754 | U | 10/2018 |
| CN | 106580073 | B | 11/2018 |
| CN | 108720548 | A | 11/2018 |
| CN | 108720577 | A | 11/2018 |
| CN | 108720581 | A | 11/2018 |
| CN | 108720584 | A | 11/2018 |
| CN | 108720585 | A | 11/2018 |
| CN | 108720586 | A | 11/2018 |
| CN | 108720633 | A | 11/2018 |
| CN | 108720650 | A | 11/2018 |
| CN | 108732958 | A | 11/2018 |
| CN | 108771466 | A | 11/2018 |
| CN | 108771488 | A | 11/2018 |
| CN | 108771489 | A | 11/2018 |
| CN | 108784323 | A | 11/2018 |
| CN | 108784324 | A | 11/2018 |
| CN | 108784330 | A | 11/2018 |
| CN | 108784401 | A | 11/2018 |
| CN | 108814274 | A | 11/2018 |
| CN | 108836104 | A | 11/2018 |
| CN | 108836105 | A | 11/2018 |
| CN | 108836107 | A | 11/2018 |
| CN | 108836108 | A | 11/2018 |
| CN | 108836131 | A | 11/2018 |
| CN | 108851966 | A | 11/2018 |
| CN | 108851969 | A | 11/2018 |
| CN | 108888087 | A | 11/2018 |
| CN | 108888099 | A | 11/2018 |
| CN | 108903620 | A | 11/2018 |
| CN | 108903621 | A | 11/2018 |
| CN | 208031026 | U | 11/2018 |
| CN | 208031027 | U | 11/2018 |
| CN | 208031028 | U | 11/2018 |
| CN | 208081098 | U | 11/2018 |
| CN | 208081104 | U | 11/2018 |
| CN | 208081108 | U | 11/2018 |
| CN | 106419520 | B | 12/2018 |
| CN | 106419526 | B | 12/2018 |
| CN | 108926239 | A | 12/2018 |
| CN | 108926249 | A | 12/2018 |
| CN | 108937520 | A | 12/2018 |
| CN | 108937525 | A | 12/2018 |
| CN | 108937556 | A | 12/2018 |
| CN | 108937558 | A | 12/2018 |
| CN | 108937559 | A | 12/2018 |
| CN | 108937560 | A | 12/2018 |
| CN | 108937629 | A | 12/2018 |
| CN | 108955959 | A | 12/2018 |
| CN | 108968659 | A | 12/2018 |
| CN | 108968660 | A | 12/2018 |
| CN | 108968662 | A | 12/2018 |
| CN | 108968663 | A | 12/2018 |
| CN | 108968667 | A | 12/2018 |
| CN | 108968668 | A | 12/2018 |
| CN | 108968669 | A | 12/2018 |
| CN | 108991918 | A | 12/2018 |
| CN | 108991919 | A | 12/2018 |
| CN | 109008595 | A | 12/2018 |
| CN | 109008597 | A | 12/2018 |
| CN | 109008598 | A | 12/2018 |
| CN | 109008663 | A | 12/2018 |
| CN | 109008669 | A | 12/2018 |
| CN | 109077624 | A | 12/2018 |
| CN | 208192913 | U | 12/2018 |
| CN | 208192914 | U | 12/2018 |
| CN | 208192915 | U | 12/2018 |
| CN | 208192916 | U | 12/2018 |
| CN | 208192917 | U | 12/2018 |
| CN | 208192920 | U | 12/2018 |
| CN | 208192921 | U | 12/2018 |
| CN | 208211922 | U | 12/2018 |
| CN | 208228802 | U | 12/2018 |
| CN | 208259529 | U | 12/2018 |
| CN | 106562666 | B | 1/2019 |
| CN | 106606293 | B | 1/2019 |
| CN | 106724784 | B | 1/2019 |
| CN | 106820956 | B | 1/2019 |
| CN | 106820957 | B | 1/2019 |
| CN | 107019417 | B | 1/2019 |
| CN | 109106231 | A | 1/2019 |
| CN | 109247837 | A | 1/2019 |
| CN | 109276159 | A | 1/2019 |
| CN | 208300842 | U | 1/2019 |
| CN | 208319025 | U | 1/2019 |
| CN | 208319027 | U | 1/2019 |
| CN | 208371607 | U | 1/2019 |
| CN | 208435215 | U | 1/2019 |
| CN | 109363520 | A | 2/2019 |
| CN | 208463763 | U | 2/2019 |
| CN | 208510802 | U | 2/2019 |
| CN | 106388566 | B | 3/2019 |

(56) References Cited

FOREIGN PATENT DOCUMENTS

| | | |
|---|---|---|
| CN | 107174116 B | 3/2019 |
| CN | 107174117 B | 3/2019 |
| CN | 109393956 A | 3/2019 |
| CN | 109393957 A | 3/2019 |
| CN | 109393958 A | 3/2019 |
| CN | 109394005 A | 3/2019 |
| CN | 109419298 A | 3/2019 |
| CN | 109419319 A | 3/2019 |
| CN | 109419327 A | 3/2019 |
| CN | 109419328 A | 3/2019 |
| CN | 109419329 A | 3/2019 |
| CN | 109419330 A | 3/2019 |
| CN | 109419331 A | 3/2019 |
| CN | 109419332 A | 3/2019 |
| CN | 109419333 A | 3/2019 |
| CN | 109419334 A | 3/2019 |
| CN | 109419335 A | 3/2019 |
| CN | 109419336 A | 3/2019 |
| CN | 109427506 A | 3/2019 |
| CN | 109431233 A | 3/2019 |
| CN | 109431254 A | 3/2019 |
| CN | 109431255 A | 3/2019 |
| CN | 109431257 A | 3/2019 |
| CN | 109431258 A | 3/2019 |
| CN | 109452851 A | 3/2019 |
| CN | 109452852 A | 3/2019 |
| CN | 109452854 A | 3/2019 |
| CN | 109452857 A | 3/2019 |
| CN | 109452875 A | 3/2019 |
| CN | 109459181 A | 3/2019 |
| CN | 109463998 A | 3/2019 |
| CN | 109463999 A | 3/2019 |
| CN | 109464000 A | 3/2019 |
| CN | 109464001 A | 3/2019 |
| CN | 109480604 A | 3/2019 |
| CN | 109480605 A | 3/2019 |
| CN | 109480614 A | 3/2019 |
| CN | 109497826 A | 3/2019 |
| CN | 109497827 A | 3/2019 |
| CN | 109512275 A | 3/2019 |
| CN | 109512276 A | 3/2019 |
| CN | 109527982 A | 3/2019 |
| CN | 109527983 A | 3/2019 |
| CN | 208551168 U | 3/2019 |
| CN | 208551408 U | 3/2019 |
| CN | 208610644 U | 3/2019 |
| CN | 208610659 U | 3/2019 |
| CN | 208625445 U | 3/2019 |
| CN | 109549449 A | 4/2019 |
| CN | 109549466 A | 4/2019 |
| CN | 109549468 A | 4/2019 |
| CN | 109549469 A | 4/2019 |
| CN | 109549470 A | 4/2019 |
| CN | 109556147 A | 4/2019 |
| CN | 109567553 A | 4/2019 |
| CN | 109567575 A | 4/2019 |
| CN | 109567576 A | 4/2019 |
| CN | 109567577 A | 4/2019 |
| CN | 109567579 A | 4/2019 |
| CN | 109567582 A | 4/2019 |
| CN | 109567583 A | 4/2019 |
| CN | 109567610 A | 4/2019 |
| CN | 109567612 A | 4/2019 |
| CN | 109567619 A | 4/2019 |
| CN | 109588972 A | 4/2019 |
| CN | 109588973 A | 4/2019 |
| CN | 109589011 A | 4/2019 |
| CN | 109602265 A | 4/2019 |
| CN | 109602274 A | 4/2019 |
| CN | 109605463 A | 4/2019 |
| CN | 109619970 A | 4/2019 |
| CN | 109662607 A | 4/2019 |
| CN | 109674341 A | 4/2019 |
| CN | 109674342 A | 4/2019 |
| CN | 109674357 A | 4/2019 |
| CN | 109681927 A | 4/2019 |
| CN | 109691855 A | 4/2019 |
| CN | 109691858 A | 4/2019 |
| CN | 109691863 A | 4/2019 |
| CN | 109691875 A | 4/2019 |
| CN | 109691878 A | 4/2019 |
| CN | 109691880 A | 4/2019 |
| CN | 109691882 A | 4/2019 |
| CN | 109691905 A | 4/2019 |
| CN | 109694242 A | 4/2019 |
| CN | 109696196 A | 4/2019 |
| CN | 208709591 U | 4/2019 |
| CN | 208740748 U | 4/2019 |
| CN | 208755746 U | 4/2019 |
| CN | 208755752 U | 4/2019 |
| CN | 208755753 U | 4/2019 |
| CN | 208755759 U | 4/2019 |
| CN | 208784365 U | 4/2019 |
| CN | 109744849 A | 5/2019 |
| CN | 109793430 A | 5/2019 |
| CN | 109820432 A | 5/2019 |
| CN | 208808155 U | 5/2019 |
| CN | 208837695 U | 5/2019 |
| CN | 208851291 U | 5/2019 |
| CN | 208864113 U | 5/2019 |
| CN | 208909747 U | 5/2019 |
| CN | 208909882 U | 5/2019 |
| CN | 208909883 U | 5/2019 |
| CN | 105640308 A | 6/2019 |
| CN | 105996805 B | 6/2019 |
| CN | 109870938 A | 6/2019 |
| CN | 109875418 A | 6/2019 |
| CN | 109892967 A | 6/2019 |
| CN | 208941868 U | 6/2019 |
| CN | 208973499 U | 6/2019 |
| CN | 208973501 U | 6/2019 |
| CN | 208973502 U | 6/2019 |
| CN | 208973503 U | 6/2019 |
| CN | 208973504 U | 6/2019 |
| CN | 208973507 U | 6/2019 |
| CN | 208988575 U | 6/2019 |
| CN | 209003634 U | 6/2019 |
| CN | 109953636 A | 7/2019 |
| CN | 109953642 A | 7/2019 |
| CN | 109965667 A | 7/2019 |
| CN | 109965672 A | 7/2019 |
| CN | 109965682 A | 7/2019 |
| CN | 109965683 A | 7/2019 |
| CN | 109965684 A | 7/2019 |
| CN | 109965688 A | 7/2019 |
| CN | 109965689 A | 7/2019 |
| CN | 109965691 A | 7/2019 |
| CN | 109965692 A | 7/2019 |
| CN | 109965710 A | 7/2019 |
| CN | 109984561 A | 7/2019 |
| CN | 109984563 A | 7/2019 |
| CN | 109984574 A | 7/2019 |
| CN | 109984576 A | 7/2019 |
| CN | 109984577 A | 7/2019 |
| CN | 109984578 A | 7/2019 |
| CN | 109984580 A | 7/2019 |
| CN | 109984581 A | 7/2019 |
| CN | 109984582 A | 7/2019 |
| CN | 109984583 A | 7/2019 |
| CN | 109984585 A | 7/2019 |
| CN | 109984586 A | 7/2019 |
| CN | 109984587 A | 7/2019 |
| CN | 109984588 A | 7/2019 |
| CN | 109984589 A | 7/2019 |
| CN | 109984590 A | 7/2019 |
| CN | 109984591 A | 7/2019 |
| CN | 109984592 A | 7/2019 |
| CN | 109984594 A | 7/2019 |
| CN | 109984595 A | 7/2019 |
| CN | 109984623 A | 7/2019 |
| CN | 109986453 A | 7/2019 |
| CN | 109996475 A | 7/2019 |
| CN | 109998370 A | 7/2019 |
| CN | 109998371 A | 7/2019 |

(56) References Cited

FOREIGN PATENT DOCUMENTS

| | | | |
|---|---|---|---|
| CN | 109998385 | A | 7/2019 |
| CN | 110013163 | A | 7/2019 |
| CN | 110013181 | A | 7/2019 |
| CN | 110025214 | A | 7/2019 |
| CN | 110025215 | A | 7/2019 |
| CN | 110037535 | A | 7/2019 |
| CN | 110056916 | A | 7/2019 |
| CN | 110063650 | A | 7/2019 |
| CN | 110063671 | A | 7/2019 |
| CN | 209058897 | U | 7/2019 |
| CN | 209090836 | U | 7/2019 |
| CN | 209090929 | U | 7/2019 |
| CN | 209090938 | U | 7/2019 |
| CN | 209090939 | U | 7/2019 |
| CN | 209090943 | U | 7/2019 |
| CN | 209090950 | U | 7/2019 |
| CN | 209090955 | U | 7/2019 |
| CN | 209090956 | U | 7/2019 |
| CN | 209090957 | U | 7/2019 |
| CN | 209136189 | U | 7/2019 |
| CN | 209136190 | U | 7/2019 |
| CN | 110074647 | A | 8/2019 |
| CN | 110074685 | A | 8/2019 |
| CN | 110074690 | A | 8/2019 |
| CN | 110089931 | A | 8/2019 |
| CN | 110089932 | A | 8/2019 |
| CN | 110101301 | A | 8/2019 |
| CN | 110101303 | A | 8/2019 |
| CN | 110101304 | A | 8/2019 |
| CN | 110101319 | A | 8/2019 |
| CN | 110115500 | A | 8/2019 |
| CN | 110123118 | A | 8/2019 |
| CN | 110123132 | A | 8/2019 |
| CN | 110123133 | A | 8/2019 |
| CN | 110123134 | A | 8/2019 |
| CN | 110123137 | A | 8/2019 |
| CN | 110141104 | A | 8/2019 |
| CN | 110141110 | A | 8/2019 |
| CN | 110141111 | A | 8/2019 |
| CN | 110141112 | A | 8/2019 |
| CN | 110150957 | A | 8/2019 |
| CN | 209202775 | U | 8/2019 |
| CN | 209220022 | U | 8/2019 |
| CN | 209252407 | U | 8/2019 |
| CN | 209269447 | U | 8/2019 |
| CN | 209285276 | U | 8/2019 |
| CN | 209300780 | U | 8/2019 |
| CN | 209315656 | U | 8/2019 |
| CN | 209315657 | U | 8/2019 |
| CN | 110192764 | A | 9/2019 |
| CN | 110192765 | A | 9/2019 |
| CN | 110192766 | A | 9/2019 |
| CN | 110192767 | A | 9/2019 |
| CN | 110192768 | A | 9/2019 |
| CN | 110200471 | A | 9/2019 |
| CN | 110200472 | A | 9/2019 |
| CN | 110200493 | A | 9/2019 |
| CN | 110200494 | A | 9/2019 |
| CN | 110200495 | A | 9/2019 |
| CN | 110213984 | A | 9/2019 |
| CN | 110236363 | A | 9/2019 |
| CN | 110236364 | A | 9/2019 |
| CN | 110236379 | A | 9/2019 |
| CN | 110250904 | A | 9/2019 |
| CN | 110250905 | A | 9/2019 |
| CN | 110250920 | A | 9/2019 |
| CN | 110269506 | A | 9/2019 |
| CN | 110269507 | A | 9/2019 |
| CN | 110269508 | A | 9/2019 |
| CN | 110279291 | A | 9/2019 |
| CN | 110279292 | A | 9/2019 |
| CN | 110279308 | A | 9/2019 |
| CN | 110279317 | A | 9/2019 |
| CN | 209360444 | U | 9/2019 |
| CN | 209360464 | U | 9/2019 |
| CN | 209436923 | U | 9/2019 |
| CN | 209436924 | U | 9/2019 |
| CN | 209436925 | U | 9/2019 |
| CN | 209436942 | U | 9/2019 |
| CN | 209437002 | U | 9/2019 |
| CN | 110292303 | A | 10/2019 |
| CN | 110292304 | A | 10/2019 |
| CN | 110301814 | A | 10/2019 |
| CN | 110301815 | A | 10/2019 |
| CN | 110313805 | A | 10/2019 |
| CN | 110313810 | A | 10/2019 |
| CN | 110313811 | A | 10/2019 |
| CN | 110313812 | A | 10/2019 |
| CN | 110313813 | A | 10/2019 |
| CN | 110313814 | A | 10/2019 |
| CN | 110313816 | A | 10/2019 |
| CN | 110313817 | A | 10/2019 |
| CN | 110313818 | A | 10/2019 |
| CN | 110313819 | A | 10/2019 |
| CN | 110326958 | A | 10/2019 |
| CN | 110338639 | A | 10/2019 |
| CN | 110338647 | A | 10/2019 |
| CN | 110353467 | A | 10/2019 |
| CN | 110353469 | A | 10/2019 |
| CN | 110353497 | A | 10/2019 |
| CN | 110367838 | A | 10/2019 |
| CN | 110384387 | A | 10/2019 |
| CN | 110384389 | A | 10/2019 |
| CN | 209450331 | U | 10/2019 |
| CN | 209518760 | U | 10/2019 |
| CN | 209518767 | U | 10/2019 |
| CN | 209528876 | U | 10/2019 |
| CN | 209547775 | U | 10/2019 |
| CN | 110393437 | A | 11/2019 |
| CN | 110403454 | A | 11/2019 |
| CN | 110403455 | A | 11/2019 |
| CN | 110403457 | A | 11/2019 |
| CN | 110403458 | A | 11/2019 |
| CN | 110419942 | A | 11/2019 |
| CN | 110419943 | A | 11/2019 |
| CN | 110430793 | A | 11/2019 |
| CN | 110432763 | A | 11/2019 |
| CN | 110432764 | A | 11/2019 |
| CN | 110432765 | A | 11/2019 |
| CN | 110448164 | A | 11/2019 |
| CN | 110448165 | A | 11/2019 |
| CN | 110448189 | A | 11/2019 |
| CN | 110464199 | A | 11/2019 |
| CN | 110464200 | A | 11/2019 |
| CN | 110464212 | A | 11/2019 |
| CN | 110475493 | A | 11/2019 |
| CN | 110477742 | A | 11/2019 |
| CN | 110477743 | A | 11/2019 |
| CN | 110477762 | A | 11/2019 |
| CN | 110477764 | A | 11/2019 |
| CN | 110495774 | A | 11/2019 |
| CN | 110507152 | A | 11/2019 |
| CN | 110507166 | A | 11/2019 |
| CN | 110507168 | A | 11/2019 |
| CN | 110507170 | A | 11/2019 |
| CN | 110507171 | A | 11/2019 |
| CN | 110507176 | A | 11/2019 |
| CN | 110507181 | A | 11/2019 |
| CN | 110507198 | A | 11/2019 |
| CN | 110507199 | A | 11/2019 |
| CN | 110520022 | A | 11/2019 |
| CN | 209564018 | U | 11/2019 |
| CN | 209610822 | U | 11/2019 |
| CN | 209610824 | U | 11/2019 |
| CN | 209610827 | U | 11/2019 |
| CN | 209629508 | U | 11/2019 |
| CN | 209644658 | U | 11/2019 |
| CN | 110522315 | A | 12/2019 |
| CN | 110537836 | A | 12/2019 |
| CN | 110537849 | A | 12/2019 |
| CN | 110547657 | A | 12/2019 |
| CN | 110547674 | A | 12/2019 |
| CN | 110547675 | A | 12/2019 |
| CN | 110547694 | A | 12/2019 |

(56) References Cited

FOREIGN PATENT DOCUMENTS

| | | |
|---|---|---|
| CN | 110558827 A | 12/2019 |
| CN | 110558832 A | 12/2019 |
| CN | 110558858 A | 12/2019 |
| CN | 110558861 A | 12/2019 |
| CN | 110575049 A | 12/2019 |
| CN | 110575062 A | 12/2019 |
| CN | 110575077 A | 12/2019 |
| CN | 110575083 A | 12/2019 |
| CN | 110584329 A | 12/2019 |
| CN | 110584470 A | 12/2019 |
| CN | 110584472 A | 12/2019 |
| CN | 110604465 A | 12/2019 |
| CN | 110604469 A | 12/2019 |
| CN | 110613306 A | 12/2019 |
| CN | 110613311 A | 12/2019 |
| CN | 110613323 A | 12/2019 |
| CN | 110613324 A | 12/2019 |
| CN | 110613326 A | 12/2019 |
| CN | 110613327 A | 12/2019 |
| CN | 110613329 A | 12/2019 |
| CN | 110613331 A | 12/2019 |
| CN | 110613365 A | 12/2019 |
| CN | 110613366 A | 12/2019 |
| CN | 110623519 A | 12/2019 |
| CN | 110623533 A | 12/2019 |
| CN | 110623534 A | 12/2019 |
| CN | 110623535 A | 12/2019 |
| CN | 110623551 A | 12/2019 |
| CN | 110623572 A | 12/2019 |
| CN | 209733609 U | 12/2019 |
| CN | 209750794 U | 12/2019 |
| CN | 209770158 U | 12/2019 |
| CN | 209826266 U | 12/2019 |
| CN | 209826275 U | 12/2019 |
| CN | 209863297 U | 12/2019 |
| CN | 209863352 U | 12/2019 |
| CN | 209863353 U | 12/2019 |
| CN | 209863354 U | 12/2019 |
| CN | 209863355 U | 12/2019 |
| CN | 209863450 U | 12/2019 |
| CN | 110638322 A | 1/2020 |
| CN | 110652172 A | 1/2020 |
| CN | 110652188 A | 1/2020 |
| CN | 110652191 A | 1/2020 |
| CN | 110652192 A | 1/2020 |
| CN | 110652193 A | 1/2020 |
| CN | 110652196 A | 1/2020 |
| CN | 110652197 A | 1/2020 |
| CN | 110652211 A | 1/2020 |
| CN | 110652217 A | 1/2020 |
| CN | 110663725 A | 1/2020 |
| CN | 110664235 A | 1/2020 |
| CN | 110664236 A | 1/2020 |
| CN | 110664237 A | 1/2020 |
| CN | 110664239 A | 1/2020 |
| CN | 110680203 A | 1/2020 |
| CN | 110680206 A | 1/2020 |
| CN | 110693316 A | 1/2020 |
| CN | 110710864 A | 1/2020 |
| CN | 110710892 A | 1/2020 |
| CN | 110720826 A | 1/2020 |
| CN | 209995969 U | 1/2020 |
| CN | 107773030 B | 2/2020 |
| CN | 110742492 A | 2/2020 |
| CN | 110742500 A | 2/2020 |
| CN | 110754924 A | 2/2020 |
| CN | 110754925 A | 2/2020 |
| CN | 110754926 A | 2/2020 |
| CN | 110754927 A | 2/2020 |
| CN | 110754929 A | 2/2020 |
| CN | 110754930 A | 2/2020 |
| CN | 110754931 A | 2/2020 |
| CN | 110754932 A | 2/2020 |
| CN | 110754933 A | 2/2020 |
| CN | 110772114 A | 2/2020 |
| CN | 110772115 A | 2/2020 |
| CN | 110772125 A | 2/2020 |
| CN | 110786730 A | 2/2020 |
| CN | 110786731 A | 2/2020 |
| CN | 110786732 A | 2/2020 |
| CN | 110786733 A | 2/2020 |
| CN | 110786749 A | 2/2020 |
| CN | 110801144 A | 2/2020 |
| CN | 110801145 A | 2/2020 |
| CN | 110801148 A | 2/2020 |
| CN | 110801149 A | 2/2020 |
| CN | 110801150 A | 2/2020 |
| CN | 110811282 A | 2/2020 |
| CN | 110811294 A | 2/2020 |
| CN | 110811295 A | 2/2020 |
| CN | 110811313 A | 2/2020 |
| CN | 110811315 A | 2/2020 |
| CN | 110811316 A | 2/2020 |
| CN | 110811318 A | 2/2020 |
| CN | 110811343 A | 2/2020 |
| CN | 110833316 A | 2/2020 |
| CN | 110840216 A | 2/2020 |
| CN | 110840237 A | 2/2020 |
| CN | 110840238 A | 2/2020 |
| CN | 110840239 A | 2/2020 |
| CN | 110840240 A | 2/2020 |
| CN | 110840241 A | 2/2020 |
| CN | 110840242 A | 2/2020 |
| CN | 110840243 A | 2/2020 |
| CN | 110840245 A | 2/2020 |
| CN | 110840269 A | 2/2020 |
| CN | 110868894 A | 3/2020 |
| CN | 110876559 A | 3/2020 |
| CN | 110876567 A | 3/2020 |
| CN | 210124638 U | 3/2020 |
| CN | 210169803 U | 3/2020 |
| CN | 210185391 U | 3/2020 |
| CN | 110960112 A | 4/2020 |
| CN | 111000430 A | 4/2020 |
| CN | 111012203 A | 4/2020 |
| CN | 111053458 A | 4/2020 |
| CN | 210227842 U | 4/2020 |
| CN | 210227855 U | 4/2020 |
| CN | 210276928 U | 4/2020 |
| CN | 210300635 U | 4/2020 |
| CN | 210300732 U | 4/2020 |
| CN | 210300733 U | 4/2020 |
| CN | 210383667 U | 4/2020 |
| CN | 210408053 U | 4/2020 |
| CN | 210408158 U | 4/2020 |
| CN | 111184453 A | 5/2020 |
| CN | 210433346 U | 5/2020 |
| CN | 210493785 U | 5/2020 |
| CN | 210493795 U | 5/2020 |
| CN | 210540823 U | 5/2020 |
| CN | 210540971 U | 5/2020 |
| CN | 210540972 U | 5/2020 |
| CN | 210540973 U | 5/2020 |
| CN | 210540974 U | 5/2020 |
| CN | 210540981 U | 5/2020 |
| CN | 210582243 U | 5/2020 |
| CN | 111214101 A | 6/2020 |
| CN | 111214102 A | 6/2020 |
| CN | 111214131 A | 6/2020 |
| CN | 111227668 A | 6/2020 |
| CN | 111227671 A | 6/2020 |
| CN | 111248768 A | 6/2020 |
| CN | 111248771 A | 6/2020 |
| CN | 111297215 A | 6/2020 |
| CN | 111317357 A | 6/2020 |
| CN | 210673100 U | 6/2020 |
| CN | 210697273 U | 6/2020 |
| CN | 210697274 U | 6/2020 |
| CN | 210727514 U | 6/2020 |
| CN | 210810486 U | 6/2020 |
| CN | 210810617 U | 6/2020 |
| CN | 210871141 U | 6/2020 |
| CN | 111358308 A | 7/2020 |
| CN | 111374527 A | 7/2020 |

(56) References Cited

FOREIGN PATENT DOCUMENTS

| | | | |
|---|---|---|---|
| CN | 111381503 | A | 7/2020 |
| CN | 111387837 | A | 7/2020 |
| CN | 111387840 | A | 7/2020 |
| CN | 111449536 | A | 7/2020 |
| CN | 210961428 | U | 7/2020 |
| CN | 210961465 | U | 7/2020 |
| CN | 210961472 | U | 7/2020 |
| CN | 210961552 | U | 7/2020 |
| CN | 210961553 | U | 7/2020 |
| CN | 210989805 | U | 7/2020 |
| CN | 111543865 | A | 8/2020 |
| CN | 211186926 | U | 8/2020 |
| CN | 211212725 | U | 8/2020 |
| CN | 211212750 | U | 8/2020 |
| CN | 211242957 | U | 8/2020 |
| CN | 211242962 | U | 8/2020 |
| CN | 211269978 | U | 8/2020 |
| CN | 211270194 | U | 8/2020 |
| CN | 211324483 | U | 8/2020 |
| CN | 211432279 | U | 9/2020 |
| CN | 211432426 | U | 9/2020 |
| CN | 211432435 | U | 9/2020 |
| CN | 211559722 | U | 9/2020 |
| CN | 211559785 | U | 9/2020 |
| CN | 211582730 | U | 9/2020 |
| CN | 111772499 | A | 10/2020 |
| CN | 211609338 | U | 10/2020 |
| CN | 211609340 | U | 10/2020 |
| CN | 211609354 | U | 10/2020 |
| DE | 2705168 | A1 | 8/1978 |
| DE | 2753827 | A1 | 6/1979 |
| DE | 102011002821 | A1 | 7/2012 |
| DE | 202017102536 | U1 | 8/2018 |
| EP | 1767860 | A1 | 3/2007 |
| EP | 2003400 | A2 | 12/2008 |
| EP | 2020574 | A2 | 2/2009 |
| EP | 2910856 | A1 | 8/2015 |
| EP | 2976977 | A1 | 1/2016 |
| EP | 3033978 | B1 | 11/2016 |
| EP | 3165134 | A1 | 5/2017 |
| EP | 2904953 | B1 | 12/2018 |
| EP | 3491980 | A1 | 6/2019 |
| EP | 3756515 | A1 | 12/2020 |
| FR | 2409736 | A1 | 6/1979 |
| FR | 3097733 | A1 | 1/2021 |
| GB | 2398628 | A | 8/2004 |
| GB | 2479384 | A | 10/2011 |
| JP | S5827524 | A | 2/1983 |
| JP | H09164074 | A | 6/1997 |
| JP | 10028643 | A | 2/1998 |
| JP | 2005147604 | A | 6/2005 |
| JP | 2007007027 | A | 1/2007 |
| JP | 2008018122 | A | 1/2008 |
| JP | 2009291417 | | 12/2009 |
| JP | 2011010786 | A | 1/2011 |
| JP | 2013106850 | A | 6/2013 |
| JP | 2014200627 | A | 10/2014 |
| JP | 2014204770 | A | 10/2014 |
| JP | 2015145778 | A | 8/2015 |
| KR | 102109966 | B1 | 5/2020 |
| WO | 8911773 | A1 | 11/1989 |
| WO | 9837796 | A1 | 9/1998 |
| WO | 9930086 | | 6/1999 |
| WO | 9952328 | A1 | 10/1999 |
| WO | 0044096 | | 7/2000 |
| WO | 0049839 | A1 | 8/2000 |
| WO | 2006122643 | A1 | 11/2006 |
| WO | 2006132612 | A1 | 12/2006 |
| WO | 2009043812 | A1 | 4/2009 |
| WO | 2010034338 | A1 | 4/2010 |
| WO | 2010034374 | A1 | 4/2010 |
| WO | 2012051508 | A2 | 4/2012 |
| WO | 2015006891 | A1 | 1/2015 |
| WO | 2015028940 | A1 | 3/2015 |
| WO | 2015062197 | A1 | 5/2015 |
| WO | 2015081549 | A1 | 6/2015 |
| WO | 2016007002 | A1 | 1/2016 |
| WO | 2016012908 | A1 | 1/2016 |
| WO | 2016028549 | A1 | 2/2016 |
| WO | 2016091063 | A1 | 6/2016 |
| WO | 2016141009 | A1 | 9/2016 |
| WO | 2016148492 | A1 | 9/2016 |
| WO | 2016154114 | A1 | 9/2016 |
| WO | 2016165198 | A1 | 10/2016 |
| WO | 2016171385 | A1 | 10/2016 |
| WO | 2016182975 | A1 | 11/2016 |
| WO | 2016189440 | | 12/2016 |
| WO | 2016193008 | A1 | 12/2016 |
| WO | 2016193643 | A1 | 12/2016 |
| WO | 2016199086 | A1 | 12/2016 |
| WO | 2017005533 | A1 | 1/2017 |
| WO | 2017039091 | A1 | 3/2017 |
| WO | 2017045387 | A1 | 3/2017 |
| WO | 2017049635 | A1 | 3/2017 |
| WO | 2017049717 | A1 | 3/2017 |
| WO | 2017050693 | A2 | 3/2017 |
| WO | 2017063872 | A1 | 4/2017 |
| WO | 2017072068 | A1 | 5/2017 |
| WO | 2017074119 | A1 | 5/2017 |
| WO | 2017076797 | A1 | 5/2017 |
| WO | 2017081420 | A1 | 5/2017 |
| WO | 2017085026 | A1 | 5/2017 |
| WO | 2017085671 | A1 | 5/2017 |
| WO | 2017085673 | A1 | 5/2017 |
| WO | 2017086543 | A1 | 5/2017 |
| WO | 2017092062 | A1 | 6/2017 |
| WO | 2017092063 | A1 | 6/2017 |
| WO | 2017094968 | A1 | 6/2017 |
| WO | 2017097790 | A1 | 6/2017 |
| WO | 2017104892 | A1 | 6/2017 |
| WO | 2017104894 | A1 | 6/2017 |
| WO | 2017104895 | A1 | 6/2017 |
| WO | 2017104896 | A1 | 6/2017 |
| WO | 2017104898 | A1 | 6/2017 |
| WO | 2017104900 | A1 | 6/2017 |
| WO | 2017105076 | A2 | 6/2017 |
| WO | 2017111425 | A1 | 6/2017 |
| WO | 2017121691 | A1 | 7/2017 |
| WO | 2017127655 | A1 | 7/2017 |
| WO | 2017144795 | A1 | 8/2017 |
| WO | 2017149519 | A1 | 9/2017 |
| WO | 2017152518 | A1 | 9/2017 |
| WO | 2017153360 | A1 | 9/2017 |
| WO | 2017158068 | A1 | 9/2017 |
| WO | 2017166317 | A1 | 10/2017 |
| WO | 2017177007 | A1 | 10/2017 |
| WO | 2017177423 | A1 | 10/2017 |
| WO | 2017178229 | A1 | 10/2017 |
| WO | 2017178650 | A1 | 10/2017 |
| WO | 2017178739 | A1 | 10/2017 |
| WO | 2017179804 | A1 | 10/2017 |
| WO | 2017191377 | A1 | 11/2017 |
| WO | 2017191395 | A1 | 11/2017 |
| WO | 2017195777 | A1 | 11/2017 |
| WO | 2017197482 | A1 | 11/2017 |
| WO | 2017198815 | A1 | 11/2017 |
| WO | 2017198848 | A1 | 11/2017 |
| WO | 2017201530 | A1 | 11/2017 |
| WO | 2017202641 | A1 | 11/2017 |
| WO | 2017209465 | A1 | 12/2017 |
| WO | 2017211045 | A1 | 12/2017 |
| WO | 2017213330 | A2 | 12/2017 |
| WO | 2017213423 | A1 | 12/2017 |
| WO | 2017215926 | A1 | 12/2017 |
| WO | 2017215988 | A1 | 12/2017 |
| WO | 2018004226 | A1 | 1/2018 |
| WO | 2018007218 | A1 | 1/2018 |
| WO | 2018014806 | A1 | 1/2018 |
| WO | 2018015695 | A1 | 1/2018 |
| WO | 2017077571 | A1 | 2/2018 |
| WO | 2018018670 | A1 | 2/2018 |
| WO | 2018023863 | A1 | 2/2018 |
| WO | 2018024781 | A1 | 2/2018 |
| WO | 2018024782 | A1 | 2/2018 |

(56) References Cited

FOREIGN PATENT DOCUMENTS

| | | | |
|---|---|---|---|
| WO | 2018024783 | A1 | 2/2018 |
| WO | 2018026041 | A1 | 2/2018 |
| WO | 2018026906 | A1 | 2/2018 |
| WO | 2018026928 | A1 | 2/2018 |
| WO | 2018032540 | A1 | 2/2018 |
| WO | 2018032541 | A1 | 2/2018 |
| WO | 2018032542 | A1 | 2/2018 |
| WO | 2018032589 | A1 | 2/2018 |
| WO | 2018032648 | A1 | 2/2018 |
| WO | 2018037177 | A1 | 3/2018 |
| WO | 2018040250 | A1 | 3/2018 |
| WO | 2018041536 | A1 | 3/2018 |
| WO | 2018045643 | A1 | 3/2018 |
| WO | 2018050520 | A1 | 3/2018 |
| WO | 2018050838 | A1 | 3/2018 |
| WO | 2018058384 | A1 | 4/2018 |
| WO | 2018058569 | A1 | 4/2018 |
| WO | 2018058740 | A1 | 4/2018 |
| WO | 2018059994 | A1 | 4/2018 |
| WO | 2018060260 | A1 | 4/2018 |
| WO | 2018060273 | A1 | 4/2018 |
| WO | 2018060331 | A1 | 4/2018 |
| WO | 2018065424 | A1 | 4/2018 |
| WO | 2018068376 | A1 | 4/2018 |
| WO | 2018068425 | A1 | 4/2018 |
| WO | 2018068976 | A1 | 4/2018 |
| WO | 2018076164 | A1 | 5/2018 |
| WO | 2018076166 | A1 | 5/2018 |
| WO | 2018076415 | A1 | 5/2018 |
| WO | 2018082131 | A1 | 5/2018 |
| WO | 2018090287 | A1 | 5/2018 |
| WO | 2018093004 | A1 | 5/2018 |
| WO | 2018095247 | A1 | 5/2018 |
| WO | 2018095420 | A1 | 5/2018 |
| WO | 2018095949 | A1 | 5/2018 |
| WO | 2018120561 | A1 | 5/2018 |
| WO | 2017104893 | A1 | 6/2018 |
| WO | 2018099233 | A1 | 6/2018 |
| WO | 2018102128 | A1 | 6/2018 |
| WO | 2018104351 | A1 | 6/2018 |
| WO | 2018107522 | A1 | 6/2018 |
| WO | 2018107973 | A1 | 6/2018 |
| WO | 2018116056 | A1 | 6/2018 |
| WO | 2018116057 | A1 | 6/2018 |
| WO | 2018121166 | A1 | 7/2018 |
| WO | 2018121199 | A1 | 7/2018 |
| WO | 2018133993 | A1 | 7/2018 |
| WO | 2018137832 | A1 | 8/2018 |
| WO | 2018138078 | A1 | 8/2018 |
| WO | 2018140954 | A1 | 8/2018 |
| WO | 2018142088 | A1 | 8/2018 |
| WO | 2018146872 | A1 | 8/2018 |
| WO | 2018147640 | A1 | 8/2018 |
| WO | 2018157409 | A1 | 9/2018 |
| WO | 2018161497 | A1 | 9/2018 |
| WO | 2018165698 | A1 | 9/2018 |
| WO | 2018171250 | A1 | 9/2018 |
| WO | 2018189921 | A1 | 10/2018 |
| WO | 2018191960 | A1 | 10/2018 |
| WO | 2018197720 | A1 | 11/2018 |
| WO | 2018207221 | A1 | 11/2018 |
| WO | 2018212473 | A1 | 11/2018 |
| WO | 2018216042 | A1 | 11/2018 |
| WO | 2018220659 | A1 | 12/2018 |
| WO | 2018223713 | A1 | 12/2018 |
| WO | 2018227851 | A1 | 12/2018 |
| WO | 2018227852 | A1 | 12/2018 |
| WO | 2018227866 | A1 | 12/2018 |
| WO | 2018227938 | A1 | 12/2018 |
| WO | 2018233210 | A1 | 12/2018 |
| WO | 2018235095 | A1 | 12/2018 |
| WO | 2019015425 | A1 | 1/2019 |
| WO | 2019026018 | A1 | 2/2019 |
| WO | 2019032876 | A1 | 2/2019 |
| WO | 2019032878 | A1 | 2/2019 |
| WO | 2019061758 | A1 | 4/2019 |
| WO | 2019064319 | A1 | 4/2019 |
| WO | 2019066747 | A1 | 4/2019 |
| WO | 2019071975 | A1 | 4/2019 |
| WO | 2019080672 | A1 | 5/2019 |
| WO | 2019081824 | A1 | 5/2019 |
| WO | 2019081825 | A1 | 5/2019 |
| WO | 2019082210 | A1 | 5/2019 |
| WO | 2019085602 | A1 | 5/2019 |
| WO | 2019086393 | A1 | 5/2019 |
| WO | 2019091169 | A1 | 5/2019 |
| WO | 2019097545 | A1 | 5/2019 |
| WO | 2019104818 | A1 | 6/2019 |
| WO | 2019110340 | A1 | 6/2019 |
| WO | 2019111179 | A1 | 6/2019 |
| WO | 2019114890 | A1 | 6/2019 |
| WO | 2019128111 | A1 | 7/2019 |
| WO | 2019129598 | A1 | 7/2019 |
| WO | 2019130011 | A1 | 7/2019 |
| WO | 2019132150 | A1 | 7/2019 |
| WO | 2019136785 | A1 | 7/2019 |
| WO | 2019141207 | A1 | 7/2019 |
| WO | 2019141321 | A1 | 7/2019 |
| WO | 2019149573 | A1 | 8/2019 |
| WO | 2019153512 | A1 | 8/2019 |
| WO | 2019153807 | A1 | 8/2019 |
| WO | 2019183755 | A1 | 10/2019 |
| WO | 2019184188 | A1 | 10/2019 |
| WO | 2019185321 | A1 | 10/2019 |
| WO | 2019201084 | A1 | 10/2019 |
| WO | 2019207325 | A1 | 10/2019 |
| WO | 2019219018 | A1 | 11/2019 |
| WO | 2019227766 | A1 | 12/2019 |
| WO | 2019227843 | A1 | 12/2019 |
| WO | 2019229763 | A1 | 12/2019 |
| WO | 2019233018 | A1 | 12/2019 |
| WO | 2019237478 | A1 | 12/2019 |
| WO | 2019237483 | A1 | 12/2019 |
| WO | 2019237631 | A1 | 12/2019 |
| WO | 2019238605 | A1 | 12/2019 |
| WO | 2019238794 | A1 | 12/2019 |
| WO | 2019243093 | A1 | 12/2019 |
| WO | 2019243922 | A1 | 12/2019 |
| WO | 2020000046 | A1 | 1/2020 |
| WO | 2020002064 | A1 | 1/2020 |
| WO | 2020010513 | A1 | 1/2020 |
| WO | 2020016084 | A1 | 1/2020 |
| WO | 2020016085 | A1 | 1/2020 |
| WO | 2020029519 | A1 | 2/2020 |
| WO | 2020029520 | A1 | 2/2020 |
| WO | 2020029695 | A1 | 2/2020 |
| WO | 2020030462 | A1 | 2/2020 |
| WO | 2020034764 | A1 | 2/2020 |
| WO | 2020034798 | A1 | 2/2020 |
| WO | 2020037914 | A1 | 2/2020 |
| WO | 2020038209 | A1 | 2/2020 |
| WO | 2020042466 | A1 | 3/2020 |
| WO | 2020052010 | A1 | 3/2020 |
| WO | 2020062650 | A1 | 4/2020 |
| WO | 2020062651 | A1 | 4/2020 |
| WO | 2020070198 | A1 | 4/2020 |
| WO | 2020071590 | A1 | 4/2020 |
| WO | 2020073522 | A1 | 4/2020 |
| WO | 2020074178 | A1 | 4/2020 |
| WO | 2020074476 | A1 | 4/2020 |
| WO | 2020078010 | A1 | 4/2020 |
| WO | 2020078403 | A1 | 4/2020 |
| WO | 2020078836 | A1 | 4/2020 |
| WO | 2020080738 | A1 | 4/2020 |
| WO | 2020082329 | A1 | 4/2020 |
| WO | 2020082854 | A1 | 4/2020 |
| WO | 2020087714 | A1 | 5/2020 |
| WO | 2020091531 | A1 | 5/2020 |
| WO | 2020093417 | A1 | 5/2020 |
| WO | 2020094293 | A1 | 5/2020 |
| WO | 2020098748 | A1 | 5/2020 |
| WO | 2020098749 | A1 | 5/2020 |
| WO | 2020099339 | A1 | 5/2020 |
| WO | 2020099355 | A1 | 5/2020 |

(56) References Cited

FOREIGN PATENT DOCUMENTS

WO 2020108375 A1 6/2020
WO 2020108917 A1 6/2020
WO 2020127334 A1 6/2020
WO 2020134318 A1 7/2020
WO 2020148164 A1 7/2020
WO 2020148187 A1 7/2020
WO 2020163711 A1 8/2020
WO 2020177323 A1 9/2020
WO 2020184785 A1 9/2020

OTHER PUBLICATIONS

U.S. Appl. No. 16/357,141, filed Mar. 18, 2019; Final Office Action dated Aug. 30, 2019; 20 pages.
U.S. Appl. No. 16/357,250, filed Mar. 18, 2019; Final Office Action dated Sep. 13, 2019; 1-14 pages.
U.S. Appl. No. 16/357,280, filed Mar. 18, 2019; Final Office Action dated Sep. 13, 2019; 1-11 pages.
U.S. Appl. No. 16/357,175, filed Mar. 18, 2019; Final Office Action dated Sep. 30, 2019; 1-17 pages.
U.S. Appl. No. 16/357,194, filed Mar. 18, 2019; Final Office Action dated Sep. 30, 2019; 1-17 pages.
U.S. Appl. No. 16/357,238, filed Mar. 18, 2019; Final Office Action dated Oct. 8, 2019; 1-13 pages.
U.S. Appl. No. 16/357,243, filed Mar. 18, 2019; Notice of Allowance dated Oct. 15, 2019; pp. 1-9.
U.S. Appl. No. 16/402,023, filed May 2, 2019; Final Office Action dated Oct. 28, 2019; 1-27 pages.
U.S. Appl. No. 16/548,562, filed Aug. 22, 2019; Non-Final Office Action dated Oct. 25, 2019; 1-20 pages.
Anthony et al.; Cooking Device and Components Thereof; U.S. Appl. No. 16/402,023, filed May 2, 2019.
Anthony et al.; Cooking Device and Components Thereof; U.S. Appl. No. 16/402,029, filed May 2, 2019.
Anthony et al.; Cooking Device and Components Thereof; U.S. Appl. No. 16/402,035, filed May 2, 2019.
WO2018122652A1; Jul. 5, 2018; English Abstract Only (3 Pages).
Deng et al.; Design U.S. Appl. No. 29/659,577, filed Aug. 9, 2018; Food Preparation Device, User Interface, and Parts Thereof.
Gill et al.; U.S. Appl. No. 16/059,874, filed Aug. 9, 2018; Cooking Device and Components Thereof.
Gill et al.; U.S. Appl. No. 16/059,876, filed Aug. 9, 2018; Cooking Device and Components Thereof.
Gill et al.; Design U.S. Appl. No. 29/653,847, filed Jun. 19, 2018; Air Diffuser and Air Diffuser With Food Preparation Pot.
Gill et al.; Design U.S. Appl. No. 29/659,576, filed Aug. 9, 2018; Cooking Basket.
Gill et al.; Design U.S. Appl. No. 29/659,578, filed Aug. 9, 2018; Reversible Cooking Rack.
Notification of Transmittal of the International Search Report of the International Searching Authority, or the Declaration. PCT/US2018/046077, dated Dec. 19, 2018, 7 pages.
Notification of Transmittal of the International Search Report of the International Searching Authority, or the Declaration; PCT/US2018/046079; dated Jan. 2, 2019, 7 pages.
Notification of Transmittal of the Written Opinion of the International Searching Authority, or the Declaration. PCT/US2018/046077, dated Dec. 19, 2018, 10 pages.
Notification of Transmittal of the Written Opinion of the International Searching Authority, or the Declaration; PCT/US2018/046079; dated Jan. 2, 2019, 10 pages.
U.S. Appl. No. 16/357,175, filed Mar. 18, 2019; Non-Final Office Action dated May 16, 2019; 49 pages.
U.S. Appl. No. 16/357,194, filed Mar. 18, 2019; Non-Final Office Action dated May 17, 2019; 51 pages.
U.S. Appl. No. 16/357,223, filed Mar. 1, 2019; Non-Final Office Action dated May 23, 2019; 11 pages.
U.S. Appl. No. 16/357,227, filed Mar. 18, 2019; Non-Final Office Action dated May 23, 2019; 10 pages.
U.S. Appl. No. 16/357,234, filed Mar. 18, 2019; Non-Final Office Action dated May 24, 2019; 12 pages.
U.S. Appl. No. 16/357,238, filed Mar. 18, 2019; Non-Final Office Action dated May 28, 2019; 32 pages.
U.S. Appl. No. 16/357,250, filed Mar. 18, 2019; Non-Final Office Action dated May 24, 2019; 18 pages.
U.S. Appl. No. 16/357,270, filed Mar. 18, 2019; Non-Final Office Action dated Jun. 14, 2019; 16 pages.
U.S. Appl. No. 16/357,271, filed Mar. 18, 2019; Non-Final OA dated May 15, 2019; 7 pages.
U.S. Appl. No. 16/357,273, filed Mar. 8, 2019; Non-Final Office Action dated May 17, 2019; 8 pages.
U.S. Appl. No. 16/357,274, filed Mar. 18, 2019; Non-Final Office Action dated May 10, 2019; 7 pages.
U.S. Appl. No. 16/357,276, filed Mar. 18, 2019; Non-Final Office Action dated May 10, 2019; 7 pages.
U.S. Appl. No. 16/357,277, filed Mar. 18, 2019; Non-Final Office Action dated May 9, 2019; 9 pages.
U.S. Appl. No. 16/357,279, filed Mar. 18, 2019; Non-Final Office Action dated May 30, 2019; 9 pages.
U.S. Appl. No. 16/357,280, filed Mar. 18, 2019; Non-Final Office Action dated May 14, 2019; 8 pages.
U.S. Appl. No. 16/402,023, filed May 2, 2019; Non-Final Office Action dated May 30, 2019; 25 pages.
U.S. Appl. No. 16/402,029, filed May 2, 2019; Non-Final Office Action dated Jun. 13, 2019; 9 pages.
U.S. Appl. No. 16/402,035, filed May 2, 2019; Non-Final Office Action dated Aug. 8, 2019; 191 pages.
U.S. Appl. No. 16/357,141, filed Mar. 18, 2019; Interview Summary dated Jun. 17, 2019; 1-3 pages.
U.S. Appl. No. 16/357,238, filed Mar. 18, 2019; Interview Summary dated Jun. 26, 2019; 1-4 pages.
U.S. Appl. No. 16/357,250, filed Mar. 18, 2019; Interview Summary dated Jun. 17, 2019; 1-4 pages.
U.S. Appl. No. 16/357,274, filed Mar. 18, 2019; Interview Summary dated Jun. 5, 2019; 1-3 pages.
U.S. Appl. No. 16/357,276, filed Mar. 18, 2019; Interview Summary dated Jun. 5, 2019; 1-4 pages.
U.S. Appl. No. 16/357,277, filed Mar. 18, 2019; Interview Summary dated Jun. 3, 2019; 1-4 pages.
U.S. Appl. No. 16/357,279, filed Mar. 18, 2019; Interview Summary dated Jun. 19, 2019; 1-4 pages.
U.S. Appl. No. 16/357,280, filed Mar. 18, 2019; Interview Summary dated Jun. 17, 2019; 1-3 pages.
U.S. Appl. No. 16/357,141, filed Mar. 18, 2019; Non-Final Office Action dated May 16, 2019; 17 pages.
U.S. Appl. No. 16/357,243, filed Mar. 18, 2019; Non-Final Office Action dated Jun. 3, 2019; 24 pages.
U.S. Appl. No. 16/357,282, filed Mar. 18, 2019; Non-Final Office Action dated Jun. 27, 2019; 19 pages.
U.S. Appl. No. 16/357,251, filed Mar. 18, 2019; Non-Final Office Action dated Aug. 1, 2019; 186 pages.
Varjabedian et al.; Design U.S. Appl. No. 29/659,571, filed Aug. 9, 2018; Food Preparation Device, User Interface, and Part Thereof.
Gill et al.; U.S. Design U.S. Appl. No. 29/653,847, filed Jun. 19, 2018; Air Diffuser and Air Diffuser With Food Preparation Pot.
Chinese Application No. 201910557420.2 filed Aug. 9, 2018; Office Action with English translation dated Feb. 21, 2020; pp. 1-21.
Chinese Application No. 2019105630895 filed Aug. 9, 2018; Office Action with English translation dated Feb. 3, 2020; pp. 1-13.
Chinese Application No. 2019105637856 filed Feb. 8, 2019; Office Action with English translation dated Dec. 3, 2019; pp. 1-11.
Civil Action No. 19-cv-24114, U.S. District Court, Southern District of Florida; Complaint; Plaintiff SharkNinja Operating LLC for Compaint for Patent Infringement and Demand for Jury Trial against Defendants Tristar Products, Inc. and Emeril Lagasse (Entered: Oct. 4, 2019) pp. 1-194.
Civil Action No. 19-cv-24114, U.S. District Court, Southern District of Florida; Defendant Emeril Lagasse's Motion to Dismiss for Improper Venue; *SharkNinja Operating LLC* (Plaintiff) v. *Tristart Products, Inc. and Emeril Lagasse* (Defendants); Document24 (Entered: Nov. 29, 2019) pp. 1-6.

(56) References Cited

OTHER PUBLICATIONS

Civil Action No. 19-cv-24114, U.S. District Court, Southern District of Florida; Defendant Tristar Products Inc.'s Answer to Plaintiff's Complaint and Counterclaims; *SharkNinja Operating LLC* (Plaintiff) v *Emeril Lagasse* (Defandant) and *Tristar Products, Inc.* (Defandant/Counterclaim Plaintiff) v *SharkNinja operating LLC, Daniel R. Gibson, Cantor Colburn LLP, Pedro Lopez-Baldrich* (Counterclaim Defendants) Document 25 (Entered: Nov. 29, 2019) pp. 1-36.
First Office Action with English Translation; Chinese Application No. 201910562983.0; Action dated Jan. 2, 2020; pp. 1-17.
Hip Cooking, [online]; [retrieved on Nov. 25, 2019]; retrieved from the Internethttps://www.hippressurecooking.com/pressure-cooker-psi-faq-the-stuff-you-didnt-think-to-ask/Laura Pazzaglia, "Pressure Cooker PSI FAQ: The Stuff You Didn't Think to Ask about Pressure," Hip Cooking, Apr. 7, 2013, pp. 1-26.
International Preliminary Report on Patentability for International Application No. PCT/US18/046077, dated Feb. 20, 2020, 14 pages.
International Preliminary Report on Patentability for International Application No. PCT/US2018/046079, dated Feb. 20, 2020, 11 pages.
U.S. Appl. No. 16/059,876, filed Aug. 9, 2018; Third Party Submission Under 37 CFR 1.290 dated Feb. 20, 2020; 15 pages.
U.S. Appl. No. 16/548,562, filed Aug. 22, 2019; Third Party Submission Under 37 CFR 1.290 dated Feb. 19, 2020; 15 pages.
U.S. Appl. No. 16/357,270, filed Mar. 18, 2019; Final Office Action dated Dec. 2, 2019; pp. 1-20.
U.S. Appl. No. 16/357,141, filed Mar. 18, 2019; Non-Final Office Action dated Jan. 28, 2020; 22 pages.
U.S. Appl. No. 16/357,238, filed Mar. 18, 2019; Non-Final Office Action dated Feb. 26, 2020; 26 pages.
U.S. Appl. No. 16/357,280, filed Mar. 18, 2019; Non-Final Office Action dated Feb. 4, 2020; pp. 1-9.
U.S. Appl. No. 16/402,029, filed May 2, 2019; Final Office Action dated Dec. 31, 2019; pp. 1-6.
U.S. Appl. No. 16/402,023, filed May 2, 2019; Non-Final Office Action dated Feb. 27, 2020; 25 pages.
U.S. Appl. No. 16/671,709, filed Nov. 1, 2019; Non-Final Office Action dated Jan. 8, 2020; pp. 1-5.
U.S. Appl. No. 16/671,972, filed Nov. 1, 2019; Non-Final Office Action dated Dec. 18, 2019; pp. 1-5.
U.S. Appl. No. 16/357,223, filed Mar. 18, 2019; Final Office Action dated Oct. 3, 2019; 1-7 pages.
U.S. Appl. No. 16/559,174, filed Sep. 3, 2019; Non-Final Office Action dated Oct. 11, 2019; 1-10 pages.
Canadian Application No. 3065805 filed Dec. 31, 2019; Office Action dated Mar. 12, 2020; 6 pages.
Chinese Application No. 2019105566386 filed Jun. 25, 2019; Office Action with English Translation dated Sep. 9, 2020; 11 pages.
Chinese Application No. 201910557433.X filed Jun. 25, 2019; First Office Action with English Translation; 12 pages.
Chinese Application No. 2019105629830 filed Jun. 26, 2019; Office Action with English Translation dated Jun. 29, 2020; 18 pages.
Chinese Application No. 201910563072 filed Aug. 9, 2018; Office Action with English translation dated Mar. 9, 2020; 14 pages.
Chinese Patent Application No. 2019105638416 filed Jun. 26, 2019; Office Action with English Translation dated Nov. 3, 2020; 16 pages.
European Application No. 1921797806-1004 filed Dec. 31, 2019; European Search Report dated Apr. 1, 2020; 7 pages.
European Application No. 19218088.3-1004 filed Dec. 19, 2019; European Search Report dated Jun. 3, 2020; 7 pages.
European Application No. 19218129.5-1004 filed Dec. 19, 2019; European Search Report dated May 19, 2020; 7 pages.
European Application No. 19218218.6-1004 filed Dec. 19, 2019; European Search Report dated May 27, 2020; 6 pages.
European Application No. 19218240.0-1004 filed Dec. 19, 2019; European Search Report dated May 27, 2020; 7 pages.
European Application No. 19218251.7-1004 filed Dec. 19, 2019; European Search Report dated May 27, 2020; 7 pages.
European Application No. 19218259.0-1004 filed Dec. 19, 2019; European Search Report dated May 27, 2020; 7 pages.
International Search Report for International Application No. PCT/US2019/065662 filed Dec. 11, 2019; dated Mar. 25, 2020; 7 pages.
International Search Report for International Application No. PCT/US2020/017203; International Filing Date: Feb. 7, 2020; dated Jun. 4, 2020; 6 pages.
International Search Report for International Application No. PCT/US2020/017205; International Filing Date: Feb. 7, 2020; dated Jul. 16, 2020; 8 pages.
International Search Report for International Application No. PCT/US2020/019685; International Filing Date Feb. 25, 2020; dated Dec. 8, 2020; 8 pages.
International Search Report for International Application No. PCT/US2020/19664; International Filing Date: Feb. 25, 2020; dated Jun. 4, 2020; 6 pages.
Invitation to Pay Additional Fees for International Application No. PCT/US2020/017205; International Filing Date: Feb. 7, 2020; dated May 19, 2020; 61 pages.
Invitation to Pay Additional Fees for International Application No. PCT/US2020/019685; International Filing Date: Feb. 25, 2020; dated Oct. 13, 2020; 11 pages.
Japanese Application No. 2020-030582 filed Feb. 26, 2020; Japanese Office Action with English Translation dated Dec. 8, 2020; 8 pages.
Japanese Application No. 2020-030585 filed Feb. 26, 2020; Japanese Office Action with English dated Dec. 8, 2020; 7 pages.
Japanese Application No. 2020-030586 filed Feb. 26, 2020; Japanese Office Action with English Translation dated Dec. 8, 2020; 6 pages.
Japanese Application No. 2020-030587 filed Feb. 26, 2020; Japanese Office Action with English Translation dated Dec. 8, 2020; 4 pages.
Japanese Patent Application No. 2020-030583 filed Feb. 26, 2020; Office Action with English Translation dated Nov. 10, 2020; 13 pages.
Japanese Patent Application No. 2020-030584 filed Feb. 26, 2020; Office Action with English Translation; 6 pages.
U.S. Appl. No. 16/671,709, filed Nov. 1, 2019; Non-Final Office Action dated Jul. 8, 2020; 28 pages.
U.S. Appl. No. 17/084,891, filed Oct. 30, 2020; Third Party Submission Under 37 CFR 1.290 dated Dec. 8, 2020; 72 pages.
U.S. Appl. No. 16/357,238, filed Mar. 18, 2019; Non-Final Office Action dated Jan. 14, 2021; 74 pages.
U.S. Appl. No. 16/357,270, filed Mar. 18, 2019; Non-Final Office Action dated Dec. 21, 2020; 32 pages.
U.S. Appl. No. 16/402,023, filed May 2, 2019; Final Office Action dated Nov. 17, 2020; 26 pages.
U.S. Appl. No. 16/402,029, filed May 2, 2019; Final Office Action dated Mar. 5, 2020; 10 pages.
U.S. Appl. No. 16/402,029, filed May 2, 2019; Non-Final Office Action dated Aug. 24, 2020; 27 pages.
U.S. Appl. No. 16/548,562, filed Aug. 22, 2019; Non-Final Office Action dated Aug. 3, 2020; 35 pages.
U.S. Appl. No. 16/559,174, filed Sep. 3, 2019; Non-Final Office Action dated Aug. 28, 2020; 58 pages.
U.S. Appl. No. 16/671,709, filed Nov. 1, 2019; Third Party Submission Under 37 CFR 1.290 dated Feb. 26, 2020; pp. 1-79.
U.S. Appl. No. 16/671,709, filed Nov. 1, 2019; Final Office Action dated Jan. 1, 2021; 29 pages.
U.S. Appl. No. 16/671,972, filed Nov. 1, 2019; Third Party Submission Under 37 CFR 1.290 dated Feb. 27, 2020; pp. 1-81.
U.S. Appl. No. 16/671,972, filed Nov. 1, 2019; Non-Final Office Action dated Jul. 31, 2020; 30 pages.
U.S. Appl. No. 16/678,628, filed Nov. 8, 2019; Non-Final Office Action dated Nov. 2, 2020; 53 pages.
U.S. Appl. No. 16/678,628, filed Nov. 8, 2019; Notice of Allowance dated Sep. 21, 2020; 9 pages.
U.S. Appl. No. 16/800,089, filed Feb. 25, 2020; Third Party Submission Under 37 CFR 1.290 dated Mar. 13, 2020; pp. 1-82.
US Application No. EUP0654US2C8 filed Mar. 18, 2019; Final Office Action dated Aug. 24, 2020; 33 pages.

(56) References Cited

OTHER PUBLICATIONS

U.S. Appl. No. 16/357,250, filed Mar. 18, 2019; Non-Final Office Action dated Apr. 17, 2020; 1-12 pages.
U.S. Appl. No. 16/548,562, filed Aug. 22, 2019; Final Office Action dated Mar. 9, 2020; 26 pages.
U.S. Appl. No. 16/559,174, filed Sep. 3, 2019; Final Office Action dated Mar. 12, 2020; 1-35 pages.
Written Opinion for International Application No. PCT/US2019/065662 filed Dec. 11, 2019; dated Mar. 25, 2020; 7 pages.
Written Opinion for International Application No. PCT/US2020/017203; International Filing Date: Feb. 7, 2020 dated Jun. 4, 2020; 10 pages.
Written Opinion for International Application No. PCT/US2020/017205; International Filing Date: Feb. 7, 2020 dated Jul. 16, 2020; 11 pages.
Written Opinion for International Application No. PCT/US2020/019685; International Filing Date: Feb. 25, 2020; dated Dec. 8, 2020; 12 pages.
Written Opinion for International Application No. PCT/US2019/065662 filed Dec. 11, 2019; dated Mar. 25, 2020; 7 pages (EUP0863PCT)..
Written Opinion for International Application No. PCT/US2020/19664; International Filing Date: Feb. 25, 2020; dated Jun. 4, 2020; 10 pages.
U.S. Appl. No. 16/671,972, filed Nov. 1, 2019; Final Office Action dated Feb. 24, 2021; 59 pages.
U.S. Appl. No. 17/139,236, filed Dec. 31, 2020; Non-Final Office Action dated Mar. 8, 2021; 307 pages.
U.S. Appl. No. 17/139,283, filed Dec. 31, 2020; Non-Final Office Action dated Mar. 10, 2021; 309 pages.
U.S. Appl. No. 17/139,314, filed Dec. 31, 2020; Non-Final Office Action dated Mar. 23, 2021; 310 pages.
U.S. Appl. No. 17/139,599, filed Dec. 31, 2020; Non-Final Office Action dated Feb. 23, 2021; 9 pages.
U.S. Appl. No. 17/139,602, filed Dec. 31, 2020; Non-Final Office Action dated Feb. 22, 2021; 33 pages.
Extended European Search Report issued in European Application No. 21166562.5, dated Jul. 26, 2021, 11 pages.

* cited by examiner 70
110
112
102
106
108
92
90
56

55
52
60
53
50
46
110
112
106
100
108
56
24

70
110
102
56
106
108
92
90
56

55
100
106
60
110
46
50
53
52
40
24

22
26
103
106
80
42

COOKING DEVICE AND COMPONENTS THEREOF

CROSS-REFERENCE TO RELATED APPLICATIONS

This application claims the benefit of U.S. Provisional Application Ser. No. 63/001,953, filed Mar. 30, 2020, which is incorporated herein by reference in its entirety.

BACKGROUND

Embodiments of the present disclosure relates generally to a cooking device and components thereof, and more specifically, to a multifunction device configured to perform the operation of a plurality of distinct cooking devices, the multifunctional cooking device optionally employing various components for cooking in the distinct cooking modes.

Conventional cooking devices, such as pressure cookers and air fryers each perform a single cooking operation, and as such, these devices employ different components and methods for cooking food items. As such, multiple devices are required to perform various cooking operations. For consumers that wish to enjoy food cooked in different ways via different operations, an accumulation of these devices can occur. Such an accumulation of cooking devices is often prohibitive from a standpoint of cost and storage space. For at least these reasons, it would be desirable to integrate the functionality of several cooking devices into a single user-friendly cooking device.

SUMMARY

According to an embodiment, a cooking system includes a housing defining a hollow chamber configured to receive food. The housing has an upper portion defining an opening to said hollow chamber. A lid is movable relative to the housing between an open position and a closed position. The lid seals the opening to the hollow chamber when in the closed position. A portion of the lid is selectively positionable to form a pressure-tight heating volume between the hollow chamber and the portion of said lid. At least one heating element is associated with at least one of the housing and the lid. The at least one heating element is arranged within the pressure-tight heating volume.

In addition to one or more of the features described above, or as an alternative, in further embodiments said lid includes a lid housing positionable about an upper portion of said housing when said lid is in said closed position.

In addition to one or more of the features described above, or as an alternative, in further embodiments said portion of said lid is a relatively inner surface that forms a relatively upper boundary of said pressure-tight heating volume disposed between said hollow chamber and said portion of said lid.

In addition to one or more of the features described above, or as an alternative, in further embodiments said portion of said lid is rotatable about an axis between a first position and a second position.

In addition to one or more of the features described above, or as an alternative, in further embodiments said lid includes an inner lid liner arranged within an interior of said lid housing, said inner lid liner including said portion of said lid selectively positionable to form a pressure-tight cooking volume between said hollow chamber and said portion of said lid.

In addition to one or more of the features described above, or as an alternative, in further embodiments said cooking system further includes an air movement device, said air movement device being arranged within said pressure-tight heating volume.

In addition to one or more of the features described above, or as an alternative, in further embodiments said cooking system further comprises a motor operably coupled to said air movement device, said motor being located external to said pressure-tight heating volume.

In addition to one or more of the features described above, or as an alternative, in further embodiments said motor further comprises a rotatable motor shaft connected to said air movement device, said motor shaft extending through an opening into said pressure-tight heating volume and a sealing device positioned about said motor shaft to seal said opening.

In addition to one or more of the features described above, or as an alternative, in further embodiments said sealing element further comprises a pressure release mechanism operable when a pressure within said pressure-tight heating volume exceeds a defined pressure threshold.

In addition to one or more of the features described above, or as an alternative, in further embodiments comprising a venting system for exhausting at least one of air and steam from said hollow chamber, said venting system including a vent and an element movable relative to said vent to selectively seal said vent.

In addition to one or more of the features described above, or as an alternative, in further embodiments said venting system is disposed adjacent a side of said sealing element.

In addition to one or more of the features described above, or as an alternative, in further embodiments comprising a secondary venting system separate from said venting system, wherein said secondary venting system is electively operable to draw air into said hollow chamber.

In addition to one or more of the features described above, or as an alternative, in further embodiments the cooking system is operable in a plurality of cooking modes including a pressure cooking mode and a convective cooking mode, and a position of said portion of said lid varies based on a selected cooking mode.

In addition to one or more of the features described above, or as an alternative, in further embodiments said at least one heating element further comprises a first heating element associated with said lid and operable in a first cooking mode and a second heating element associated with said housing and operable in a second cooking mode.

In addition to one or more of the features described above, or as an alternative, in further embodiments in said first cooking mode said first heating element is operational and in said second cooking mode said first heating element is non-operational.

In addition to one or more of the features described above, or as an alternative, in further embodiments when said lid is in said closed position, said portion of said lid is movable relative to said housing to lock said portion of said lid to said housing.

In addition to one or more of the features described above, or as an alternative, in further embodiments when said portion of said lid is locked to said housing said pressure-tight heating volume is formed.

In addition to one or more of the features described above, or as an alternative, in further embodiments a first portion of a bayonet locking system is located on an upper portion of said housing and said portion of said lid includes a complementary second portion of said bayonet locking system, wherein said second portion is engageable with said first portion to lock said portion of said lid to said housing.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the disclosure, together with advantages and features, by way of example with reference to the drawings.

DETAILED DESCRIPTION

Figure 1:
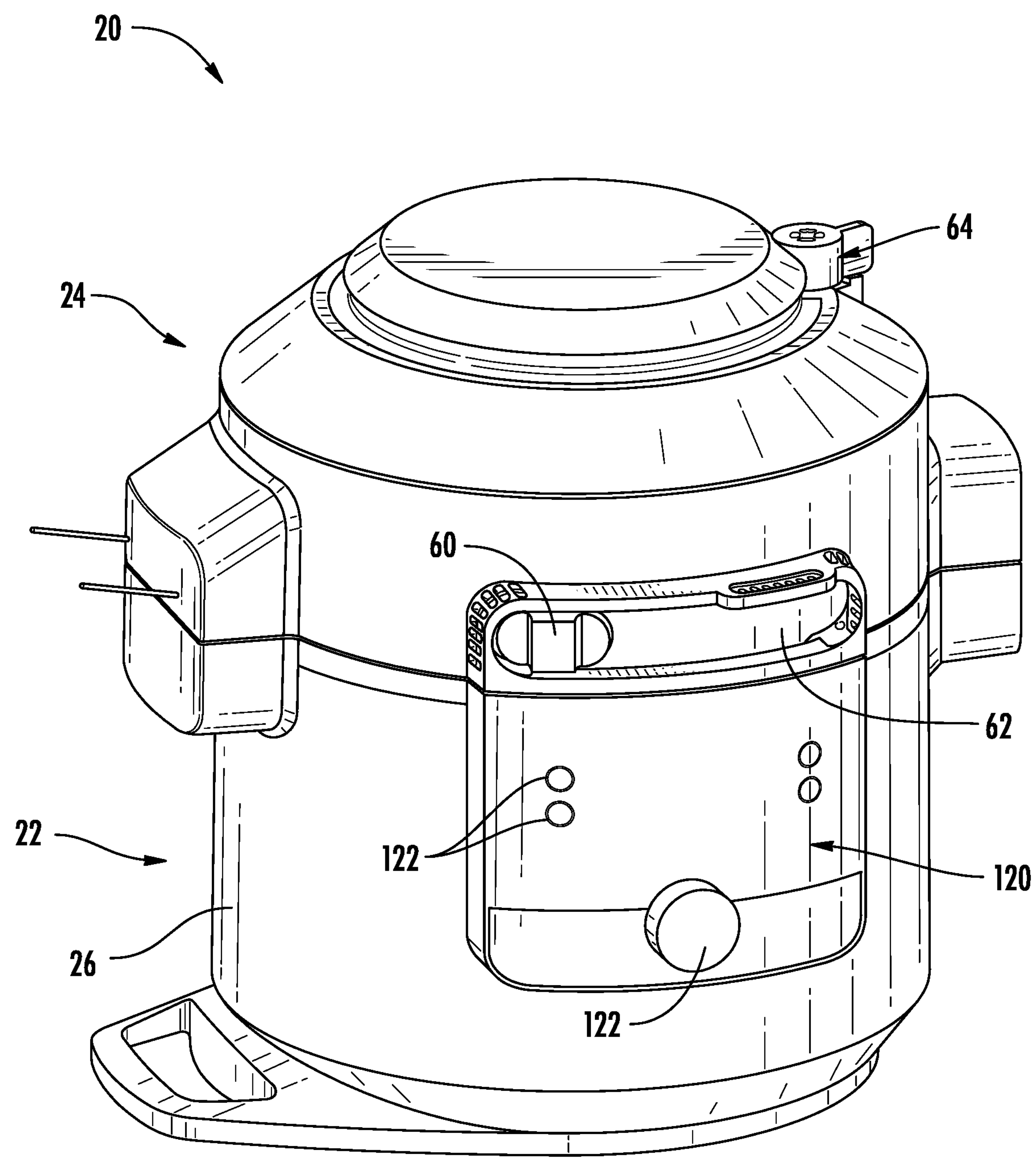
FIG. 1 is a perspective view of a cooking system according to an embodiment.
Figure 2:
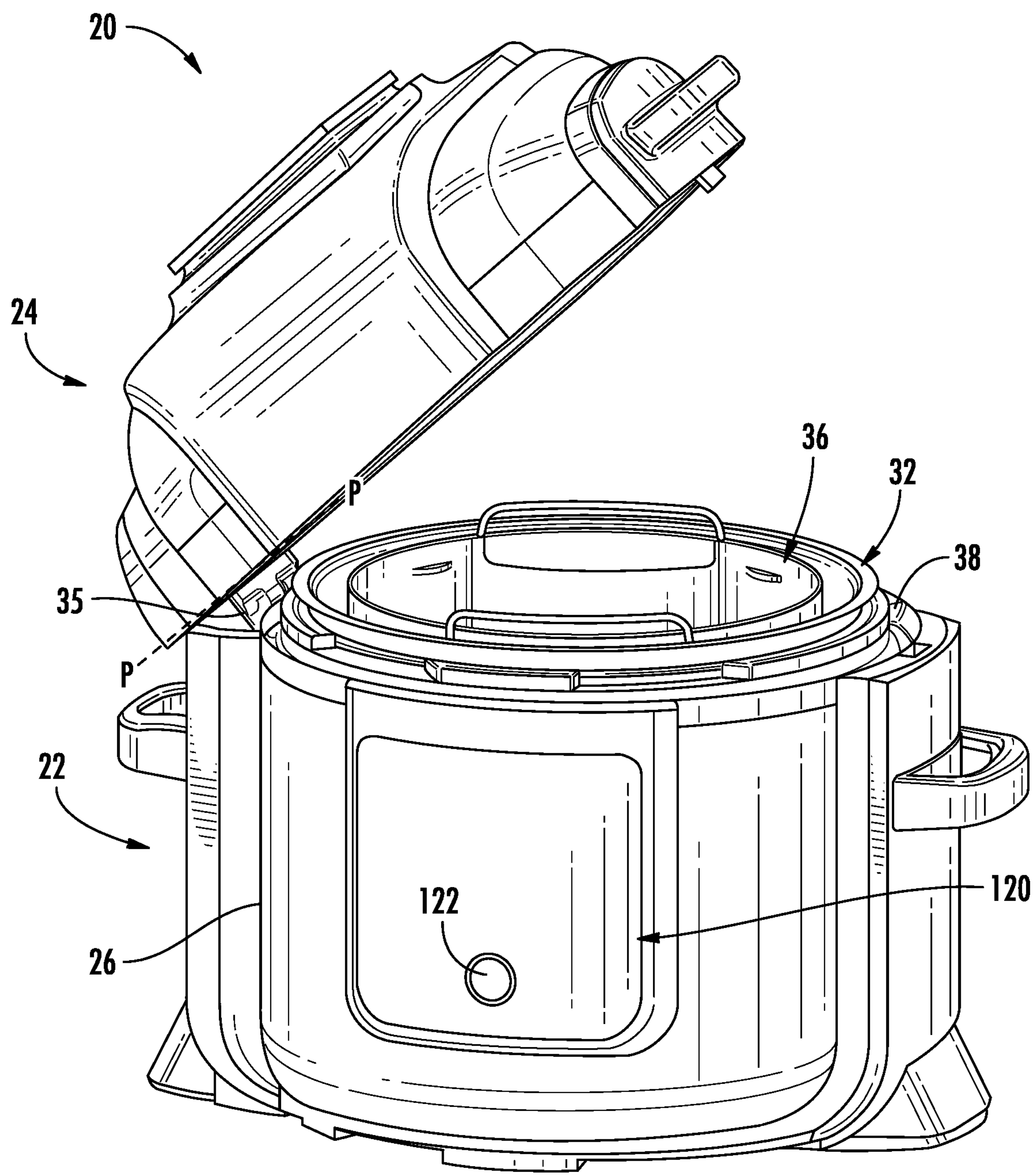
FIG. 2 is a perspective view of a cooking system having a lid in an open position according to an embodiment.
Figure 3:
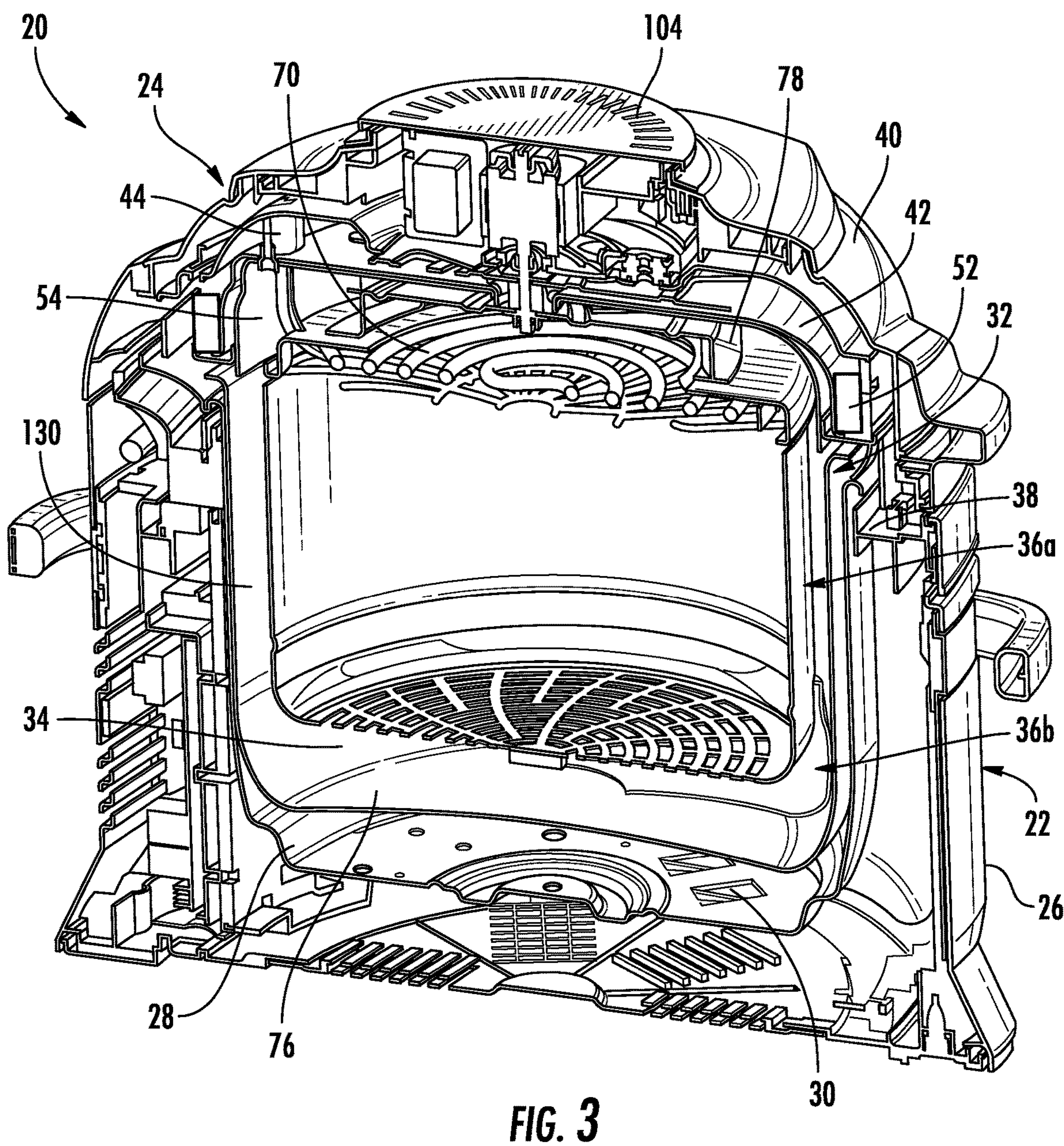
FIG. 3 is a cross-sectional view of a cooking system having a lid in a closed position according to an embodiment.

With reference now to FIGS. 1-3, an example of the cooking system 20 is illustrated. As shown, the cooking system 20 includes a base 22 and a lid 24. The base 22 includes a housing 26 made of any suitable material, such as glass, aluminum, plastic, or stainless steel for example. A liner 28 may be disposed within the hollow interior 30 of the housing 26. The liner 28 may be formed from any suitable conductive material, such as aluminum for example. In an embodiment, the liner 28 forms an interior surface of the housing 26 and thereby defines the hollow interior 30 of the housing 26. Alternatively, the liner 28 may be offset from the interior surface of the housing 26. However, it should be understood that other components of the cooking system 20, or surfaces thereof, may also define the hollow interior 30.

A cooking container 32 is receivable within the hollow interior 30 of the housing 26. Although the cooking container 32 is described herein as being removable from the housing 26 of the base 22, embodiments where the cooking container 32 is integrally formed with the housing 26 are also contemplated herein. In an embodiment, a height of the cooking container 32 is greater than the height of the hollow interior 30 of the housing 26. Accordingly, when the cooking container 32 is installed within the interior 30, an end of the container extends beyond the adjacent end surface 38 of the housing 26, as shown in FIG. 3. The cooking container 32 has an interior or cooking chamber 34 designed to receive and retain one or more consumable products, such as food products for example, therein. Examples of food products suitable for use with the cooking system 20, include but are not limited to, meats, fish, poultry, bread, rice, grains, pasta, vegetables, fruits, and dairy products, among others. The cooking container 32 may be a pot formed from a ceramic, metal, or die cast aluminum material. In an embodiment, an interior surface of the cooking container 32 includes a nano-ceramic coating and an exterior surface of the cooking container 32 includes a silicone epoxy material. However, any suitable material capable of withstanding the high temperatures required for cooking food products is contemplated herein. Further, one or more handles may be associated with the cooking container 32 to allow a user to easily grasp and manipulate the cooking container 32 relative to the housing 26.

One or more accessories, may be compatible for use with the cooking system 20. Examples of such accessories include, but are not limited to, a diffuser, a crisping insert or basket (see numeral 36 in FIGS. 2 and 3), a grill plate, and a griddle for example. In such embodiments, the accessories may be receivable within the hollow interior 30 of the housing 26, or alternatively, within the cooking chamber 34 of the cooking container 32.

Referring with more detail to the lid 24, it should be noted that the lid 24 is connectable to a surface of the cooking container 32 and/or housing 26 to close off entry to the cooking chamber 34 of the cooking container 32. Accordingly, a heating volume may be defined between the cooking chamber 34 of the cooking container 32 and the closed lid 24, such as the bottom surface of the closed lid 24, or alternatively, between the hollow interior 30 defined by the housing 26 and the closed lid 24. As used herein, the term "heating volume" describes a volume within the cooking system 20 through which a fluid may circulate during a cooking operation (to be described in detail below). In an embodiment, a diameter of the lid 24 is generally complementary to a diameter of the housing 26 such that the lid 24 covers not only the cooking container 32, but also an upper surface 38 of the housing 26.

The lid 24 is movable relative to the base 22 between an open position (FIG. 2), in which the cooking container 32 is accessible, and a closed position (FIG. 1, 3) to selectively cover the hollow interior 30 and cooking chamber 34. The lid 24 may be distinct and separable from the base 22, or alternatively, the lid 24 may be movably connected to the base 22. In the illustrated, non-limiting embodiment of FIG.

2, the lid 24 is pivotable or rotatable (via a hinge 35 for example) relative to the base 22 about a pivot axis P. However, other types or movement of the lid 24 are also within the scope of the disclosure.

One or more fastening mechanisms (not shown) may but need not be used to secure the lid 24, or a portion thereof, to the base 22 when the lid 24 is in the closed position. In an embodiment, the fastening mechanism is selectively engaged when the lid 24 is in the closed position. Alternatively, or in addition, the fastening mechanism is selectively engaged based on a selected cooking operation of the cooking system 20, such as pressure cooking for example. Any suitable type of fastening mechanism capable of withstanding the heat and pressure associated with the cooking system 20 is considered within the scope of the disclosure.

As best shown in FIG. 3, the lid 24 may include a generally convex outer lid or lid housing 40 made from any suitable material. In some embodiments, at least a portion of the material of the lid housing 40 may be substantially identical to the material of the housing 26. An inner lid liner (or sealing liner) 42 is arranged within the hollow interior 44 of the lid housing 40. Although the inner lid liner 42 is illustrated as also having a generally convex shape, embodiments where the shape of the inner lid liner 42 is different than the shape of the lid housing 40 are also within the scope of the disclosure. Further, the inner lid liner 42 can be made of any suitable material, such as glass, aluminum, plastic, or stainless steel, or any combination thereof for example. The inner lid liner 42 may but need not be made from the same material as the lid housing 40.

In an embodiment, a sealing surface 46 of the lid 24 is connectable to the upper surface 38 of the housing 26 or directly to the cooking container 32 to form a pressure-tight seal between the lid 24 and the cooking container 32 or housing 26. As a result, art inner surface 54 of the inner lid liner 42 defines a relatively upper boundary of a heating volume through which a fluid can circulate. In an embodiment, the sealing surface 46 is arranged at the end of the inner lid liner 42 adjacent to the cooking container 32. The sealing surface 46 may be formed by a portion of the inner lid liner 42 itself, or as shown in the FIGS. 4-6, a flexible/resilient gasket 50 connected to a portion of the inner lid liner 42, such as the end thereof, may define the sealing surface 46. This gasket 50 may be made of rubber, silicone, or other similar materials, and may include a flange that is received within an interior of the cooking container 32. It should be appreciated that the pressure tight seal formed between the lid 24 and the cooking container 32 or housing 26 may occur during all cooking modes, or just select cooking modes such as those modes that involve pressure or conductive cooking. In embodiments wherein the pressure tight seal is just formed in select cooking modes, this seal may not be formed in air fry or convection modes, and the lid 24 may simply rest on the upper surface of the housing 38 or cooking container 32 when the lid 24 is closed.

Figure 4:
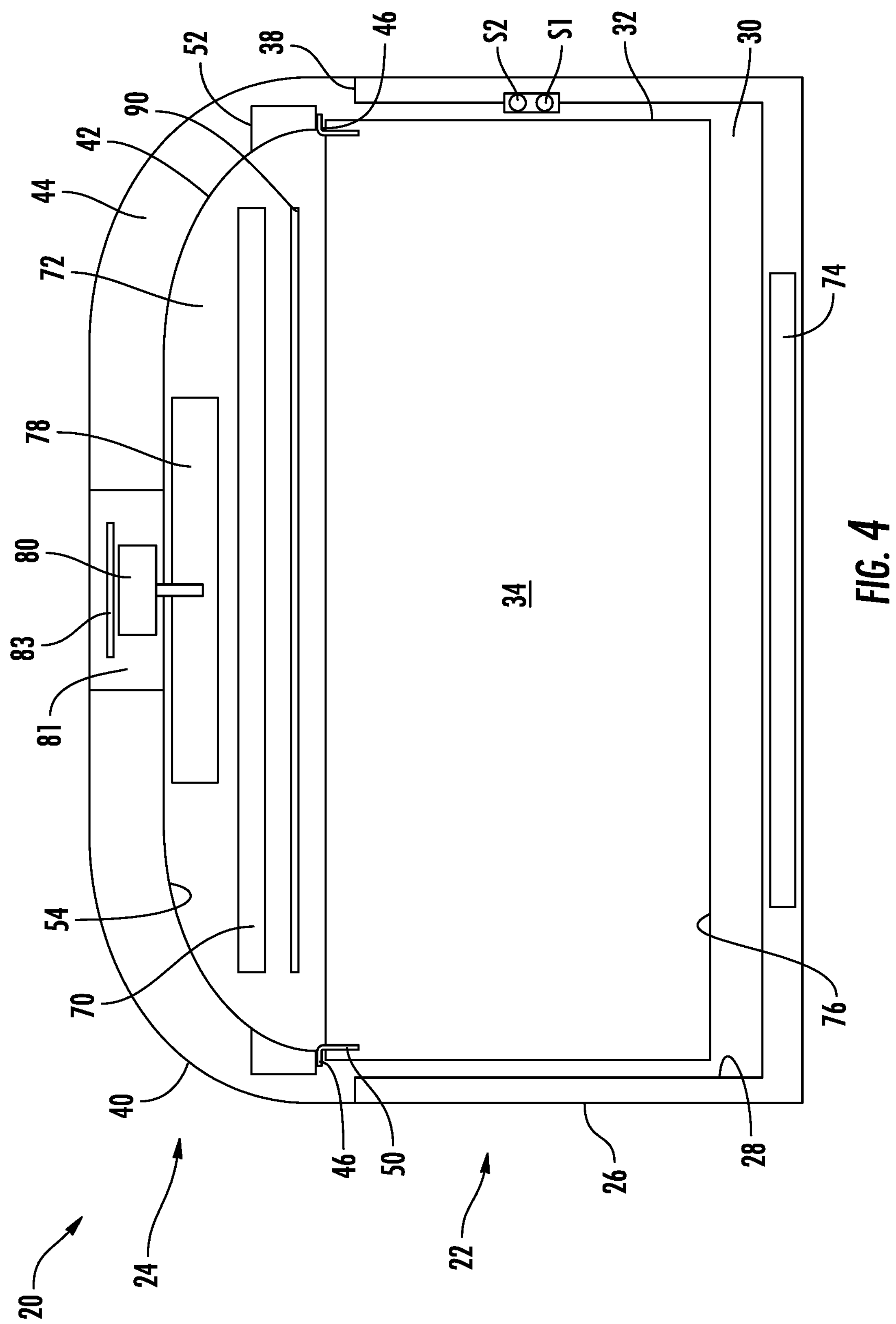
FIG. 4 is a schematic diagram of a cooking system according to an embodiment.
Figure 5:
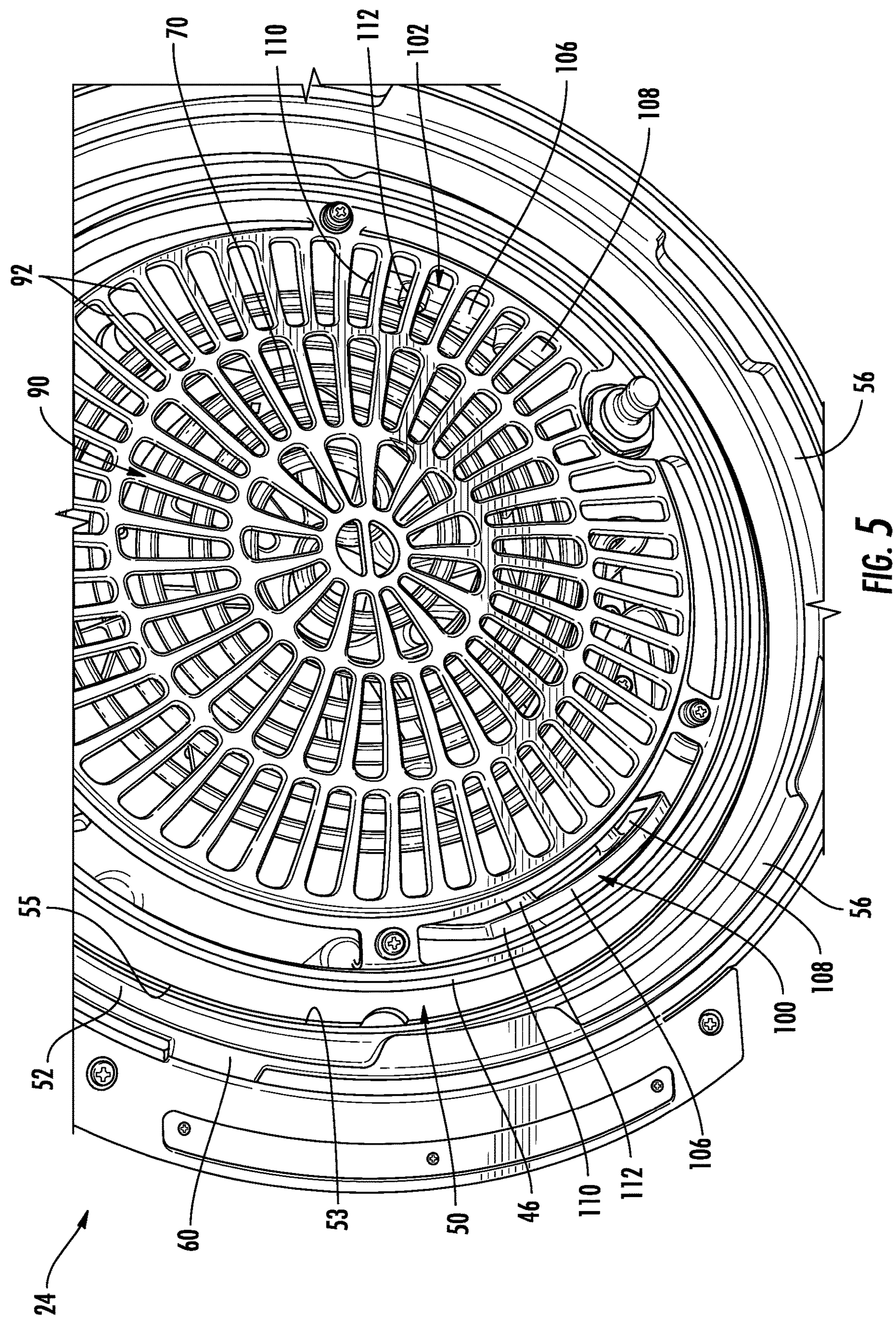
FIG. 5 is a front perspective view of an underside of a lid of a cooking system when a mode selector is in a first position according to an embodiment.
Figure 6:
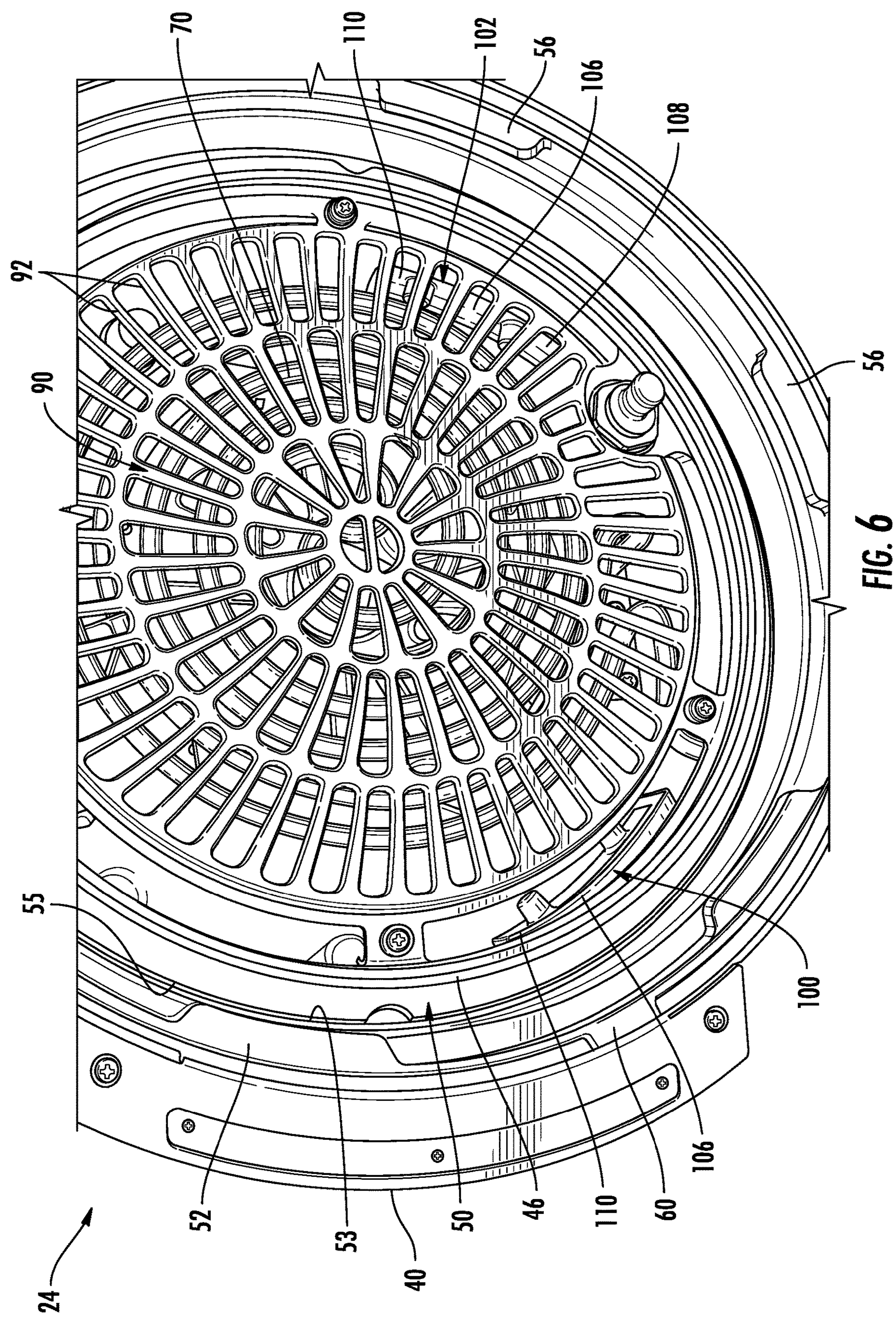
FIG. 6 is a front perspective view of an underside of a lid of a cooking system when a mode selector is in a second position according to an embodiment.
Figure 7:
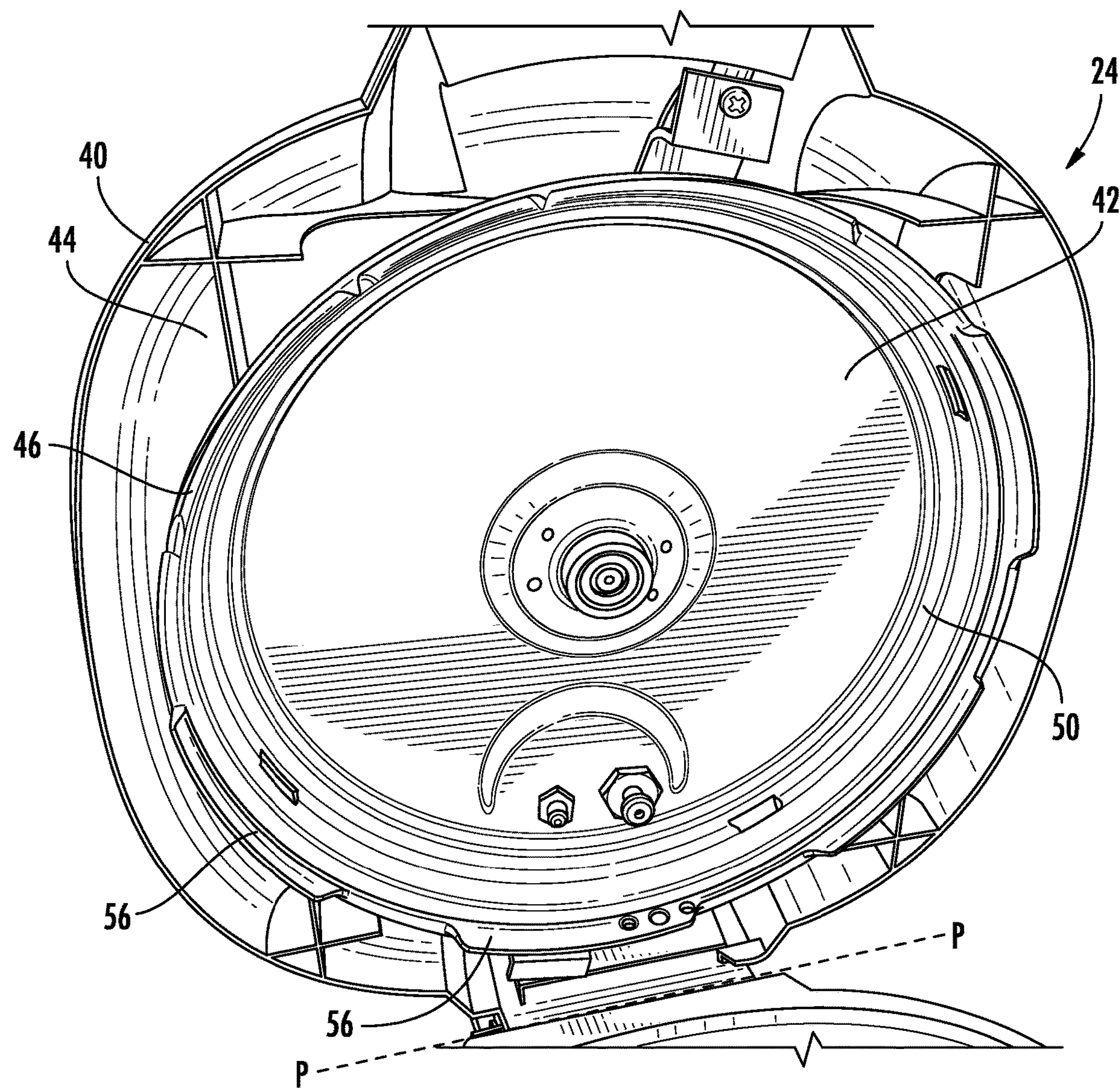
FIG. 7 is a front perspective view of an interior of a lid of a cooking system according to an embodiment.
Figure 8:
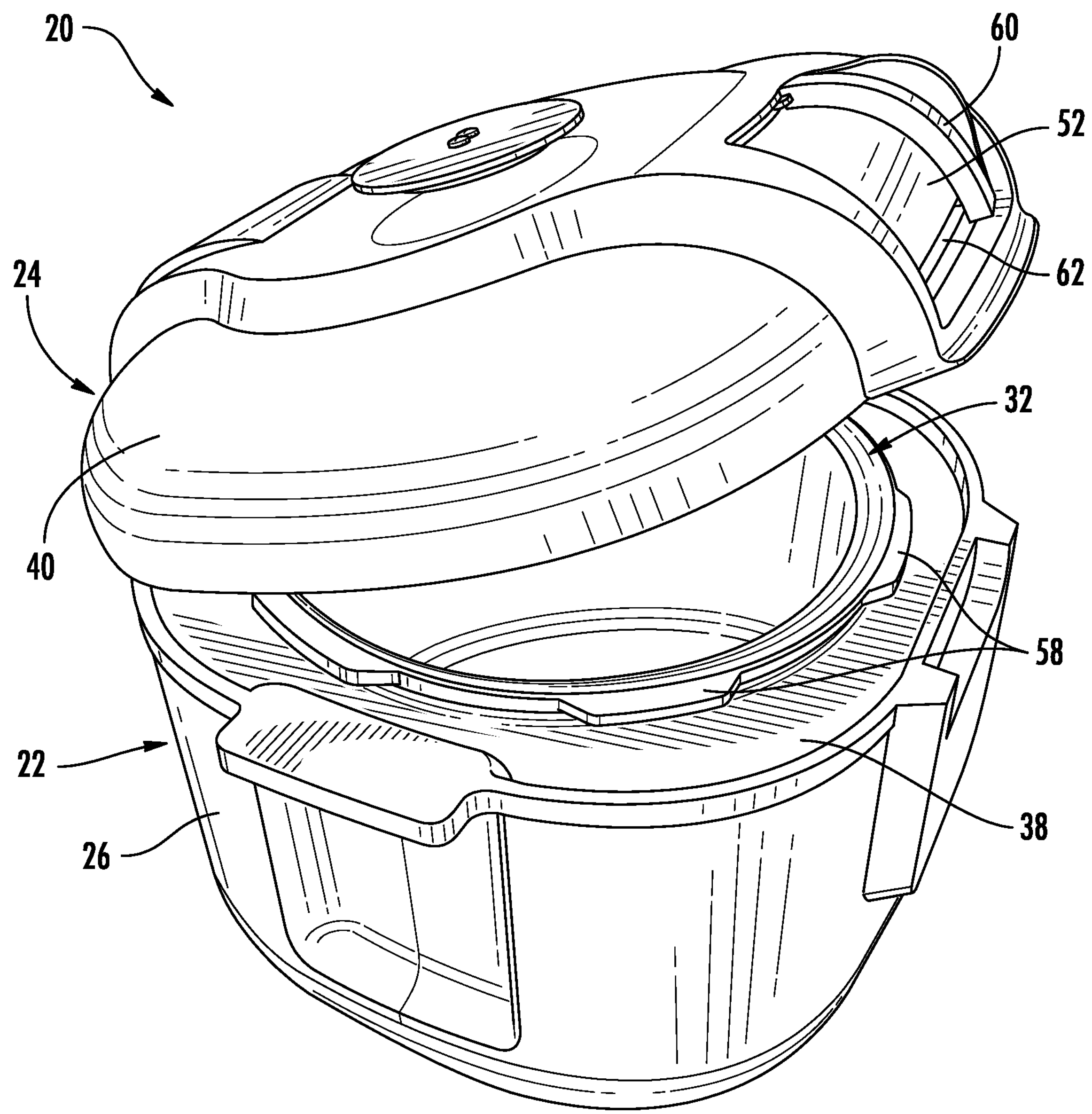
FIG. 8 is a side perspective view of a cooking system according to an embodiment.
Figure 9:
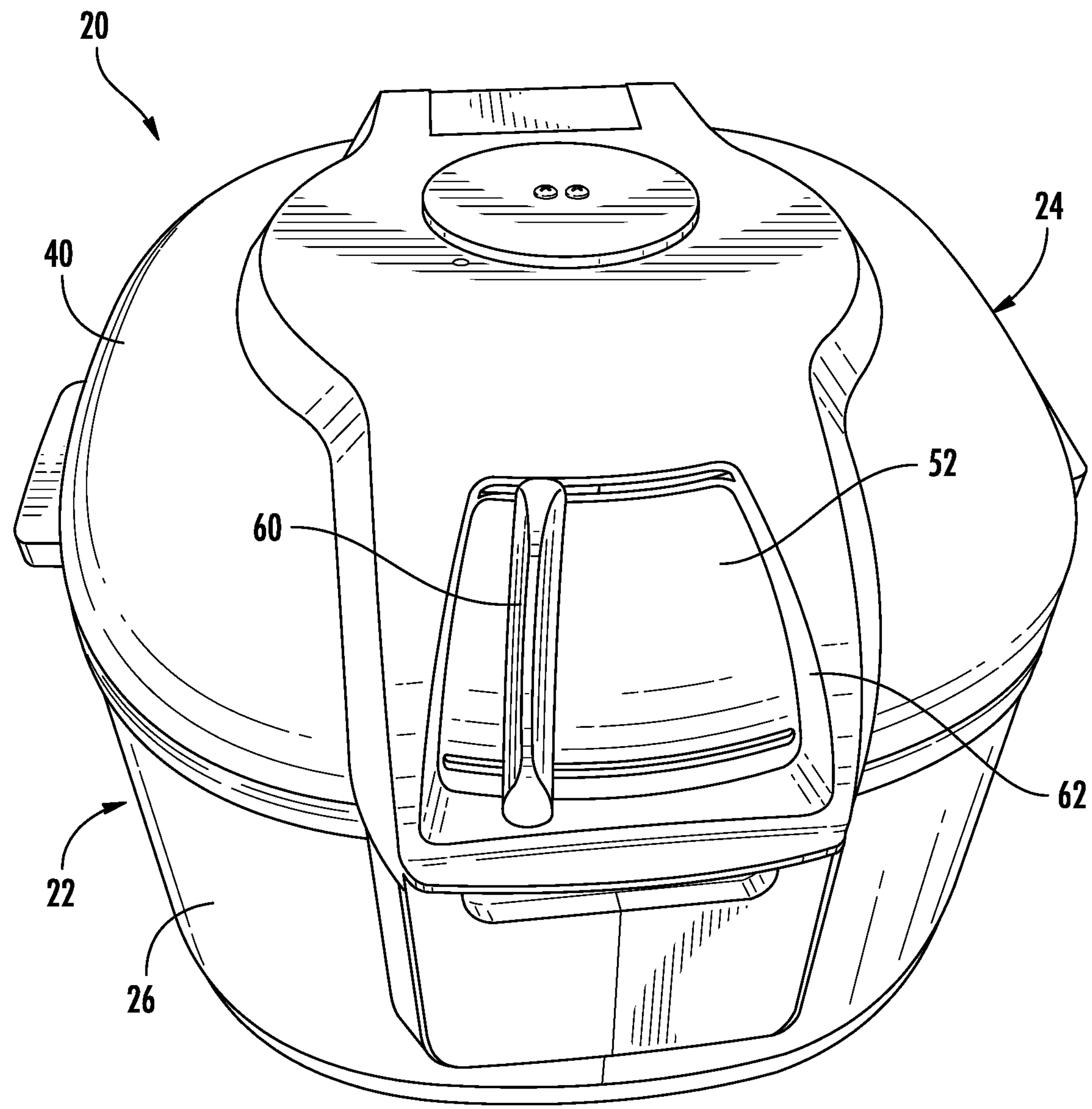
FIG. 9 is a front perspective view of a lid of the cooking system in a pressure-tight configuration according to an embodiment.
Figure 10A:
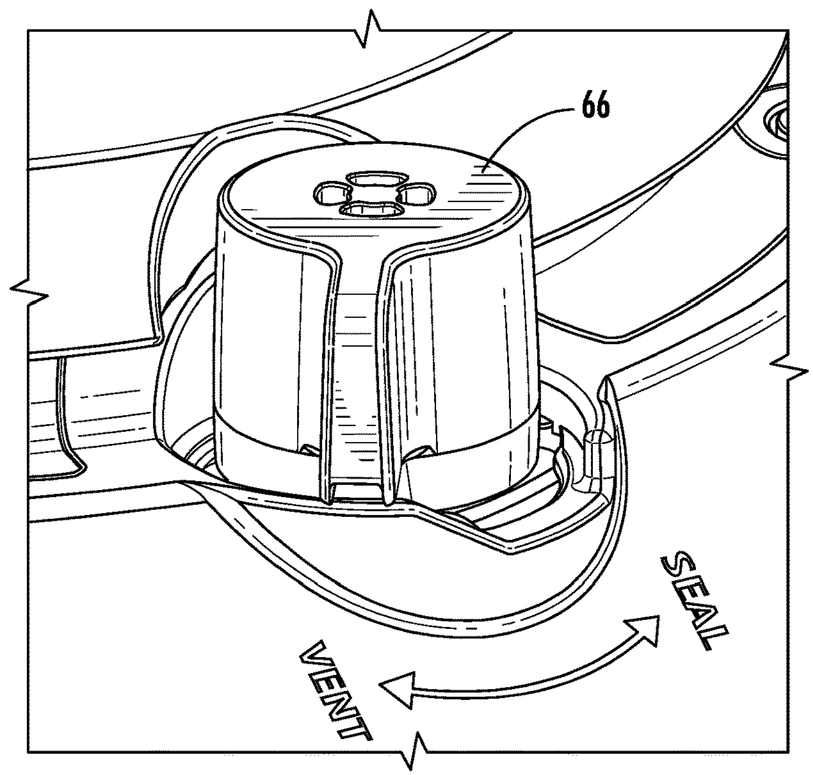
FIG. 10A is a perspective view of a pressure relief valve in an open configuration.
Figure 10B:
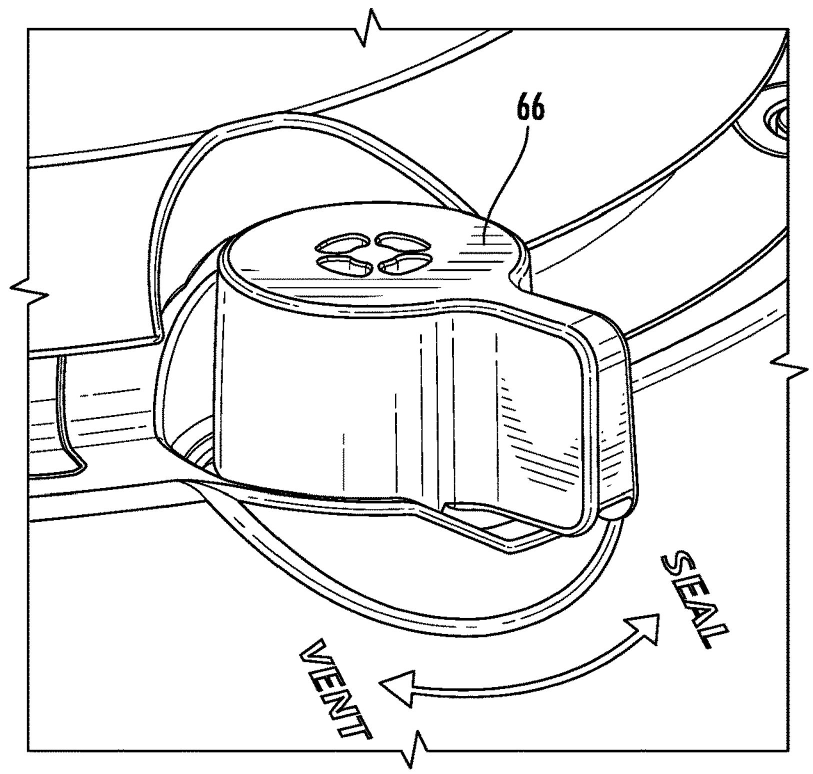
FIG. 10B is a perspective view of a pressure relief valve in a closed configuration.
Figure 11A:
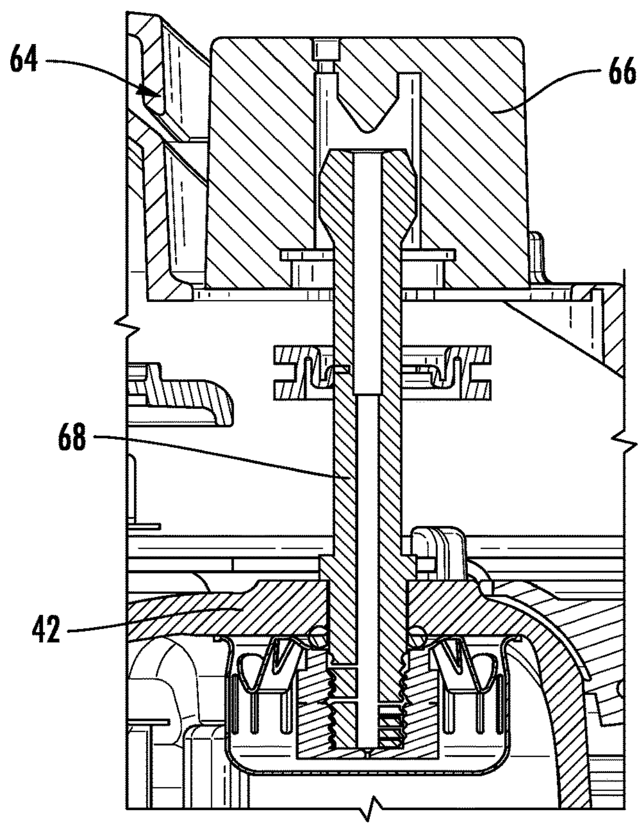
FIG. 11A is a cross-sectional view of the pressure relief valve in an open configuration according to an embodiment.
Figure 11B:
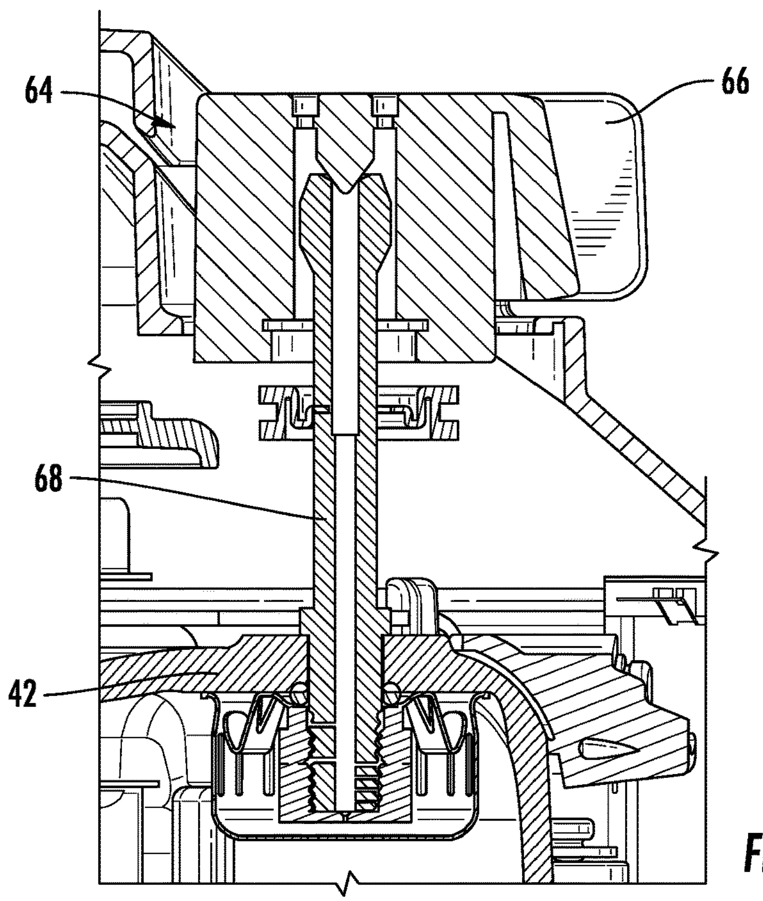
FIG. 11B is a cross-sectional view of the pressure relief valve in a closed configuration according to an embodiment.

The system 20 may also include embodiments wherein additional steps beyond simply closing the lid 24 may have to be taken in order to form the pressure tight seal. In other words, closing the lid 24 relative to the base 22 may not automatically form a pressure-tight seal there between. In such an exemplary embodiment, the lid 24 additionally includes a lid lock 52. As best shown in FIGS. 4-6, the lid lock 52 is arranged within the interior of the lid housing 40, such as generally concentrically with a portion of the inner lid liner 42 relative to a central axis of the lid 24. In the illustrated, non-limiting embodiment, the lid lock 52 has a ring shaped or annular body aligned with a bottom surface of the lid housing 40 and/or the inner lid liner 42. An inner surface 53 of the lid lock 52 may be positioned generally adjacent to or in directly contact with an exterior surface 55 of the inner lid liner 42. In an embodiment, the lid lock 52 is movable, such as rotatable about an axis relative to the lid housing 40 and the inner lid liner 42, to selectively apply a pressure to move the sealing surface 46 into engagement with the cooking container 32 to form a pressure-tight seal therebetween. However, in other embodiments, it should be understood that closing the lid 24 relative to the base 22 may form a pressure-tight press-fit connection between the sealing surface 46 and/or the cooking container 32.

Regardless of whether rotation of the lid lock 52 is required to form a pressure-tight seal, the lid lock 52 is operable as a locking mechanism that retains or lock the lid 24 in the closed position relative to the base 22. For example, as shown in FIGS. 5-8, the lid lock 52 includes a first portion of a bayonet locking system such that by rotating the lid lock 52, one or more engagement members 56 (FIGS. 5-7) formed on the lid lock 52 abut or intermesh with one or more engagement members 58 (FIG. 8) of a complementary second portion of the bayonet locking system extending from an upper portion of the housing 26 to restrict movement of the sealing surface 46 away from the cooking container 32 in response to an increased pressure within the heating volume. In other embodiments where a pressure-tight seal is formed upon closing the lid 24 relative to the base 22, another locking mechanism, distinct from the lid lock 52 may be operable to maintain the sealing surface 46 in sealing engagement with the cooking container 32 once a pressurized environment is generated.

At least a portion of or a part connected to and extending from the lid lock 52 may be accessible at an exterior surface of the cooking system 20 for manipulation by a user to selectively lock the lid 24 to the base 22 so as to form and/or maintain a pressure-tight heating volume defined between the interior surface 54 of the inner lid liner 42 and the cooking chamber 34 of the cooking container 32 (to be described in more detail below). In the illustrated, non-limiting embodiment, best shown in FIGS. 1 and 5-9, the lid lock 52 includes an outwardly extending protrusion 60, also referred to herein as a mode selector, arranged within an opening 62, for example a slot, formed at an exterior surface of the lid housing 40. In such embodiments, a user may transform the lid lock 52 between locked and unlocked configurations by translating the mode selector 60 within the opening 62 between a first position and a second position. Although the inner lid liner 42 is described herein as being stationary and the lid lock 52 is described as being movable relative to the inner lid liner 42, embodiments where the inner lid liner 42 is coupled to or formed as a unitary body with the lid lock 52, such that both the inner lid liner 42 and the lid lock 52 are movable relative to the lid housing 40 in unison are also within the scope of the disclosure.

With reference now to FIGS. 1 and 10A-11B, the lid 24 may additionally include a pressure release mechanism 64, such as a vent or valve. In embodiments where a movement of the lid 24 is restricted to maintain the pressure-tight seal, the pressure release mechanism 64 may be formed in the stationary inner lid liner 42, such as in an upper surface or side surface or the inner lid liner 42 for example. However, it should be understood that in embodiments where the inner lid liner 42 is rotatable about an axis relative to the lid housing 40, the pressure release mechanism 64 coupled to the inner lid liner 42 may be adapted to couple to the inner lid liner 42 only when in the sealed position, or alternatively, to move with the inner lid liner 42.

The pressure release mechanism 64 may be configured to automatically open to release air from within the heating volume formed between the inner lid liner 42 and the cooking container 32 when the pressure therein exceeds a predetermined threshold, such as during operation of the cooking system 20 in a first cooking mode performing a pressure cooking operation. Alternatively, or in addition, the pressure release mechanism 64 is manually operable, such as rotatable about a vertically oriented axis for example, to release air or fluid from within the heating volume. An example of a manually operable pressure release mechanism 64 is shown in FIGS. 10A-11B. In the illustrated, non-limiting embodiment, a connector 66 operably coupled to a movable portion 68 of the pressure release mechanism 64, such as a knob for example, is arranged at an exterior surface of the lid 24 for access by an operator. As the knob 66 is rotated between a first, open position (FIG. 10A) and second, closed position (FIG. 10B), the movable portion 68, such as a valve stem for example, is configured to rotate and/or translate to selectively seal or expose an opening formed in the inner lid liner 42 in fluid communication with the interior of the cooking container 32.

The cooking system 20 includes at least one heating element operable to impart heat to the heating volume during one or more of a plurality of cooking modes of the cooking system 20. In the illustrated, non-limiting embodiment, a first or upper heating element 70 is positioned generally at or above an upper extent of the cooking container 32, such as proximate a center of the interior 34 of the cooking container 32 for example. As shown, the at least one first heating element 70 is mounted within the lid 24 (and may also be referred to as lid heating element 70), and therefore completely outside of the cooking container 32, and vertically offset from the upper extent thereof. In the illustrated, non-limiting embodiment, the first heating element 70 is arranged within the interior 72 of the inner lid liner 42, such as at a position offset from an interior surface 54 of the inner lid liner 42. In the illustrated non-limiting embodiment, a second or lower or base heating element 74 is also disposed within the housing 26, generally adjacent the bottom 76 of the cooking container 32. However, it should be understood that embodiments where a heating element is arranged at another location within the base 22 and/or the lid 24 are also contemplated herein.

The at least one first and second heating element 70, 74 may be capable of performing any suitable type of heat generation. For example, a first and second heating element 70, 74 configured to heat the cooking container 32 or one or more food items located within the cooking chamber 34 of the cooking container 32 via conduction, convection, radiation, and induction are all within the scope of the disclosure. In the illustrated, non-limiting embodiment, the first heating element 70 is operable to cook food within the cooking container 32 via a non-contact cooking operation. As used herein, the term "non-contact cooking operation" includes any cooking operation where a heating element or heat source is not arranged in direct or indirect contact with a food item, such as, but not limited to, convective and radiant heating. In such embodiments, the cooking system 20 additionally includes an air movement mechanism 78, such as a fan for example, operable to circulate air within the cooking volume. The air is heated as it flows along its path of circulation, such as by flowing over a portion of the at least one first heating element 70. In such embodiments, the first heating element 70 is operable to perform a convective heating operation. Convective heating operations may also generally be referred to as "dry cooking operations," which include any cooking mode that creates a "dry cooking environment" within the container 24, such as but not limited to air frying, broiling, baking/roasting and dehydrating. To create a dry cooking environment, air and moisture are actively exhausted or vented from the cooking enclosure to outside the cooking system 20, thereby maintaining a minimum level of moisture within the container 24. Temperatures associated with the various exemplary but non-limiting convective/non-contact/dry cooking modes are between about 100° F. and 475° F. For example, temperatures associated with an air frying operation may be between about 300° F., temperatures associated with a roasting operation may be between about 250° F. and about 400° F., temperatures associated with a dehydrating operation may be between about 100° F. and about 200° F., and a broiling operation may be at a temperature of about 450° F. However, the temperatures provided herein are intended as an example only and it should be understood that any of the cooking modes described herein may be performed at other temperatures.

Figure 12:
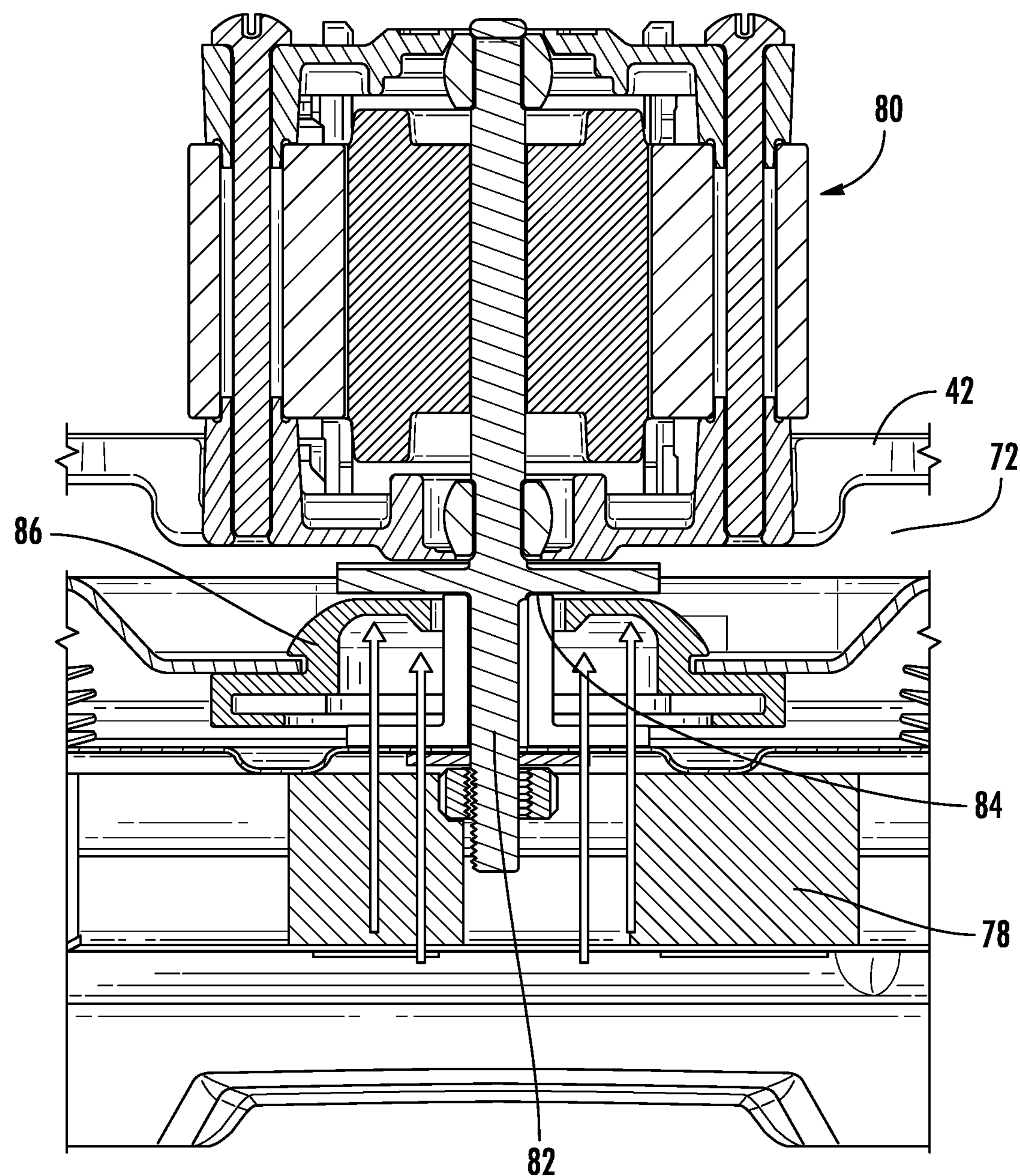
FIG. 12 is a cross-sectional view of a sealing element of the cooking system according to an embodiment.

In the illustrated, non-limiting embodiment, the air movement mechanism 78 is arranged within the interior 72 of the inner lid liner 42, downstream from the first heating element 70 relative to the path of circulation of the air. The air movement mechanism 78 is driven by a motor 80 having a separate cooling mechanism coupled thereto. In an embodiment, best shown in FIG. 12, the motor 80 is arranged on an opposite side of the inner lid liner 42 as the air movement mechanism 78. Accordingly, a motor shaft 82 of the motor 80 extends through an opening 84 formed in the inner lid liner 42. In an embodiment, a sealing device, such as a gasket 86 for example, is positioned between the motor shaft 82 and the inner lid liner 42 to minimize or eliminate friction of the motor shaft 82 as it rotates, while maintaining a pressure tight seal with the inner lid liner 42. In an embodiment, the gasket 86 is designed to deflect in response to pressure. In such embodiments, when the heating volume is not pressurized, such as during air fry operations where the motor shaft 82 is rotated about its axis, no contact is formed between the motor shaft 82 and the gasket 86. Accordingly, when the heating volume is not pressurized, the motor shaft 82 is configured to rotate freely absent friction from the gasket 86. Further, the motor 80 is not configured to operate when the heating volume is pressurized. Therefore, in response to the pressure within the heating volume, the gasket 86 will deflect to form a retaining feature that creates an air-tight seal with the motor shaft 82, thereby allowing pressure to build within the heating volume.

In an embodiment, the second heating element 74 is operable to cook food within the cooking container 32 via a contact cooking operation. As used herein, the term "contact cooking operation" includes a cooking operation where heat is transmitted via direct or indirect contact between a heating element or heat source and a food item, such as, but not limited to, conductive cooking. Inductive cooking via the lower heating element 74 is also contemplated herein. It should be understood that embodiments where the first heating element 70 is operable to perform a contact cooking operation and embodiments where the second heating element 74 is operable to perform a non-contact cooking operation are also within the scope of the disclosure. Non-contact or conductive cooking operations may generally be referred to as "wet cooking" operations, such as but not limited to pressure cooking, steam cooking, slow cooking, searing, and sautéing. To create a wet cooking environment the majority of the moisture within the container, i.e. liquid added to the container 24 or moisture released from the food within the container 24, is retained within the container as the food is cooked. Although during conductive cooking operations a minimal amount of air having moisture entrained therein may be vented from the system, such air is passively removed from the cooking enclosure. Pressure cooking as used herein will allow for cooking in a pressurized environment at or above 40 kPa (with a range of 40 kPa to 90 kPa).

Further, in embodiments including a first heating element 70 and a second heating element 74, it should be understood that the first and second heating elements 70, 74 may be operable independently or in combination to apply one or more predetermined power settings to cook the food products within the cooking container 32. In operation, the first and second heating elements 70, 74 may be capable of cooking the food independent of the loading of the food. In other words, the first and second heating elements 70, 74 may be capable of cooking the food independent of the amount of food within the cooking container 32. The cooking operations that may be performed by the cooking system 20 include but are not limited to pressure cooking, steam cooking, slow cooking, searing, sautéing air frying, broiling, baking/roasting, dehydrating, and grilling.

With reference to FIGS. 4-6, the lid 24 includes a heater/fan cover 90 that protects: a user from the first, heating element 70 and an air movement mechanism 78 and protects: the first heating element 70 and an air movement mechanism 78 from the areas of the cooking system 20 where food is cooked. In the illustrated non-limiting embodiment, the cover 90 is mounted within the lid 24, such as adjacent, and more specifically upstream from, the first heating element 70 relative to an air flow. The cover 90 may be sized to substantially overlap, and therefore protect, the entire surface of the first heating element 70 facing the cooking volume. In an embodiment, a contour of the cover 90 is generally complementary to the shape of the first heating element 70 to protect the surface of the first heating element 70 closest to or facing the cooking chamber 34. However, in other embodiments, the contour of the cover 90 may be complementary to the interior of the lid 24.

As best shown in FIGS. 5 and 6, the cover 90 generally includes a body formed from any suitable heat-resistant material. The body of the cover 90 has a plurality of openings 92 formed therein to allow hot air circulating, within the cooking chamber 34 of the cooking container 32 to pass there through. In the illustrated, non-limiting embodiment, the cover 90 has a nano-ceramic coating and is mounted via any suitable mounting mechanism, such as via one or more fasteners for example, and may be removably or permanently arranged therein. Accordingly, when the lid 24 is in the closed position, the cover 90 is arranged generally above the first open end of the cooking container 32.

To prevent the pressure within heating volume from increasing during a non-pressurized cooking operation as a result of the increased temperature, the cooking system 20 includes at least one vent for fluidly connecting the heating volume, and therefore the interior 34 of the cooking container 32, with the ambient atmosphere external to the cooking system 20. Although, the one or more vents are illustrated and described herein as being formed in a portion of the lid 24, it should be understood that vents arranged at another suitable location of the cooking system 20 are within the scope of the disclosure.

Figure 19:
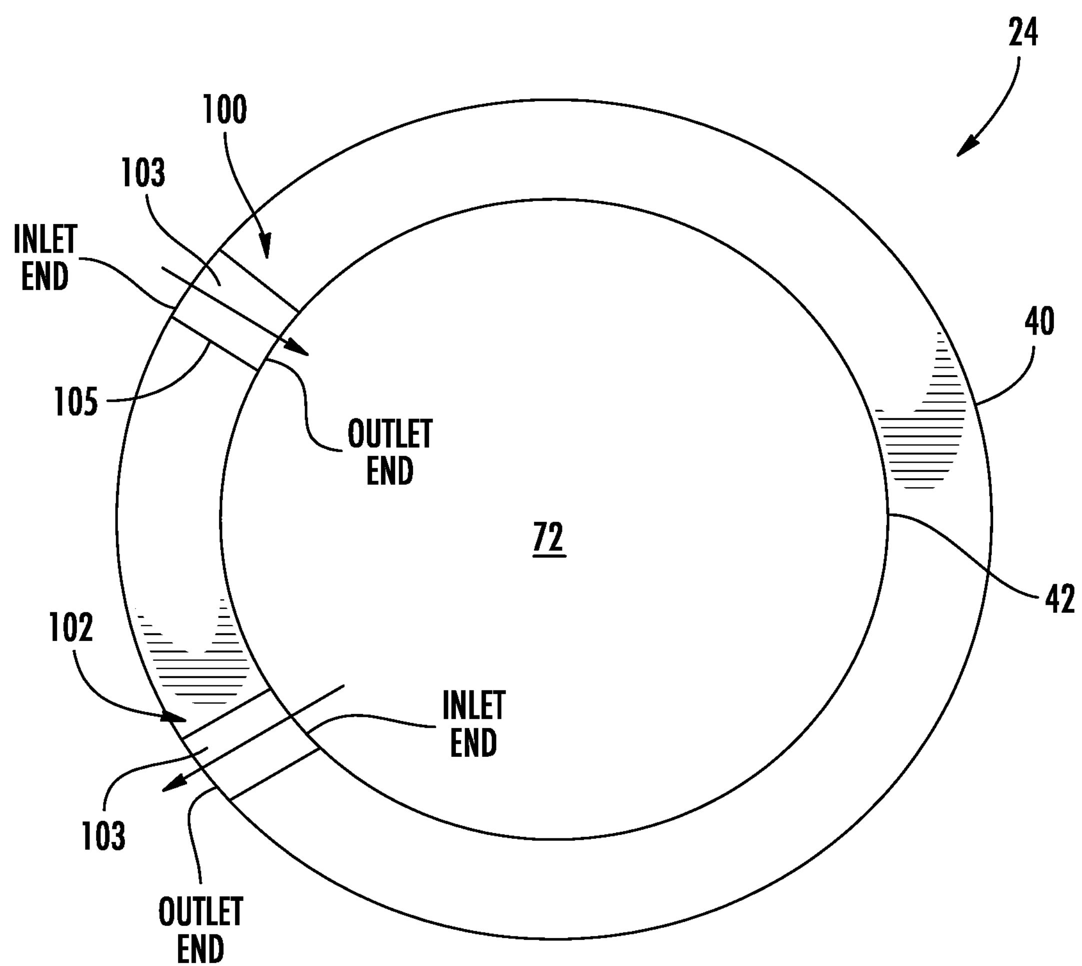
FIG. 19 is a schematic diagram of the venting system of the lid according to an embodiment.

As best shown in FIGS. 16A-17C and FIG. 19, the cooking system 20 includes at least one inlet vent 100 through which a fluid is configured to flow into the heating volume and at least one outlet vent 102 through which a fluid is expelled from the heating volume. In an embodiment, each of the at least one inlet vent 100 and outlet vent 102 is operable to control a flow through the inner lid liner 42 and into or out of the heating volume. As best shown in FIG. 19, the inlet vent 100 and outlet vent 102 each include an opening 103 having an inlet end and an outlet end associated with or defined in the lid housing 40 and the inner lid liner 42, respectively. For example, the inlet end of the opening 103 of the inlet vent 100 is formed in the lid housing 40 and the outlet end of the opening 103 of the inlet vent 100 is located at the inner lid liner 42. Similarly, the inlet end of the opening 103 of the outlet vent 102 is arranged at the inner lid liner 42 and the outlet end of the opening 103 of the outlet vent 102 is formed in the lid housing 40. Accordingly, each of the openings 103 defines a fluid flow path extending between the ambient atmosphere surrounding the exterior of the lid 24 and the atmosphere within the interior 72 of the inner lid liner 42. In an embodiment, a conduit 105 may extend between lid housing 40 and the inner lid liner 42 to define one or more boundaries of a respective fluid flow path of the inlet and outlet vents 100, 102. However, in other embodiments, the portion of the fluid flow path extending between the interior 53 of the lid housing 40 and the exterior 55 of the inner lid liner 42 may be unbounded. In such embodiments, a pressure differential, such as resulting from operation of the air movement device 78 for example, may be sufficient to move a flow between the inlet and outlet ends of the fluid flow path of each of the inlet and outlet vents 100, 102, respectively. In yet another embodiment, the surface 55 of the inner lid liner 42 may directly abut the surface 53 of the lid housing 40 at the inlet and outlet ends of the openings 103. As a result, flow through the inlet end and outlet end of each opening 103 may be aligned and directly position next to one another such that a fluid flow passes directly between the body of the lid housing and the body of the inner lid liner 42.

With reference again to FIG. 3, the motor 80 may be arranged within a motor cavity 81 isolated from the remainder of the interior 44 of the lid 24. As shown, a motor cavity vent 104 may be formed in the lid 24 in fluid communication with the motor cavity 81. Air is configured to flow through the motor cavity 81 to cool the motor 80. In an embodiment, another air movement device 83 (see FIG. 4) is positioned within the motor cavity 81. This air movement device 83 may be driven by the motor 81 and is operable to facilitate a cooling flow into and out of the motor cavity 81.

One or more of the at least one inlet vent 100 and outlet vent 102 may be adjustable to control the amount of a fluid, such as air for example, provided to or exhausted from the heating volume. In an embodiment, each of the at least one inlet vent 100 and the at least one outlet vent 102 includes an element 106, such as a flap, slat, or another mechanism for example, that is movable to cover or expose at least a portion of the opening 103 of the inlet and outlet vents 100, 102, respectively. The at least one inlet vent 100 and the movable element 106 associated therewith may be considered a first venting system and the at least one outlet vent 102 and the movable element 106 associated therewith may be considered a second venting system.

Figure 13:
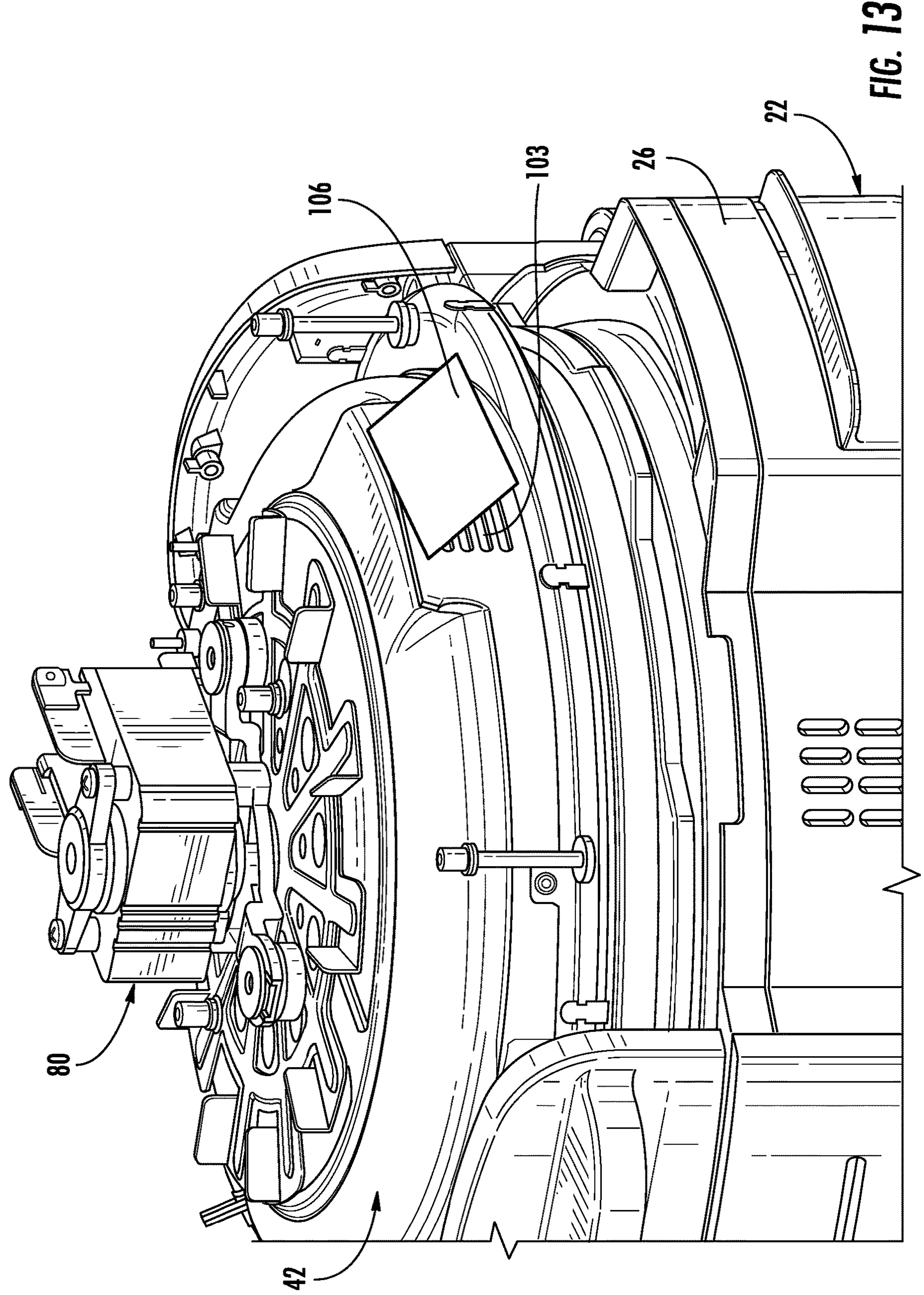
FIG. 13 is a perspective view of a portion of a lid of the cooking system according to an embodiment.
Figure 14:
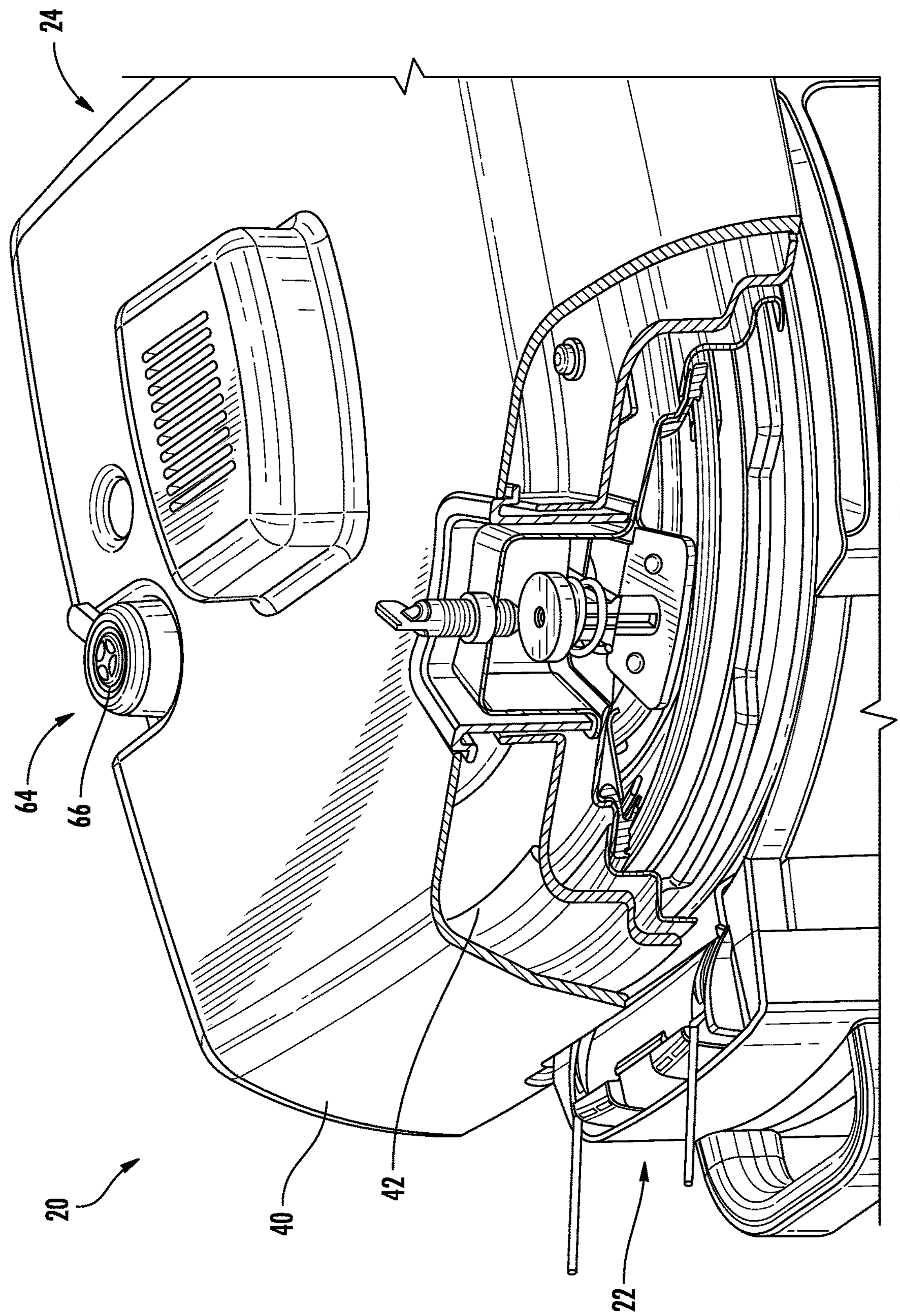
FIG. 14 is a perspective view of a partially cut away lid of the cooking system according to an embodiment.
Figure 15:
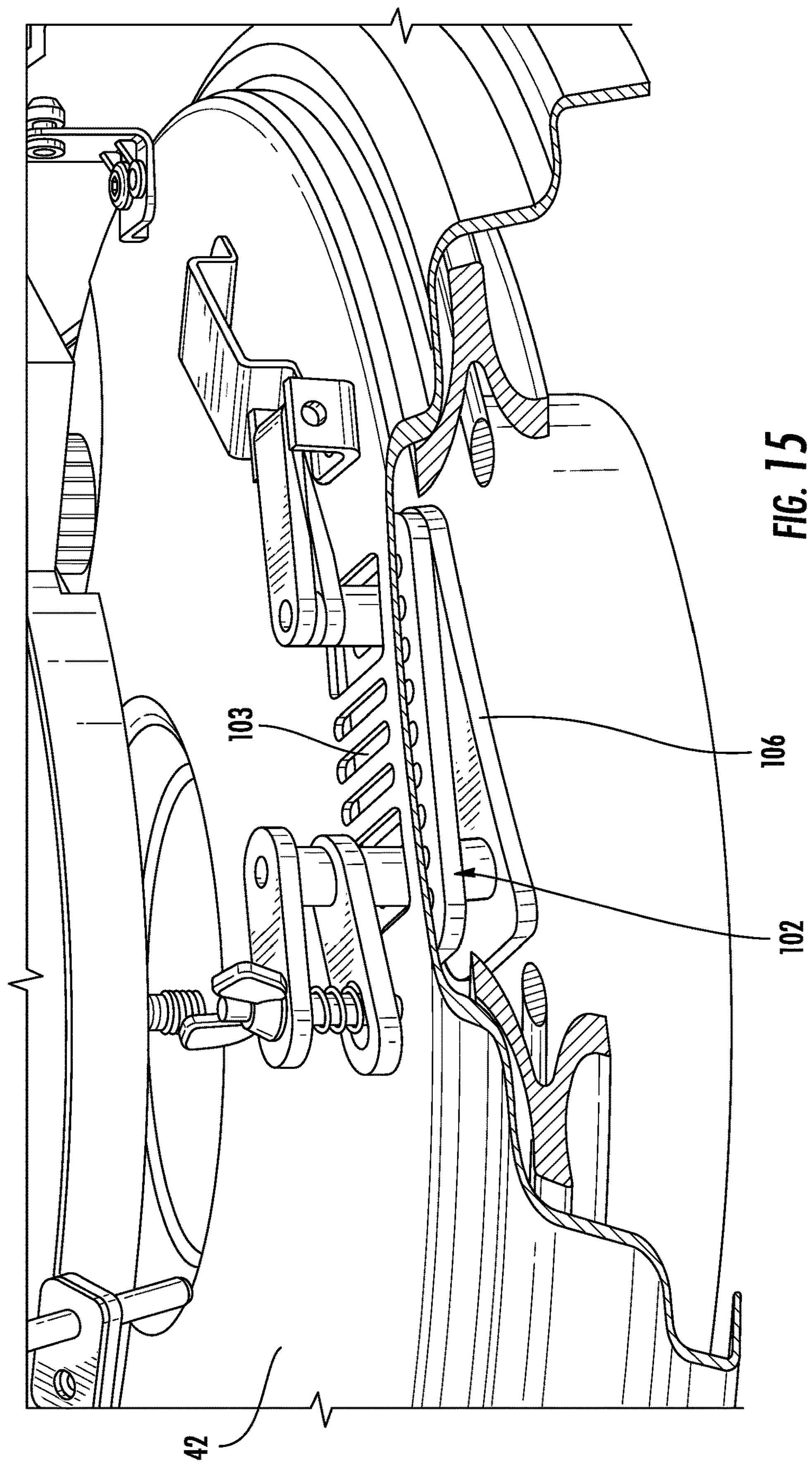
FIG. 15 is a perspective view of a partially cut away lid of the cooking system according to an embodiment.

In an embodiment, illustrated in FIG. 13, the movable element 106 is a flap or door arranged at an outer periphery of the inner lid liner 42 and movable vertically in and out of contact with an opening 103. With reference again to FIGS. 5-6 and FIGS. 15-17C, the movable element 106 may alternatively be arranged within the interior of the inner lid liner 42 adjacent to the outlet end of the opening 103 of the inlet vent 100 and the inlet end of the opening 103 of the outlet vent 102. In such embodiments, the movable element 106 is at a first, position, at least partially separated from the opening 103 when the cooking container 32 is not pressurized. For example, as shown in FIG. 15, during an air fry operation, a least a portion of the movable element 106 is in a vertically lowered position, offset from the opening 103, such that air and steam are free to flow through the opening 103. However, once a pressure within the heating volume increases and exceeds a threshold, the pressure may be configured to act on and move the movable element 106. The force exerted by the pressure on the movable element 106 may move the element to a second position such that the movable element 106 blocks or seals the opening 103. Accordingly, when the movable element 106 is in the second position, such as during a pressure cooking operation for example, the movable element 106 seals the opening 103 thereby allowing the pressure within the cooking container 32 to increase. However, it should be understood that embodiments including a movable element 106 having another configuration and also embodiments where the movable element 106 moves in a different manner are also within the scope of the disclosure.

In an embodiment, a portion of the movable element 106 remains directly adjacent to the opening 103 as the movable element 106 moves relative to the housing 26 or lid 24. For example, the movable element 106 may have a first end 108 that remains generally fixed relative to an adjacent opening 103 and a second end 110 configured to move relative to the opening 103, thereby exposing at least a portion of the opening 103 to allow a fluid to flow there through. With reference to again FIGS. 16A-17C, in an embodiment, the second end 110 of the movable element 106 is configured to pivot or rotate relative to the opening 103. However, other types of movement, such as translation of the movable element 106 for example, are also contemplated herein.

In the illustrated, non-limiting embodiment, the movable element 106 is configured to rotate about an axis oriented generally parallel to the axis of rotation of the air movement mechanism 78. In such embodiments, the second movable end 110 may be configured to rotate inwardly toward a center of the lid 24. Accordingly, the flow path defined between the opening 103 and the rotated movable element 106 increases with respect to a direction of flow relative to the vent 100, 102. For example, in embodiments where the air movement mechanism 78, and therefore the air flow within the interior of the inner lid liner 42, is rotating in a clockwise direction, the downstream or trailing end of the movable element 106 associated with the inlet vent 100 is rotated inwardly. As a result, the portion of the opening 103 adjacent to the trailing end of the movable element 106 has a greater airflow capacity than portion of the opening 103 adjacent to the leading end of the movable element 106. Similarly, the upstream or leading end of the movable element 106 associated with the outlet vent 102 may be configured to rotate inwardly. As a result, the portion of the opening 103 adjacent the leading end of the movable element 106 has a greater airflow capacity than the portion of the opening 103 adjacent to the trailing end of the movable element 106.

Figure 16A:
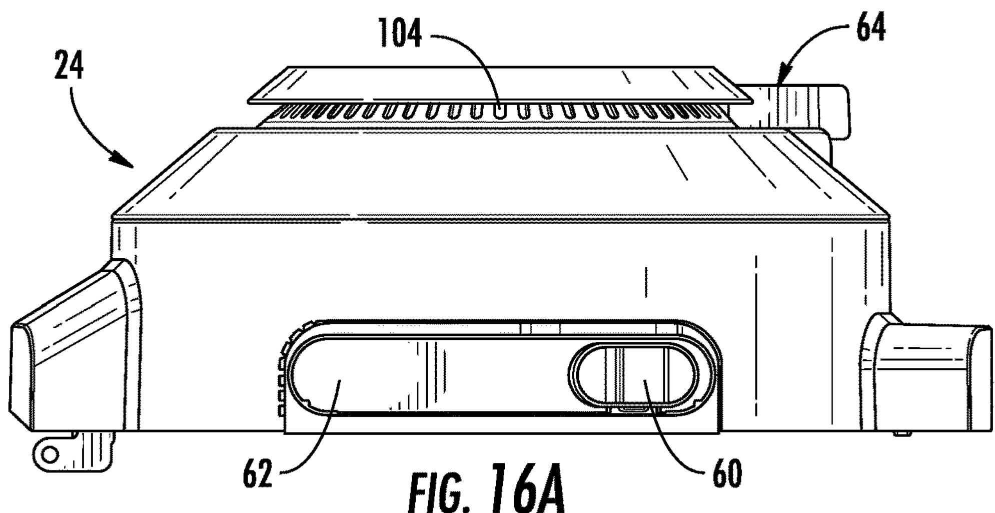
FIGS. 16A, 16B, and 16C are front views of a lid of a cooking system according to an embodiment.
Figure 16B:
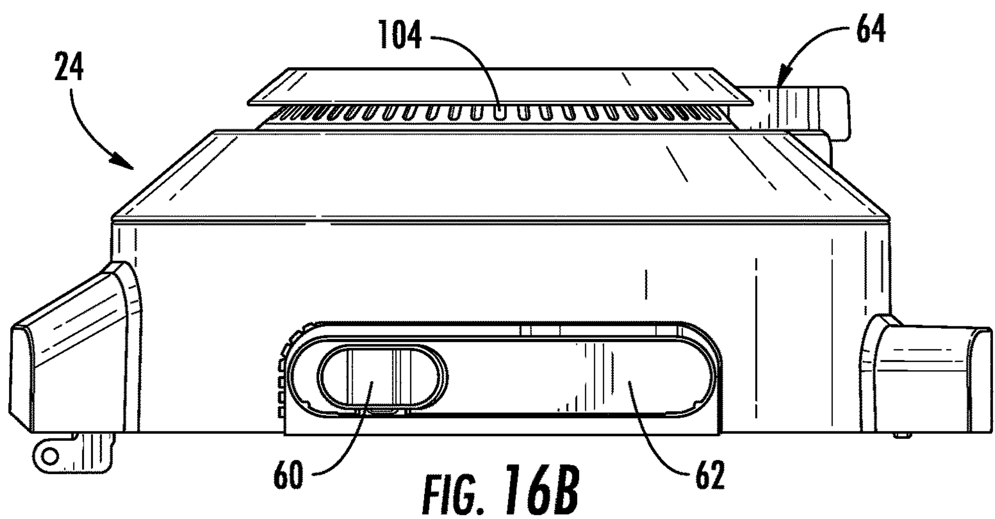
Figure 16C:
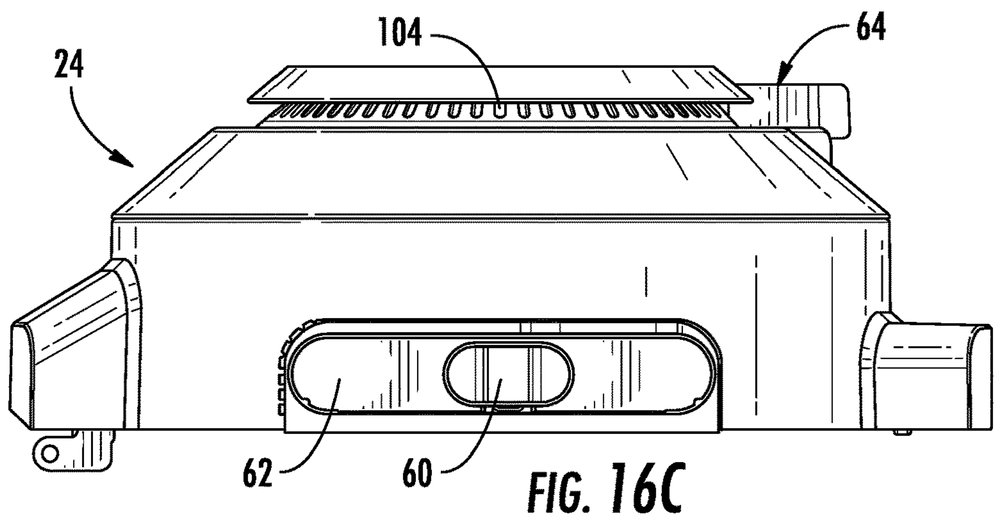
Figure 17A:
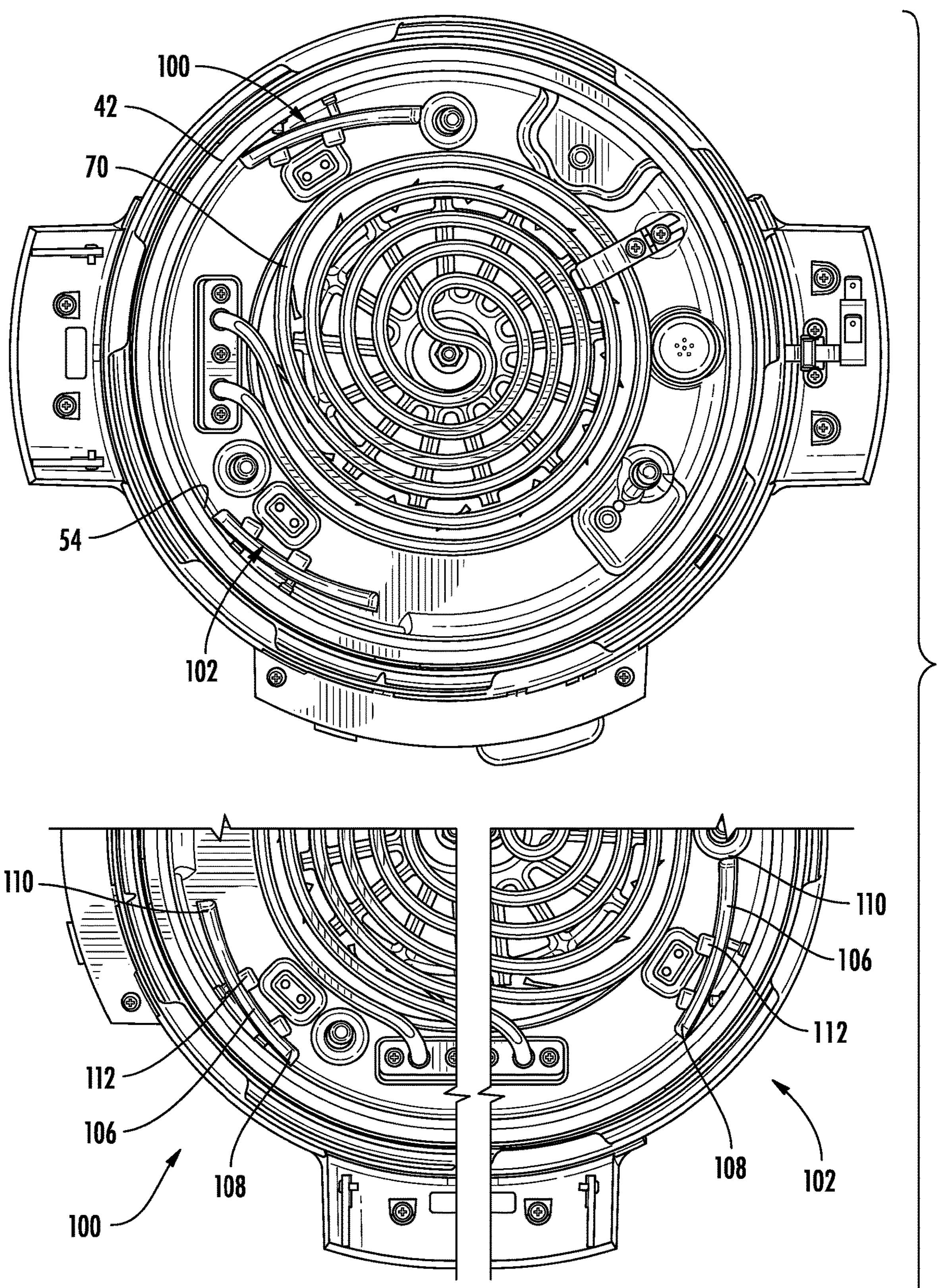
FIGS. 17A, 17B, and 17C are various top views of a lid according to an embodiment.
Figure 17B:
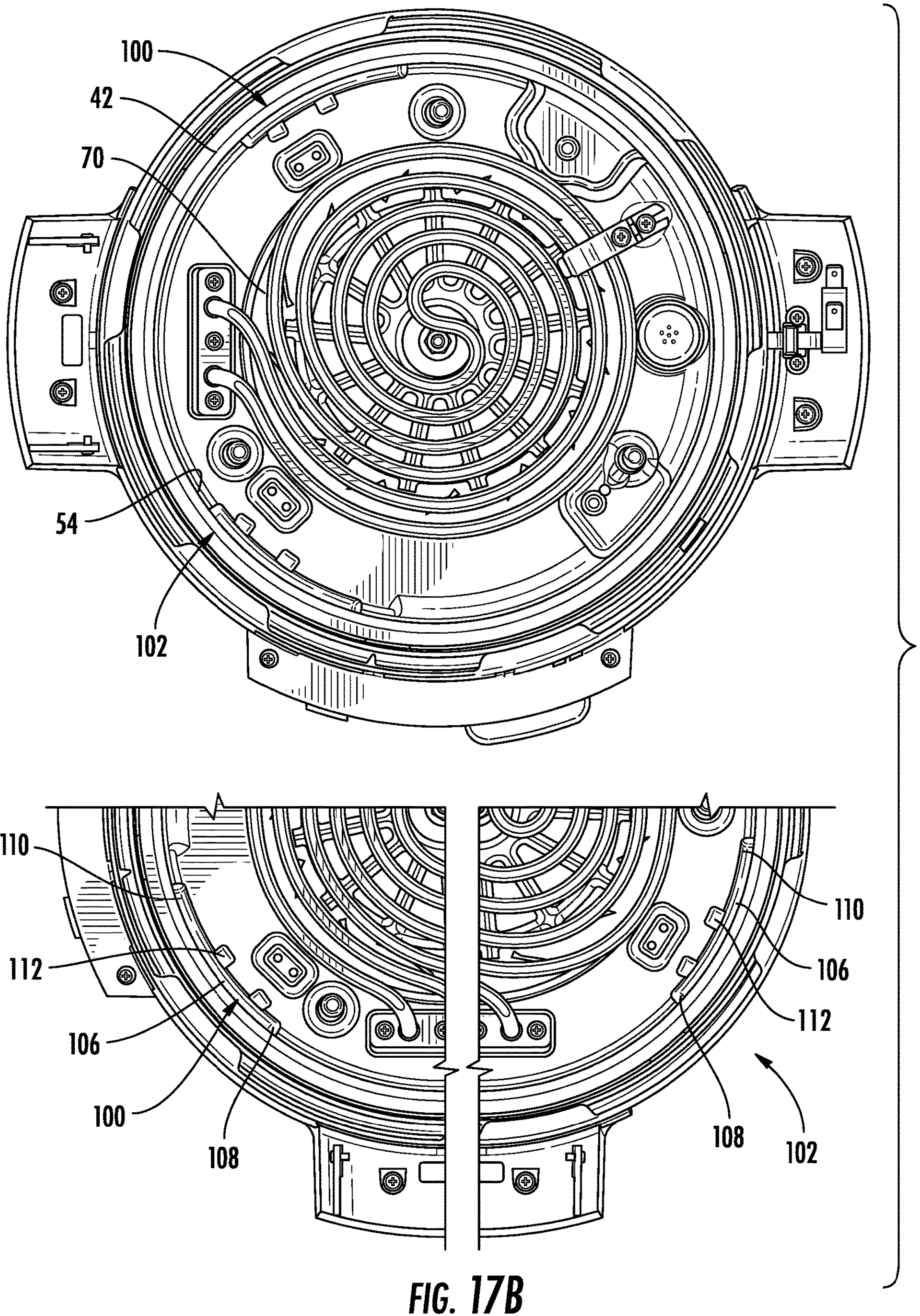
Figure 17C:
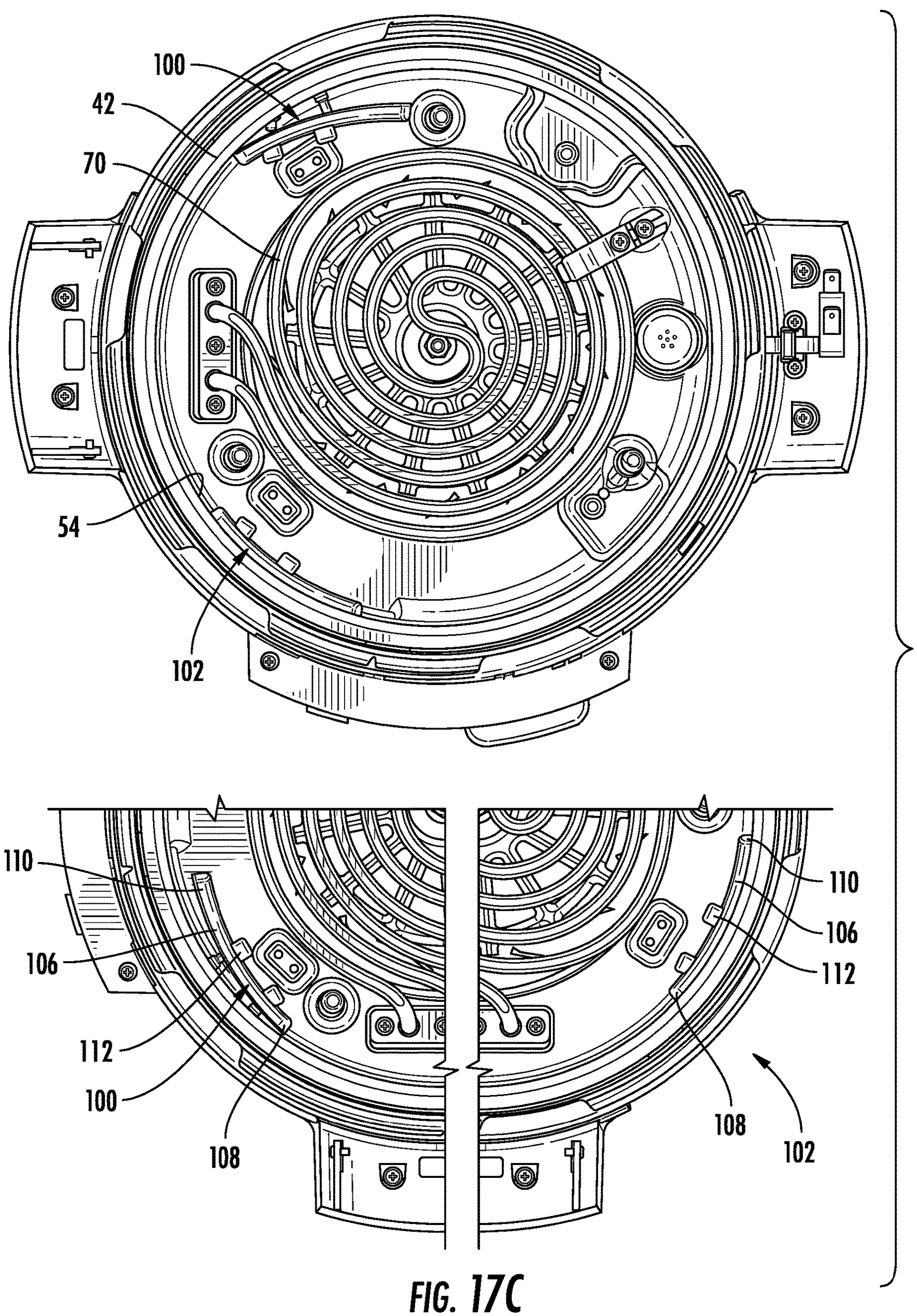

In an embodiment, the position of the movable element 106 relative to the opening 103 is adjustable to control a flow through one or both of the inlet vent 100 and the outlet vent 102 in response to a selected mode or cooking operation of the cooking system 20. For example, during a first cooking operation, such as an air frying operation, the inlet vent 100 may be partially or fully open, so that a fluid may flow through the opening 103 into the heating volume (see FIGS. 5, 16A and 17A). Further, the outlet vent 102 may also be at least partially or fully open to allow air to exhaust from the cooking container 32, thereby preventing the pressure within the heating volume from increasing in response to the air flow being drawn into the heating volume and operation of the heating element 70. With reference now to FIGS. 6, 16B 17B, during a second cooking operation, such as a pressure cooking operation, the opening 103 of both the inlet vent 100 and the outlet vent 102 may be sealed or substantially sealed to block air from flowing into and out of the heating volume. In such embodiments, a high-pressure cooking environment may be achievable, with pressure levels reaching and/or exceeding 40 kPa. Similarly, in an embodiment, best shown in FIGS. 16C and 17C, during a third mode of operation of the cooking system 20, such as a combination pressure cooking and air frying mode, the inlet vent 100 may be partially or fully open and the outlet vent 102 may be sealed.

In an embodiment, the lid lock 52 is used to adjust the position of the movable element 106 of at least one of the inlet vent 100 and the outlet vent 102 to control the flow therethrough. As a result, a user may transform the lid lock 52 between a first configuration and a second configuration to selectively seal the one or more inlet and outlet vents 100, 102. For example, when the mode selector 60 is adjacent to or in contact with a first side of the opening 62 (FIG. 5, 16A) and therefore the lid lock 52 is in a first configuration, at least one of the inlet vent 100 and the outlet vent 102 may be open such that the heating volume is not sealed. Similarly, when the mode selector 60 is arranged adjacent to or in contact with a second, opposite side of the opening 62 (FIG. 6, 16B), and therefore the lid lock 52 is in a second configuration, both the inlet vent 100 and the outlet vent 102 may be sealed, and as a result, pressure can build within the heating volume. It should be understood that this movement of the mode selector 60 within an opening 62 of the lid housing 40 to drive rotation of the lid lock 52 is intended as an example only, and that any suitable configuration of a lid lock 52 that allows a user to manipulate the sealing surface 46, to selectively form a pressure-tight seal with the housing 26 or the cooking container 32 is within the scope of the disclosure.

In an embodiment, the interior surface 53 of the lid lock 52 may include a ramp-like feature (not shown) configured to cooperate with a biased plunger 112 used to mount the movable element 106 to a portion of the lid 24, such as the inner lid liner 42, adjacent to a respective opening 103. As the mode selector 60 is rotated within the slot 62, the ramp-like feature will engage and apply an increasing force to the plunger 112 opposing its bias. This force will cause the plunger, and therefore the movable element 106, to move, such as in a direction away from the opening 103 for example. Movement of the mode selector 60 in the opposite direction will move the ramp-like feature out of engagement with the plunger 112 and the biasing force acting on the plunger 112 will cause the plunger 112 to move back to a neutral position. In an embodiment, in the neutral position, the movable element 106 is positioned directly adjacent to the opening 103, to block the airflow therethrough. Although engagement of the ramp-like feature and the plunger 112 is described as moving the element 106 away from the opening 103, it should be understood that embodiments where the engagement of the ramp-like feature and the plunger 112 moves the element 106 towards the opening 103 and the bias of the plunger 112 moves the element 106 away from the opening 103 are also contemplated herein. Further, it should be understood that the cooperation between the lid lock 52 and movable elements 106 as described herein is intended as an example only and any suitable mechanism for adjusting a configuration of the at least one vent is within the scope of the disclosure.

Although a configuration of the inlet vent 100 and the outlet vent 102 is described above as being dependent on a cooking operation, in other embodiments, the vents 100, 102 may be alternatively or additionally adjustable in response to feedback from one or more sensors disposed within the cooking volume. For example, a temperature of a heating element or within the cooking volume may be monitored by the sensors and/or used to control a position of the movable elements 106.

With reference again to FIGS. 1, 4, and 6, a control panel or user interface 120 of the cooking system 20 is positioned adjacent one or more sides of the housing 26 or the lid 24, such as a front of the housing 26 for example. The control panel 120 includes one or more inputs 122 associated with energizing the one or more heating elements 70, 74 of the cooking system 20 by selecting and/or initiating a mode of operation of the cooking system 20. One or more of the inputs 122 may include a light or other indicator to indicate to a user that the respective input has been selected. The control panel 120 may additionally include a display 124 separate from or integral with the at least one input 122.

Figure 18:
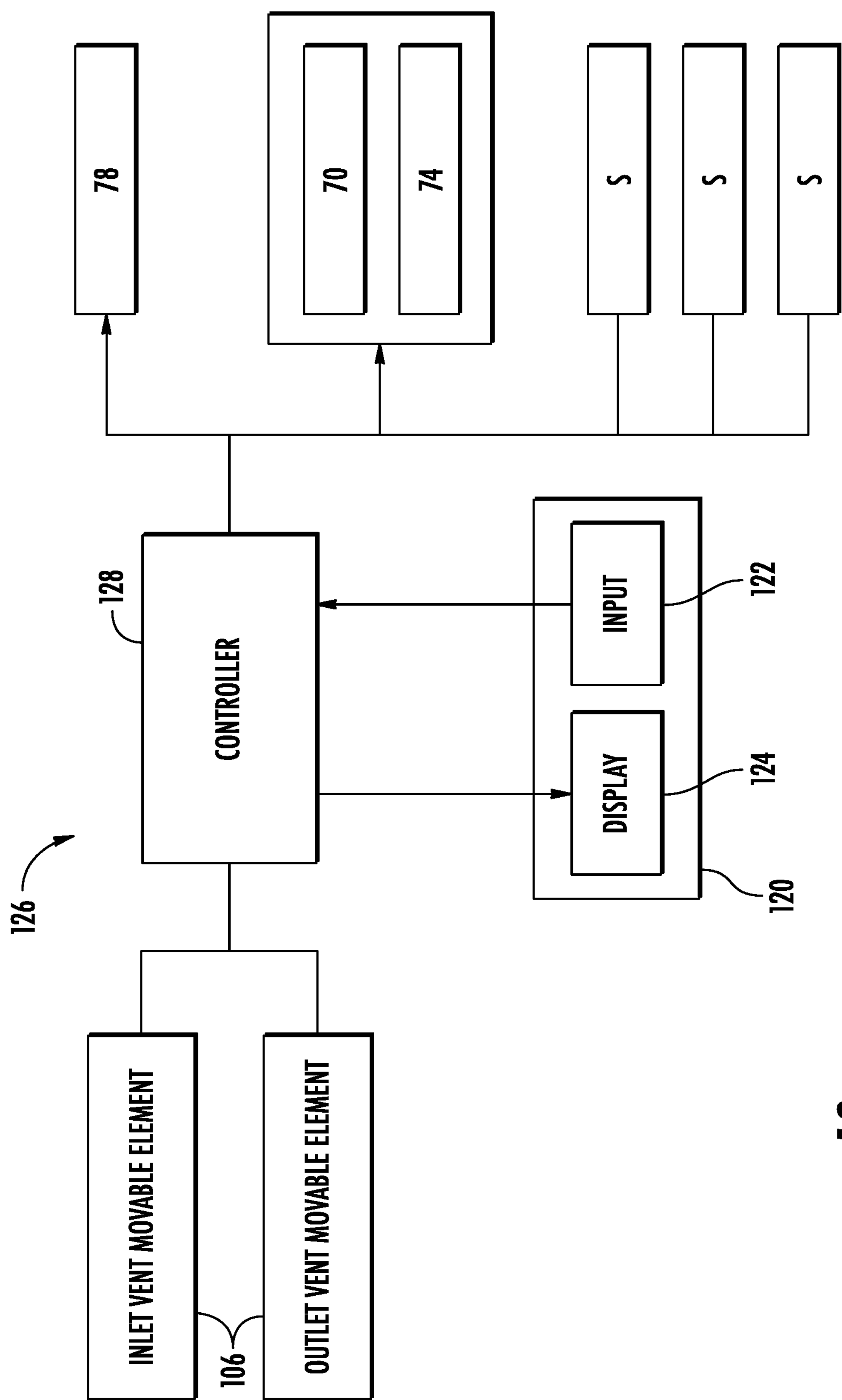
FIG. 18 is a schematic diagram of a control system of a cooking system according to an embodiment.

As shown in FIG. 18, a control system 126 of the cooking system 20 includes a controller or processor 128 for controlling operation of the heating elements 70, 74 and air movement mechanism 78 (including the motor 80 and fan associated therewith), and in some embodiments for executing stored sequences of heating operation. The controller 128 is operably coupled to the control panel 120, to the heating elements 70, 74, to the air movement mechanism 78, and in some embodiments, to the movable elements 106 for controlling a fluid flow through the inlet and outlet vents 100, 102. In addition, in an embodiment, one or more sensors S for monitoring one or more parameters (such as temperature, pressure, lid configuration, etc.) associated with operation of the heating elements 70, 74 may be arranged in communication with the controller 128. It should be understood that the sensors S may be the same, or alternatively, may be different than the sensors that provide feedback to control a fluid flow through the inlet vent 100 and/or outlet vent 102. In an embodiment, a first temperature sensor is located within the lid 24 proximate the first second heating element 70 and a second temperature sensor extends from a bottom surface of the liner 28 proximate the second heating element 74. In such embodiments, the first temperature sensor may be used, such as to monitor temperature for example, when the lid 24 is closed and the first temperature sensor S is arranged in fluid communication with the hollow interior 30 of the cooking system 20. The first temperature sensor may be used to monitor temperature in this manner, separately or in conjunction with the second temperature sensor.

As previously described, the cooking system 20 is capable of performing a plurality of cooking operations including a convective and conductive cooking operation. In such embodiments, the cooking operations include, but are not limited to air frying, pressure cooking, broiling, baking/roasting, dehydrating, slow cooking, steaming, searing, sautéing, and/or any combination thereof. To perform a cooking operation that includes a combination of multiple types of cooking modes, the food item need not be removed from the cooking container 32 as the cooking system 20 transforms between a first mode, such as a pressure cooking mode for example, and a second mode, such as an air frying mode for example.

The at least one input 122 may be used to select a mode or cooking operation of the cooking system 20. In an embodiment, the functionality of the control system 126, and therefore the inputs available to a user, may vary in response to the position of the mode selector 60 of the lid lock 52 and/or in response to the configuration of the one or more inlet and outlet vents 100, 102, which may be controlled by the mode selector 60. For example, one or more inputs 122 of the control panel 120 may be activated when the mode selector 60 is in the first position associated with a first cooking mode such as a conductive cooking mode, and one or more different inputs may be activatable when the mode selector 60 is in the second position associated with a second cooking mode, such as a convective cooking mode. Further, another group of different inputs may be activated when the mode selector 60 is in a third position, disposed between the first and second positions, and associated with a third cooking mode, such as a combination cooking mode. In an embodiment, one or more sensors, such as reed switches for example, may be mounted to the lid lock 52 to indicate to the controller 128 the position of the lid lock 52, and in response, a respective portion of the user interface 120 will be energized for selection by a user.

As previously described, the cooking system 20 may be operated in a cooking mode that uses conductive cooking. In the conductive cooking mode, the cooking system 20 may perform a pressure-cooking operation. In such embodiments, the lid lock 52 is affixed to the cooking container 32 or housing 26 to form a pressure-tight, sealed enclosure with the cooking container 32. During operation in the pressure cooker mode, the controller 128 initiates operation of the second heating element 74, causing the temperature and therefore the pressure, within the enclosure formed by the cooking container 32 and the interior of the inner lid liner 42 to rise. During operation in the pressure cooker mode, the heating element 70 disposed within the lid 24 is typically not energized. In embodiments where the cooking system 20 is operable in a pressure cooking mode, the liner 28 should be formed from a more rigid material capable of withstanding the pressure build up within the cooking container 32.

As is noted above, another of the cooking modes of the cooking system 20 employs convective cooking, for example to perform an air-frying operation. When utilizing the cooking system 20 in the air fryer mode, the controller 128 initiates operation of the first heating element 70 and the air movement mechanism 78 to circulate the hot air through the enclosure formed between the cooking container 32 and the inner lid liner 42. During operation in the air fryer mode, the second heating element 74 is generally not energized. However, embodiments where the first heating element 74 is energized are also within the scope of the disclosure.

The air movement mechanism 78 draws air upward through the adjacent heating element 70 and expels the hot air outwardly towards a guide (not shown, and which, in an exemplary embodiment, actually surrounds the fan 78). The guide deflects the air downwardly towards the sides of the cooking container 32. The air travels down through an annulus 130 formed between the cooking container 32 and the basket **36*a* until it is deflected off the bottom of the cooking container 32 and drawn up by the air movement mechanism 78 towards the diffuser 36*b* and an end of the basket 36*a* with an aperture pattern. The hot air flows over and between the plurality of vanes of the air diffuser 36*b*, which impart a rotational motion to the hot air, thereby creating a vortex as the air is drawn through the apertures and into the interior of the basket 36***a* by the air movement mechanism 78. After traversing the interior of the basket 36*a*, the air is drawn back up through the heating element 70 and into the air movement mechanism 78 for further circulation.

As the air circulates through the cooking container 32, and specifically the basket 36*a*, the hot air cooks and forms a crispy outer layer on the food items disposed therein as a result of the Maillard effect. In an embodiment, a liquid, such as oil or fat, is contained within the enclosure, such as at the bottom of the cooking container 32. The liquid may be added to the cooking container 32 prior to operation in the air fry mode, or alternatively, may be produced as a residual material as the hot air passes over the food within the cooking container 32. In embodiments where a liquid is disposed at the bottom of the cooking container 32, as the air circulates through the cooking chamber 34 of the cooking container 32, a portion of the liquid becomes entrained in the air flow and is heated.

During operation in any of the cooking modes of the cooking system 20, the controller 128 initiates operation of at least one of the first heating element 70 and the second heating element 74, causing the temperature within the cooking container 32 to increase. As previously described, the cooking system 20 may include one or more temperature sensors S for monitoring conditions within the cooking chamber 34. As is also previously described, a first temperature sensor may be arranged near the one of the heating elements 70, 74 and a second temperature sensor may be arranged near one of the heating elements or adjacent to the cooking container 32 to measure a temperature thereof. Upon detection that the temperature adjacent a heating element 70, 74 or within or at the cooking container 32 is equal to or exceeds a predetermined threshold, the controller 128 may de-energize the heating element 70, 74 until the temperature has returned to an acceptable level.

The cooking system 20 may additionally be configured to operate in another or third cooking mode that functions as a combination of two or more cooking modes. In the combination cooking mode, the cooking system 20 is configured to perform a first cooking operation and a second cooking operation sequentially and in response to a single input provided by a user. In an embodiment, during the first cooking operation of the combination cooking mode, a conductive cooking operation is performed and during the second cooking operation of the combination cooking mode, a convective cooking operation is performed. Further, the first cooking operation may be a steam, slow, or pressure cooking operation and the second cooking operation may be an air frying operation. In such embodiments, the controller 128 may execute a stored sequence where the second heating mechanism 74 is operated during a first portion of the sequence to perform the first cooking operation and the first heating mechanism 70 and air movement device 78 are operated during a second portion of the sequence to perform the second cooking operation. For example, in the combination mode, a food item, such as a chicken for example, may be steam or slow or pressure cooked via operation of the second heating element 74. Then, the first heating element 70 and the air movement device 78 may then be operated to air fry the chicken to achieve a crispy exterior layer. However, the embodiments described herein are intended as an example only and any sequence of operation combining both the first and second heating elements 70, 74 is contemplated herein. When operated in a combination of two or more cooking modes, the food need not be removed from the hollow interior 30, or more specifically the container 32 during such a transition.

As previously described, the cooking system 20 includes a plurality of temperature sensors operable to monitor a temperature within the cooking chamber 34. In the illustrated, non-limiting embodiment of FIG. 4, the cooking system 20 is shown as having two temperature sensors S1, S2; however, it should be understood that embodiments having more than two temperatures sensors are also within the scope of the disclosure. Further, although the temperature sensors S1, S2 are illustrated as being arranged at generally the same location relative to the cooking system 20, such as within a shared housing for example, in other embodiments, the temperature sensors S1, S2 may be located remotely from one another. These sensors S1, S2 may be affixed to the lid 24 and/or the housing 26 (or even the container 32) to sense temperature within the heating volume as defined by the container 32 and inner lid liner 42.

In an embodiment, one or more of the plurality of temperature sensors is a negative temperature coefficient (NTC) temperature sensor. Some NTC temperature sensors are designed to function more accurately at lower temperatures, such as between about 180° F.-245° F. (about 80° C.-118° C.) and other NCT temperatures sensors may be designed to function more accurately at higher temperatures, such as between about 245° F.-450° F. (about 118° C.-232° C.). In an embodiment, the cooking system 20 includes at least a first temperatures sensor S1 better suited for monitoring lower temperatures (referred to herein as a "lower temperatures sensor") and a second temperature sensor S2 better suited for monitoring higher temperatures (referred to herein as a "higher temperatures sensor"). The lower temperature sensor S1 may be suitable for detecting the temperature within the cooking chamber 34 during a conductive or contact cooking operation. Similarly, the higher temperature sensor S2 may be suitable for detecting the temperature within the cooking chamber 34 during a convective or non-contact cooking operation.

The transition between the first and second cooking operations during a combination cooking mode may occur automatically in response to the temperatures detected by at least one of the lower temperature sensor S1 and the higher temperature sensor S2. In an embodiment, when operation of the cooking system 20 is initiated in the combination cooking mode, both the lower temperature sensor S1 and the higher temperature sensor S2 are operational and communicate signals indicative of a sensed temperature to the controller 128. The controller 128, however, will select which of the signals to read and/or rely upon based on the sensed temperature when compared to a predetermined threshold associated with that sensor. For example, if the sensed temperature measured by the lower temperature sensor S1 is lower than, for example 90° C., the controller will read signals provided by the lower temperature sensor. However, when the temperature sensed by the lower sensor S1 reaches or exceeds 90° C., the controller 128 will switch from reading the signals provided by the lower temperature sensor S1 to the signals provided by the higher temperature sensor S2. Similarly, if, after switching to the high temperature sensor S2 the sensed temperature measured by the higher temperature sensor S2 remains higher than, for example 90° C., the controller will continue to read signals provided by the high temperature sensor S2. However, when the temperature sensed by the high temperature sensor S2 falls to the threshold of 90° C. or below, the controller 128 may switch from reading the signal provided by the higher temperature sensor S2 to the signals of the lower temperature sensor S1. The thresholds provided herein are intended as an example only. "Switching" or threshold temperature can be in any desirable range such as 80° C.-130° C., 85° C.-125° C., 90° C.-120° C., or any low number and high number range between 80° C.-130° C.

The one or more temperature sensors S of the cooking system 20 may additionally be used to indicate to the controller 128 when to transition from a first cooking operation to a second cooking operation of the combination cooking mode. In an embodiment, the controller 128 may be configured to transition operation of the cooking system 20 from the first cooking operation to the second cooking operation in response to reaching a predetermined threshold temperature(s) (such as but not limited to those discussed above) associated with one of the lower and higher temperature sensors S1, S2, respectively. For example, the threshold temperature associated with the lower temperature sensor S2 may correlate to the temperature required for convective cooking within the cooking chamber 34. When the threshold temperature is reached, the controller 128 may automatically switch from conduction cooking via the lower heating element 74 to convection cooking via the upper heating element 70. Indeed, upon receiving a signal or identifying a condition indicating to the controller 128 to transition the cooking system 20 to the next cooking operation, the controller 128 will deenergize the second heating element 74 and will energize the first heating element 70 and the air movement mechanism 78. Upon transitioning to the second cooking operation, the same sensor or a different sensor than was being used to monitor the temperature during the first cooking operation may be operable to monitor the temperature in the cooking chamber 34. If different, the switch in cooking mode may coincide with the switch in temperature sensor being read (S1 or S2) as discussed above. In other words, reaching a sensed threshold temperature (such as but not limited to threshold temperatures in the ranges discussed above) may signal to the controller 128 to automatically switch just the temperature sensors S1 or S2 to be read, the cooking mode, or both the temperature sensors S1 or S2 to be read and the cooking mode to be executed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system comprising:

a housing defining a hollow chamber, said housing having an upper portion defining an opening to said hollow chamber, the upper portion including at least one mating feature;

a container receivable within said hollow chamber, the container defining an interior configured to receive food;

a lid movable relative to said housing and said container between an open position and a closed position, said lid sealing said interior in said closed position;

an actuator operably coupled to a locking assembly disposed within said lid, said locking assembly including an annular lock ring, said actuator being slidably movable along an elongated slot to cause said annular lock ring to directly engage the at least one mating feature to form a pressure-tight heating volume between said container and said lid, said locking assembly being contained entirely within said lid when said lid is in said closed position; and at least one heating element associated with at least one of said housing and said lid, said at least one heating element being arranged within said pressure-tight heating volume.

2. The cooking system of claim 1, wherein said lid includes a lid housing positionable about the upper portion of said housing when said lid is in said closed position.

3. The cooking system of claim 2, wherein said lid includes an inner lid liner arranged within an interior of said lid housing, said inner lid liner including at least a portion of said locking assembly.

4. The cooking system of claim 1, wherein said lid includes an inner surface that forms a relatively upper boundary of said pressure-tight heating volume.

5. The cooking system of claim 1, wherein said annular lock ring is rotatable about an axis between a first position and a second position in response to sliding movement of the actuator.

6. The cooking system of claim 1, wherein said cooking system further includes a fan arranged within said pressure-tight heating volume.

7. The cooking system of claim 6, wherein said cooking system further comprises a motor operably coupled to said fan, said motor being located external to said pressure-tight heating volume.

8. The cooking system of claim 7, wherein said motor further comprises a rotatable motor shaft connected to said fan, said motor shaft extending through an opening into said pressure-tight heating volume, and said motor shaft including a seal positioned there about to seal said opening.

9. The cooking system of claim 1, further comprising a pressure release vent operable when a pressure within said pressure-tight heating volume exceeds a defined pressure threshold.

10. The cooking system of claim 1, further comprising a venting system for exhausting at least one of air and steam from said hollow chamber, said venting system including a vent and an element movable relative to said vent to selectively seal said vent.

11. The cooking system of claim 10, wherein said venting system is disposed adjacent a side of said lid.

12. The cooking system of claim 10, further comprising a secondary venting system separate from said venting system, wherein said secondary venting system is electively operable to draw air into said hollow chamber.

13. The cooking system of claim 1, wherein the cooking system is operable in a plurality of cooking modes including a pressure cooking mode and a convective cooking mode, and a position of a portion of said lid varies based on a selected cooking mode.

14. The cooking system of claim 1, wherein said at least one heating element comprises a first heating element associated with said lid and operable in a first cooking mode and a second heating element associated with said housing and operable in a second cooking mode.

15. The cooking system of claim 14, wherein in said first cooking mode said first heating element is operational and in said second cooking mode said first heating element is non-operational.

16. The cooking system of claim 1, wherein the at least one mating feature comprises a plurality of projections and said locking assembly includes a plurality of complementary projections.

17. The cooking system of claim 1, wherein said actuator is slidably disposed within an opening formed in the lid.

18. A cooking system comprising:

a housing defining an opening;

a container defining a hollow chamber configured to receive food, the container having an upper portion defining an opening to the hollow chamber, the container being disposed within the opening in the housing;

a lid movable relative to the housing between an open position and a closed position, the lid contacting the container and the housing in the closed position;

a locking mechanism including an annular ring-shaped body rotatably disposed in the lid, the annular ring-shaped body having an inner surface configured to move a sealing surface on the lid into engagement with the hollow chamber to form a pressure-tight heating volume between the hollow chamber and the lid and configured to directly engage the housing to lock the lid thereto; and at least one heating element disposed within at least one of the housing and the lid, the at least one heating element being arranged within the pressure-tight heating volume.

19. The cooking system of claim 18, further comprising a fan disposed within the lid.

20. The cooking system of claim 19, wherein the locking mechanism includes a protrusion slidably movable along an opening to rotate the annular ring-shaped body relative to the lid to move the locking mechanism between a first unlocked position and a second locked position.

21. The cooking system of claim 20, wherein the cooking system is operable as a pressure cooker when the locking mechanism is in the second locked position, and is operable in a convective mode when the locking mechanism is in the first unlocked position.

22. A cooking system comprising:

a housing having an opening formed therein and having at least one housing mating feature formed thereon and;

a food container disposed within the opening in the housing, the food container defining a hollow chamber;

a lid movable relative to the housing between an open position and a closed position, the lid having a lock ring disposed therein, the lock ring having at least one lock ring mating feature thereon;

an actuator operably coupled to the lock ring, the actuator being movable to cause the at least one lock ring mating feature to engage the at least one housing mating feature to lock the lid to the housing to form a pressure-tight heating volume between the hollow chamber and the lid; and at least one heating element disposed in the lid.

23. The cooking system of claim 22, further comprising a seal on the lid that is moved into engagement with the food container when lid is locked to the housing.

24. The cooking system of claim 22, wherein the actuator is configured to rotate the lock ring to cause the at least one lock ring mating feature to intermesh with the at least one housing mating feature.

* * * * *